(12) United States Patent
Nishioka et al.

(10) Patent No.: US 7,782,386 B2
(45) Date of Patent: Aug. 24, 2010

(54) OPTICAL APPARATUS PROVIDED WITH VARIABLE MIRROR

(75) Inventors: Kimihiko Nishioka, Hachioji (JP); Kazuhito Hayakawa, Hachioji (JP); Kazuya Nishimura, Hachioji (JP); Hisashi Goto, Tokyo (JP)

(73) Assignee: Olympus Corporation, Tokyo (JP)

( * ) Notice: Subject to any disclaimer, the term of this patent is extended or adjusted under 35 U.S.C. 154(b) by 1857 days.

(21) Appl. No.: 10/394,459

(22) Filed: Mar. 24, 2003

(65) Prior Publication Data
US 2003/0184669 A1 Oct. 2, 2003

(30) Foreign Application Priority Data

Mar. 27, 2002 (JP) .............................. 2002-089004
Nov. 29, 2002 (JP) .............................. 2002-348596

(51) Int. Cl.
G02B 13/16 (2006.01)
G02B 27/10 (2006.01)
G02B 26/00 (2006.01)
H04N 5/228 (2006.01)
H04N 5/225 (2006.01)
H04N 5/238 (2006.01)

(52) U.S. Cl. .................. 348/335; 348/208.99; 348/343; 348/344; 348/363; 348/365; 359/290; 359/291

(58) Field of Classification Search .................. 348/335, 348/343, 365; 358/227, 225
See application file for complete search history.

(56) References Cited

U.S. PATENT DOCUMENTS

| 4,706,124 | A | * | 11/1987 | Baba et al. .................. 348/351 |
| 4,950,054 | A | * | 8/1990 | Wada et al. ................. 359/684 |
| 5,367,153 | A | * | 11/1994 | Suda et al. ............... 250/201.8 |
| 6,437,925 | B1 | | 8/2002 | Nishioka .................... 359/726 |
| 7,031,071 | B2 | * | 4/2006 | Nishioka .................... 359/676 |
| 2003/0140024 | A1 | * | 7/2003 | Crowley ...................... 706/47 |
| 2004/0012683 | A1 | * | 1/2004 | Yamasaki et al. ......... 348/208.1 |
| 2004/0109236 | A1 | * | 6/2004 | Nishioka .................... 359/643 |

FOREIGN PATENT DOCUMENTS

JP 2000-267010 9/2000
JP 2001-215406 8/2001

* cited by examiner

Primary Examiner—Jason Chan
Assistant Examiner—Michael Osinski
(74) Attorney, Agent, or Firm—Kenyon & Kenyon LLP

(57) ABSTRACT

An optical apparatus includes a variable optical-property element, a driving circuit driving the variable optical-property element, and an image sensor. In order to compensate a change of an imaging state caused by at least one factor of temperature, humidity, a manufacturing error, a change of an object distance, and a zoom state, photographing is performed while referring to a look-up table to change driving information provided to the variable optical-property element, and the driving information that the high-frequency component of a photographed image is practically maximized is assumed so that the variable optical-property element is driven by the driving information to perform photographing.

1 Claim, 36 Drawing Sheets

Fig.14

LUT

| DATA No.(j) | CONTROL MECHANISM Z (i) (i:1~N) | | | |
|---|---|---|---|---|
| | 1 | 2 | ·········· | N |
| 1 | X11 | X12 | | X1N |
| 2 | : | : | | : |
| : | : | : | | : |
| : | : | : | | : |
| M | XM1 | XM2 | ·········· | XMN |

Fig.16

LUT GROUP

| LUT No.(k) | CONDITIONS(TEMPERATURE, HUMIDITY, OBJECT DISTANCE, etc.) | | | |
|---|---|---|---|---|
| | 1 | 2 | ·········· | N |
| 1 | S11 | S12 | | S1N |
| 2 | : | : | | : |
| : | : | : | | : |
| : | : | : | | : |
| M | SM1 | SM2 | ·········· | SMN |

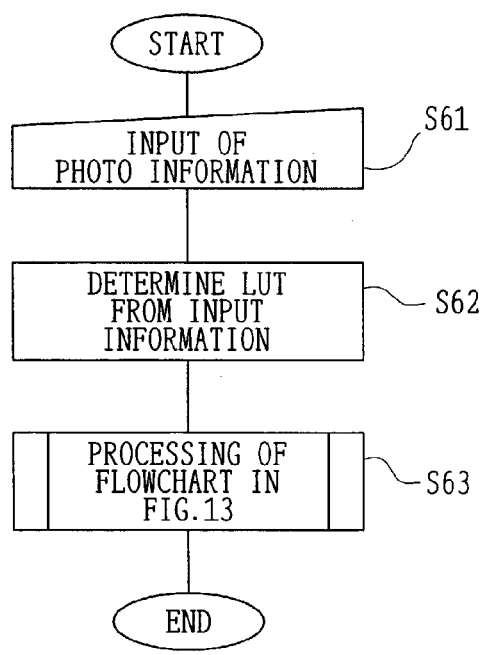
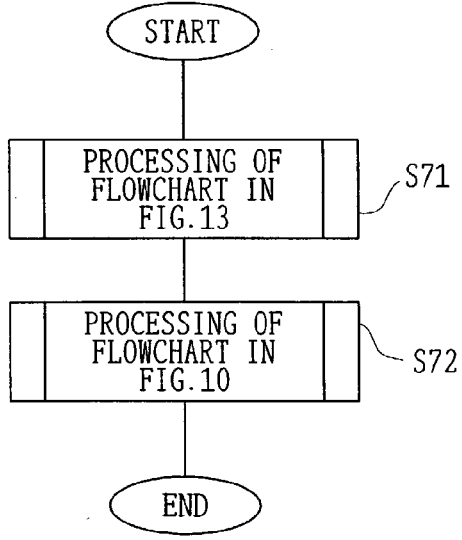
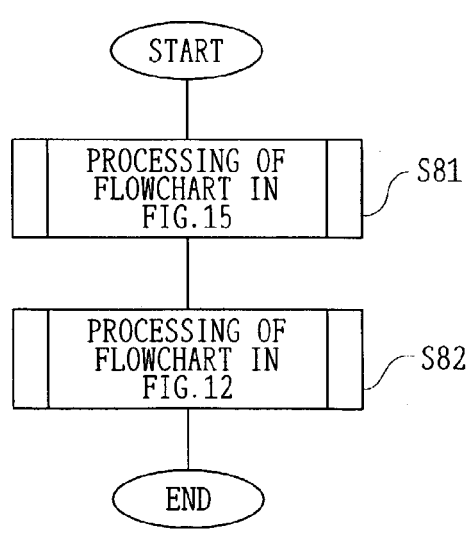

Fig.17A

LUT(S11)

| DATA No.(j) | CONTROL MECHANISM Z (i) (i:1~N), CONTROL SIGNAL X (i) | | |
|---|---|---|---|
| | 1 | 2 | ………… |
| 1 | X11 | X12 | |
| 2 | : | : | |
| : | : | : | |

Fig.17B

LUT(S12)

| DATA No.(j) | CONTROL MECHANISM Z (i) (i:1~N), CONTROL SIGNAL Y (i) | | |
|---|---|---|---|
| | 1 | 2 | ………… |
| 1 | Y11 | Y12 | |
| 2 | : | : | |
| : | : | : | |

TRANS-TYPE   CIS-TYPE

OPTICAL APPARATUS PROVIDED WITH VARIABLE MIRROR

BACKGROUND OF THE INVENTION

1. Field of the Invention

This invention relates to a variable optical-property element such as a variable focal-length lens, a variable focal-length diffraction optical element, a variable deflection-angle prism, or a variable focal-length mirror; an imaging device, for example, of spectacles, a video projector, a digital camera, or a cellular phone, provided with an optical system including the variable optical-property element; an imaging device of a TV camera, an endoscope, a telescope, a camera finder, or an optical information processor; a manufacturing method of an optical apparatus provided with a variable mirror or the optical apparatus provided with the variable mirror made by the manufacturing method; an adjusting method of the imaging device, an adjuster of the imaging device, or an imaging device provided with a variable mirror adjusted by the adjusting method or the adjuster; and a control method of a deformable optical element.

2. Description of Related Art

An optical apparatus provided with a variable optical-property mirror is disclosed, for example, in Japanese Patent Kokai No. 2000-267010.

In Kokai No. 2000-267010, it is described that compensating signals such that imaging performance is optimized in accordance with signals from various sensors are provided to a variable optical-property mirror through an arithmetical unit.

In camera focusing, a control method by active focusing or passive focusing has been proposed (for example, in Japanese Patent Kokai No. 2001-215406).

The control method disclosed in Kokai No. 2001-215406 is chiefly aimed at compensating a change of an imaging state caused by a change of an object distance to obtain the best imaging state. After the information of the object distance is acquired by various sensors, the space position of an imaging lens is shifted along the optical axis so that the best imaging state is brought about or while the imaging state is observed successively.

SUMMARY OF THE INVENTION

The imaging device according to the present invention includes a variable mirror, a driving circuit driving the variable mirror, and an image sensor. In order to compensate a change of an imaging state caused by at least one factor of temperature, humidity, a manufacturing error, a change of an object distance, and a zoom state, photographing is performed while referring to a look-up table (LUT) to change driving information provided to the variable mirror, and the driving information that the high-frequency component of a photographed image is practically maximized is assumed so that the variable mirror is driven by the driving information to perform photographing.

The manufacturing method of the optical apparatus provided with the variable mirror or the optical apparatus provided with the variable mirror made by the manufacturing method, according to the present invention is such that, in the optical apparatus provided with the variable mirror, an object for test is located at a preset position where its distance is known, the driving information is provided to the variable mirror in accordance with the distance, an image of the object for test is photographed, and the position of the image sensor is adjusted and fixed so that the focus or contrast of the image becomes nearly best.

The adjusting method of the imaging device, the adjuster of the imaging device, or the imaging device provided with the variable mirror adjusted by the adjusting method or the adjuster, according to the present invention is such that, in the imaging device including a variable mirror and a zoom lens in which at least one optical element is moved to adjust a focus movement for zooming, shift between focus positions in a plurality of zoom states is measured, the optical element is positioned so that the shift is practically minimized, and in this state, the image sensor is positioned so that the shift between the focus positions in the plurality of zoom states is practically minimized.

The control method of the deformable optical element according to the present invention is to control the deformable optical element in an optical apparatus including the deformable optical element, a circuit driving the deformable optical element, and a photographing means. This control method is such that the imaging state of the optical apparatus is acquired; the shape of the deformable optical element is slightly changed; the imaging state of the optical apparatus involved in this shape change is acquired; an imaging state after the shape change of the deformable optical element is compared with that before the shape change to evaluate the degree of improvement of the imaging state; and this processing is repeated until the imaging state ceases to be improved in order to compensate the change of the imaging state caused by at least one factor of an ambient change, an individual difference, an object distance, and a zoom state.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 14 is an explanatory view showing one example of the LUT used in the control method of the embodiment;

FIG. 15 is a flowchart illustrating another embodiment of the control method of the deformable optical element in the present invention;

FIG. 16 is an explanatory view showing one example of an LUT group used in the control method of the embodiment;

FIGS. 17A and 17B are explanatory views showing examples of LUTs used in the embodiment;

FIG. 18 is a flowchart illustrating another embodiment of the control method of the deformable optical element in the present invention;

FIG. 19 is a flowchart illustrating another embodiment of the control method of the deformable optical element in the present invention;

DETAILED DESCRIPTION OF THE PREFERRED EMBODIMENTS

Figure 1:
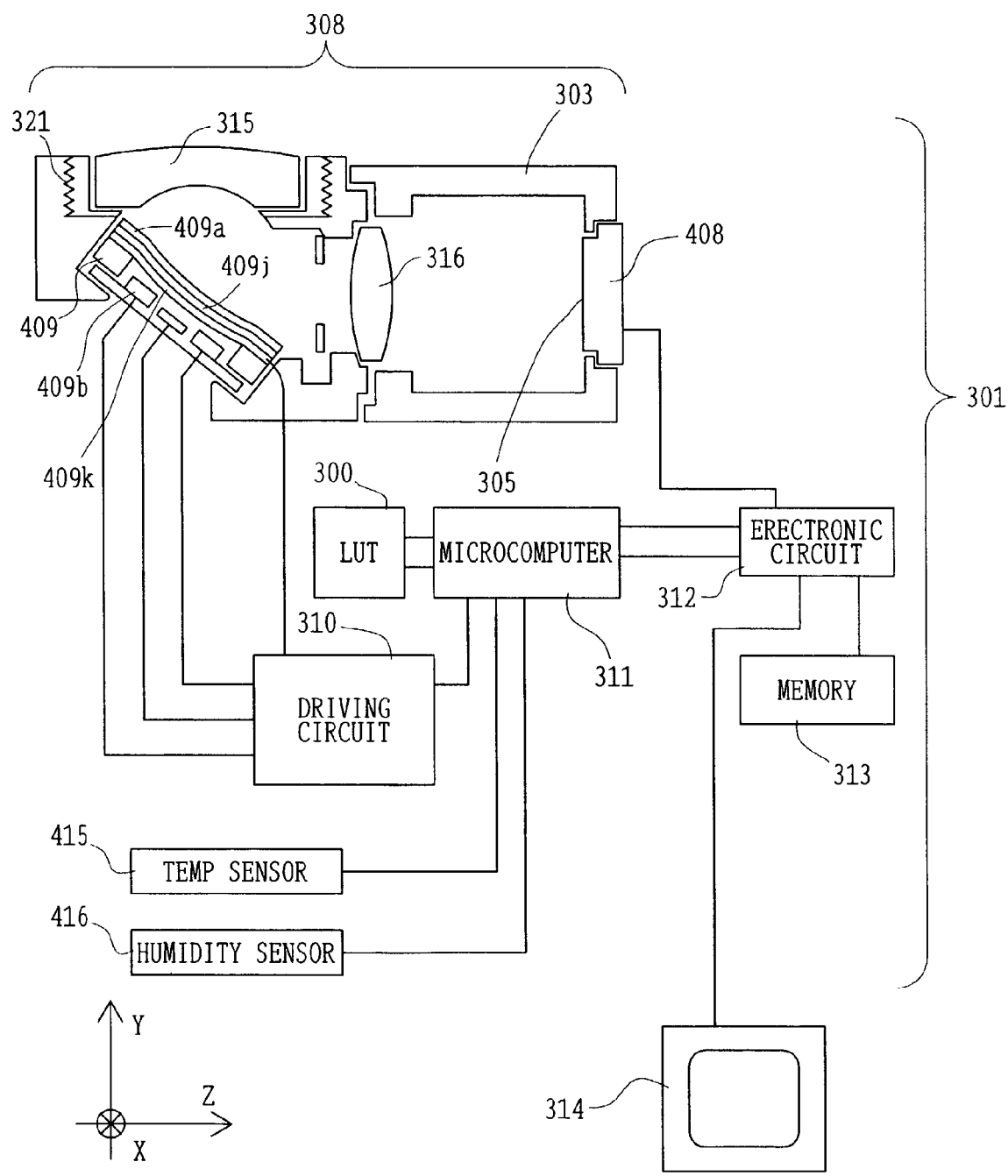
FIG. 1 is a view schematically showing a single focal lens type electronic imaging device using a variable mirror of one embodiment in the present invention.

Before undertaking the explanation of the embodiments of the present invention, it will be worthwhile to describe, first, the scope of the invention set forth in this specification, as the itemization of the scope of the invention in items (1)-(153); second, the examples of the imaging device or the optical apparatus of the present invention, as the embodiments; and third, the control method of the deformable optical element, as the control method.

After that, the examples of variable optical-property elements which can be used in the imaging device and the optical apparatus of the present invention are described as variable optical elements.

Itemization of the Scope of the Invention (1) An optical apparatus includes a variable mirror and a driving circuit driving the variable mirror. In this case, in order to compensate a change of an imaging state caused by at least one factor of temperature, humidity, a manufacturing error, a change of an object distance, and a zoom state, image formation is performed while changing driving information provided to the variable mirror, and the driving information that the focus or contrast of a formed image becomes best is assumed so that the variable mirror is driven by the driving information to perform the image formation.

(2) An imaging device includes a variable mirror, a driving circuit driving the variable mirror, and an image sensor. In this case, in order to compensate a change of an imaging state caused by at least one factor of temperature, humidity, a manufacturing error, a change of an object distance, and a zoom state, photographing is performed while changing driving information provided to the variable mirror, and the driving information that the focus or contrast of a photographed image becomes nearly best is assumed so that the variable mirror is driven by the driving information to perform photographing.

(3) An imaging device includes a variable mirror, a driving circuit driving the variable mirror, and an image sensor. In this case, in order to compensate a change of an imaging state caused by at least one factor of temperature, humidity, and a manufacturing error, photographing is performed while referring to a look-up table (LUT) with respect to an axial direction along which an object distance is varied to change driving information provided to the variable mirror, and the driving information that the high-frequency component of a photographed image is practically maximized is assumed so that the variable mirror is driven by the driving information to perform photographing.

(4) An imaging device includes a variable mirror, a driving circuit driving the variable mirror, and an image sensor. In this case, in order to compensate a change of an imaging state caused by at least one factor of temperature, humidity, and a manufacturing error, photographing is performed while referring to a look-up table (LUT) with respect to an axial direction along which an object distance is varied to change driving information provided to the variable mirror, and the driving information that the focus or contrast of a photographed image becomes nearly best is assumed so that the variable mirror is driven by the driving information to perform photographing.

(5) An optical apparatus includes a variable mirror and a driving circuit driving the variable mirror. In this case, in order to compensate a change of an imaging state caused by at least one factor of temperature, humidity, and a manufacturing error, driving information provided to the variable mirror is changed by referring to a look-up table (LUT) with respect to an axial direction along which an object distance is varied, and the driving information that an image in a practically best imaging state is obtained is determined so that the variable mirror is driven by the driving information to perform an operation.

(6) An imaging device includes a variable mirror, a driving circuit driving the variable mirror, an image sensor and a zoom optical system, and a look-up table (LUT) for driving the variable mirror, with a zoom state and an object distance as two axes. In this case, in order to compensate a change of an imaging state caused by at least one factor of temperature, humidity, and a manufacturing error, photographing is performed while referring to a two-dimensional look-up table (LUT) with respect to an axial direction along which the object distance is varied to change driving information provided to the variable mirror, and the driving information that the high-frequency component of a photographed image is practically maximized is assumed so that the variable mirror is driven by the driving information to perform photographing.

(7) An optical apparatus includes a variable mirror, a driving circuit driving the variable mirror, a zoom optical system, and a look-up table (LUT) for driving the variable mirror, with a zoom state and an object distance as two axes. In this case, in order to compensate a change of an imaging state caused by at least one factor of temperature, humidity, and a manufacturing error, image formation is performed while referring to a two-dimensional look-up table (LUT) with respect to an axial direction along which an object or image distance is varied to change driving information provided to the variable mirror, and the driving information that the focus or contrast of a formed image becomes nearly best is assumed so that the variable mirror is driven by the driving information to perform the image formation.

(8) A manufacturing method of an optical apparatus provided with a variable mirror, a control method of an optical apparatus provide with a variable mirror, or an optical apparatus provided with a variable mirror made by the manufacturing method is such that an object for test is located at a preset position where its distance is known, driving information is provided to the variable mirror in accordance with the distance, an image of the object for test is photographed, and the position of an image sensor is adjusted and fixed so that the focus or contrast of the image becomes nearly best. After that, the object for test located at the preset position where the distance is known is photographed again to change the driving information provided to the variable mirror so that its focus or contrast is practically maximized, and the driving information in this case is stored in a memory so that the variable mirror is controlled by a stored value.

(9) A manufacturing method of an optical apparatus provided with a variable mirror, a control method of an optical apparatus provide with a variable mirror, or an optical apparatus provided with a variable mirror made by the manufacturing method is such that an object for test is located at a preset position where its distance is known, driving information is provided to the variable mirror in accordance with the distance, an image of the object for test is photographed, and the position of an image sensor is adjusted and fixed so that the focus or contrast of the image becomes nearly best. After that, the object for test located at the preset position where the distance is known is photographed again to change the driving information provided to the variable mirror so that its focus or contrast becomes nearly best, and the driving information in this case is stored in a memory so that the variable mirror is controlled by a stored value.

(10) A manufacturing method of an optical apparatus provided with a variable mirror, a control method of an optical apparatus provide with a variable mirror, or an optical apparatus provided with a variable mirror made by the manufacturing method is such that an object for test located at a preset position where its distance is known is photographed to change driving information provided to the variable mirror so that its focus or contrast becomes nearly best, and the driving information in this case is stored in a memory so that the variable mirror is controlled by a stored value.

(11) An imaging device includes a variable mirror, a driving circuit driving the variable mirror, and an image sensor. In this case, in order to compensate a change of an imaging state caused by at least one factor of temperature, humidity, a manufacturing error, a change of an object distance, and a zoom state, photographing is performed while referring to a look-up table (LUT) to change a voltage or current applied to the variable mirror, and a driving voltage or current that the high-frequency component of a photographed image is practically maximized is assumed so that the variable mirror is driven by the voltage or current to perform photographing.

(12) An imaging device includes a variable mirror, a driving circuit driving the variable mirror, and an image sensor. In this case, in order to compensate a change of an imaging state caused by at least one factor of temperature, humidity, and a manufacturing error, photographing is performed while referring to a look-up table (LUT) with respect to an axial direction along which an object distance is varied to change a voltage or current applied to the variable mirror, and a driving voltage or current that the high-frequency component of a photographed image is practically maximized is assumed so that the variable mirror is driven by the voltage or current to perform photographing.

(13) An imaging device includes a variable mirror, a driving circuit driving the variable mirror, an image sensor and a zoom optical system, and a look-up table (LUT) for driving the variable mirror, with a zoom state and an object distance as two axes. In this case, in order to compensate a change of an imaging state caused by at least one factor of temperature, humidity, and a manufacturing error, photographing is performed while referring to a two-dimensional look-up table (LUT) with respect to an axial direction along which the object distance is varied to change a voltage or current applied to the variable mirror, and a driving voltage or current that the high-frequency component of a photographed image is practically maximized is assumed so that the variable mirror is driven by the value of the voltage or current to perform photographing.

(14) A manufacturing method of an optical apparatus provided with a variable mirror or an optical apparatus provided with a variable mirror made by the manufacturing method is such that, in the optical apparatus provided with the variable mirror, an object for test is located at a preset position where its distance is known, a voltage or current is applied to the variable mirror in accordance with the distance, an image of the object for test is photographed, and the position of an image sensor is adjusted and fixed so that the contrast of the image becomes nearly best.

(15) A manufacturing method of an optical apparatus provided with a variable mirror, a control method of an optical apparatus provide with a variable mirror, or an optical apparatus provided with a variable mirror made by the manufacturing method is such that, after the adjustment described in item (14), the object for test located at the preset position where the distance is known is photographed again to change a voltage or current applied to the variable mirror so that its contrast is practically maximized, and the value of the voltage or current is stored in a memory so that the variable mirror is controlled by a stored value.

(16) A manufacturing method of an optical apparatus provided with a variable mirror, a control method of an optical apparatus provide with a variable mirror, or an optical apparatus provided with a variable mirror made by the manufacturing method is such that an object for test located at a preset position where its distance is known is photographed to change a voltage or current applied to the variable mirror so that its contrast becomes nearly best, and the value of the voltage or current is stored in a memory so that the variable mirror is controlled by a stored value.

(17) An adjusting method of an optical apparatus, an adjuster of an optical apparatus, or an optical apparatus provided with a variable mirror adjusted by the adjusting method or the adjuster is such that, in the optical apparatus including the variable mirror and a zoom optical system in which at least one optical element is moved to adjust a focus movement for zooming, shift between focus positions in a plurality of zoom states is measured, the optical element is positioned so that the shift is practically minimized or within a tolerance, and in this state, an image sensor or a display element is positioned so that the shift between the focus positions in the plurality of zoom states is within a tolerance.

(18) An adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster is such that, in the imaging device including the variable mirror and the zoom optical system in which at least one optical element is moved to adjust a focus movement for zooming, shift between focus positions in a plurality of zoom states is measured, the optical element is positioned so that the shift is practically minimized, an image sensor is next positioned in this state so that the shift between the focus positions in the plurality of zoom states is practically minimized, and then the driving information of the variable mirror is determined so that the focus of an object for test becomes practically best with respect to a combination of the zoom state and the object distance.

(19) An adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster is such that, in the imaging device including the variable mirror and the zoom optical system in which at least one optical element is moved to adjust a focus movement for zooming, shift between focus positions in a plurality of zoom states is measured, the optical element is positioned so that the shift is within a tolerance, an image sensor is next positioned in this state so that the shift between the focus positions in the plurality of zoom states is within a tolerance, and then the driving information of the variable mirror is determined so that the focus of an object for test becomes practically best with respect to a combination of the zoom state and the object distance.

(20) An adjusting method of an optical apparatus provided with a variable mirror and a zoom optical system, an adjuster of an optical apparatus provided with a variable mirror and a zoom optical system, or an optical apparatus provided with a variable mirror adjusted by the adjusting method or the adjuster is such that, in the optical apparatus including the variable mirror and the zoom optical system in which at least one optical element is moved to adjust a focus movement for zooming, shift between focus positions in a plurality of zoom states is measured, the optical element is positioned so that the shift is practically minimized or within a tolerance, and the driving information of the variable mirror is determined so that the focus of an object for test becomes practically is best with respect to a combination of the zoom state and the object distance.

(21) An adjusting method of a display device provided with a variable mirror and a zoom optical system, an adjuster of a display device provided with a variable mirror and a zoom optical system, or a display device provided with a variable mirror adjusted by the adjusting method or the adjuster is such that, in the display device including the variable mirror and the zoom optical system in which at least one optical element is moved to adjust a focus movement for zooming, shift between focus positions in a plurality of zoom states is measured, the optical element is positioned so that the shift is practically minimized or within a tolerance, a display element is next positioned in this state so that the shift between the focus positions in the plurality of zoom states is practically minimized, and then the driving information of the variable mirror is determined so that a focus becomes practically best with respect to a combination of the zoom state and the object distance.

(22) An adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster is such that, in the imaging device including the variable mirror and the zoom optical system in which at least one optical element is moved to adjust a focus movement for zooming, shift between focus positions in a plurality of zoom states is measured after the variable mirror is driven by driving information corresponding to the plurality of zoom states, the optical element is positioned so that the shift is practically minimized or within a tolerance, an image sensor is next positioned in this state so that the shift between the focus positions in the plurality of zoom states is practically minimized, and then the driving information of the variable mirror is determined so that the focus or contrast of an object for test becomes practically best with respect to a combination of the zoom state and the object distance.

(23) An adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster is such that, in the imaging device including the variable mirror and the zoom optical system in which at least one optical element is moved to adjust a focus movement for zooming, shift between focus positions in a plurality of zoom states is measured after the variable mirror is driven by driving information corresponding to the plurality of zoom states, the optical element is positioned so that the shift is practically minimized or within a tolerance, an image sensor is next positioned in this state so that the shift between the focus positions in the plurality of zoom states is practically minimized, and then a position read out from a look-up table (LUT) for driving the variable mirror is selected so that the focus or contrast of an object for test becomes practically best with respect to a combination of the zoom state and the object distance.

(24) An adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster is such that, in the imaging device including the variable mirror and the zoom optical system in which at least one optical element is moved to adjust a focus movement for zooming, shift between focus positions in a plurality of zoom states is measured after ordinary mirrors of shapes corresponding to the plurality of zoom states are mounted instead of the variable mirror, the optical element is positioned so that the shift is practically minimized or within a tolerance, an image sensor is next positioned in this state so that the shift between the focus positions in the plurality of zoom states is practically minimized or within a tolerance, and then the driving information of the variable mirror is determined so that the focus or contrast of an object for test becomes practically best with respect to a combination of the zoom state and the object distance.

(25) An adjusting method of an optical apparatus provided with a variable focal-length lens and a zoom optical system, an adjuster of an optical apparatus provided with a variable focal-length lens and a zoom optical system, or an optical apparatus provided with a variable focal-length lens adjusted by the adjusting method or the adjuster is such that, in the imaging device including the variable focal-length lens and the zoom optical system in which at least one optical element is moved to adjust a focus movement for zooming, shift between focus positions in a plurality of zoom states is measured after ordinary lenses of focal lengths corresponding to a plurality of zoom states are mounted instead of the variable focal-length lens, the optical element is positioned so that the shift is practically minimized or within a tolerance, and then the driving information of the variable focal-length lens is determined so that the focus or contrast of an object for test becomes practically best with respect to a combination of the zoom state and the object distance.

(26) An adjusting method of an imaging device provided with a variable focal-length lens and a zoom optical system is such that, in an imaging device provided with the variable focal-length lens and the zoom optical system in which at least one optical element is moved to adjust a focus movement for zooming, shift between focus positions in a plurality of zoom states is measured after ordinary lenses of focal lengths corresponding to the plurality of zoom states are mounted instead of the variable focal-length lens, the optical element is positioned so that the shift is practically minimized or within a tolerance, an image sensor is next positioned in this state so that the shift between the focus positions in the plurality of zoom states is practically minimized or within a tolerance, and then the driving information of the variable focal-length lens is determined so that the focus of an object for test becomes practically best with respect to a combination of the zoom state and the object distance.

(27) An imaging device includes a variable focal-length lens, a driving circuit driving the variable focal-length lens, and an image sensor. In this case, in order to compensate a change of an imaging state caused by at least one factor of temperature, humidity, a manufacturing error, a change of an object distance, and a zoom state, photographing is performed while referring to a look-up table (LUT) to change driving information provided to the variable focal-length lens, and the driving information that the high-frequency component of a photographed image is practically maximized is assumed so that the variable focal-length lens is driven by the driving information to perform photographing.

(28) A manufacturing method of an optical apparatus provided with a variable focal-length lens or an optical apparatus provided with a variable focal-length lens made by the manufacturing method is such that, in the optical apparatus provided with the variable focal-length lens, an object for test is located at a preset position where its distance is known, driving information is provided to the variable focal-length lens in accordance with the distance, an image of the object for test is photographed, and the position of an image sensor is adjusted and fixed so that the focus or contrast of the image becomes nearly best.

(29) An adjusting method of an imaging device, an adjuster of an imaging device, or an imaging device provided with a variable focal-length lens adjusted by the adjusting method or the adjuster is such that, in the imaging device including the variable focal-length lens and a zoom lens in which at least one optical element is moved to adjust a focus movement for zooming, shift between focus positions in a plurality of zoom states is measured, the optical element is positioned so that the shift is practically minimized, and an image sensor is positioned in this state so that the shift between the focus positions in the plurality of zoom states is practically minimized.

(30) An optical apparatus includes a variable focal-length lens and a driving circuit for driving the variable focal-length lens. In this case, in order to compensate a change of an imaging state caused by at least one factor of temperature, humidity, a manufacturing error, a change of an object distance, and a zoom state, image formation is performed while changing driving information provided to the variable focal-length lens, and the driving information that the focus or contrast of a formed image becomes best is assumed so that the variable focal-length lens is driven by the driving information to perform the image formation.

(31) An imaging device includes a variable focal-length lens, a driving circuit for driving the variable focal-length lens, and an image sensor. In this case, in order to compensate a change of an imaging state caused by at least one factor of temperature, humidity, a manufacturing error, a change of an object distance, and a zoom state, photographing is performed while changing driving information provided to the variable focal-length lens, and the driving information that the focus or contrast of a formed image becomes practically best is assumed so that the variable focal-length lens is driven by the driving information to perform photographing.

(32) An imaging device includes a variable focal-length lens, a driving circuit driving the variable focal-length lens, and an image sensor. In this case, in order to compensate a change of an imaging state caused by at least one factor of temperature, humidity, and a manufacturing error, photographing is performed while referring to a look-up table (LUT) with respect to an axial direction along which an object distance is varied to change driving information provided to the variable focal-length lens, and the driving information that the high-frequency component of a photographed image is practically maximized is assumed so that the variable focal-length lens is driven by the driving information to perform photographing.

(33) An imaging device includes a variable focal-length lens, a driving circuit driving the variable focal-length lens, and an image sensor. In this case, in order to compensate a change of an imaging state caused by at least one factor of temperature, humidity, and a manufacturing error, photographing is performed while referring to a look-up table (LUT) with respect to an axial direction along which an object distance is varied to change driving information provided to the variable focal-length lens, and the driving information that the focus or contrast of a photographed image becomes practically best is assumed so that the variable focal-length lens is driven by the driving information to perform photographing.

(34) An optical apparatus includes a variable focal-length lens and a driving circuit driving the variable focal-length lens. In this case, in order to compensate a change of an imaging state caused by at least one factor of temperature, humidity, and a manufacturing error, driving information provided to the variable focal-length lens is changed by referring to a look-up table (LUT) with respect to an axial direction along which an object distance is varied, and the driving information that an image in a practically best imaging state is obtained is determined so that the variable focal-length lens is driven by the driving information to perform an operation.

(35) An imaging device includes a variable focal-length lens, a driving circuit driving the variable focal-length lens, an image sensor and a zoom optical system, and a look-up table (LUT) for driving the variable focal-length lens, with a zoom state and an object distance as two axes. In this case, in order to compensate a change of an imaging state caused by at least one factor of temperature, humidity, and a manufacturing error, photographing is performed while referring to a two-dimensional look-up table (LUT) with respect to an axial direction along which the object distance is varied to change driving information provided to the variable focal-length lens, and the driving information that the high-frequency component of a photographed image is practically maximized is assumed so that the variable focal-length lens is driven by the driving information to perform photographing.

(36) An optical apparatus includes a variable focal-length lens, a driving circuit driving the variable focal-length lens, a zoom optical system, and a look-up table (LUT) for driving the variable focal-length lens, with a zoom state and an object distance as two axes. In this case, in order to compensate a change of an imaging state caused by at least one factor of temperature, humidity, and a manufacturing error, image formation is performed while referring to a two-dimensional look-up table (LUT) with respect to an axial direction along which an object or image distance is varied to change driving information provided to the variable focal-length lens, and the driving information that the focus or contrast of a formed image becomes nearly best is assumed so that the variable focal-length lens is driven by the driving information to perform the image formation.

(37) A manufacturing method of an optical apparatus provided with a variable focal-length lens, a control method of an optical apparatus provide with a variable focal-length lens, or an optical apparatus provided with a variable focal-length lens made by the manufacturing method is such that, after the adjustment described in item (28), the object for test located at the preset position where the distance is known is photographed again to change driving information provided to the variable focal-length lens so that its focus or contrast is practically maximized, and the driving information in this case is stored in a memory so that the variable focal-length lens is controlled by a stored value.

(38) A manufacturing method of an optical apparatus provided with a variable focal-length lens, a control method of an optical apparatus provide with a variable focal-length lens, or an optical apparatus provided with a variable focal-length lens made by the manufacturing method is such that, after the adjustment described in item (28), the object for test located at the preset position where the distance is known is photographed again to change driving information provided to the variable focal-length lens so that its focus or contrast becomes nearly best, and the driving information in this case is stored in a memory so that the variable focal-length lens is controlled by a stored value.

(39) A manufacturing method of an optical apparatus provided with a variable focal-length lens, a control method of an optical apparatus provide with a variable focal-length lens, or an optical apparatus provided with a variable focal-length lens made by the manufacturing method is such that an object for test located at a preset position where its distance is known is photographed to change driving information provided to the variable focal-length lens so that its focus or contrast becomes nearly best, and the driving information in this case is stored in a memory so that the variable focal-length lens is controlled by a stored value.

(40) An imaging device includes a variable focal-length lens, a driving circuit driving the variable focal-length lens, and an image sensor. In this case, in order to compensate a change of an imaging state caused by at least one factor of temperature, humidity, a manufacturing error, a change of an object distance, and a zoom state, photographing is performed while referring to a look-up table (LUT) to change a voltage or current applied to the variable focal-length lens, and a driving voltage or current that the high-frequency component of a photographed image is practically maximized is assumed so that the variable focal-length lens is driven by the voltage or current to perform photographing.

(41) An imaging device includes a variable focal-length lens, a driving circuit driving the variable focal-length lens, and an image sensor. In this case, in order to compensate a change of an imaging state caused by at least one factor of temperature, humidity, and a manufacturing error, photographing is performed while referring to a look-up table (LUT) with respect to an axial direction along which an object distance is varied to change a voltage or current applied to the variable focal-length lens, and a driving voltage or current that the high-frequency component of a photographed image is practically maximized is assumed so that the variable focal-length lens is driven by the voltage or current to perform photographing.

(42) An imaging device includes a variable focal-length lens, a driving circuit driving the variable focal-length lens, an image sensor and a zoom optical system, and a look-up table (LUT) for driving the variable focal-length lens, with a zoom state and an object distance as two axes. In this case, in order to compensate a change of an imaging state caused by at least one factor of temperature, humidity, and a manufacturing error, photographing is performed while referring to a two-dimensional look-up table (LUT) with respect to an axial direction along which the object distance is varied to change a voltage or current applied to the variable focal-length lens, and a driving voltage or current that the high-frequency component of a photographed image is practically maximized is assumed so that the variable focal-length lens is driven by the value of the voltage or current to perform photographing.

(43) A manufacturing method of an optical apparatus provided with a variable focal length lens or an optical apparatus provided with a variable focal-length lens made by the manufacturing method is such that, in the optical apparatus provided with the variable focal-length lens, an object for test is located at a preset position where its distance is known, a voltage or current is applied to the variable focal-length lens in accordance with the distance, an image of the object for test is photographed, and the position of an image sensor is adjusted and fixed so that the contrast of the image becomes nearly best.

(44) A manufacturing method of an optical apparatus provided with a variable focal-length lens, a control method of an optical apparatus provide with a variable focal-length lens, or an optical apparatus provided with a variable focal-length lens made by the manufacturing method is such that, after the adjustment described in item (43), the object for test located at the preset position where the distance is known is photographed again to change a voltage or current applied to the variable focal-length lens so that its contrast is practically maximized, and the value of the voltage or current is stored in a memory so that the variable focal-length lens is controlled by a stored value.

(45) A manufacturing method of an optical apparatus provided with a variable focal-length lens, a control method of an optical apparatus provide with a variable focal-length lens, or an optical apparatus provided with a variable focal-length lens made by the manufacturing method is such that an object for test located at a preset position where its distance is known is photographed to change a voltage or current applied to the variable focal-length lens so that its contrast becomes nearly best, and the value of the voltage or current is stored in a memory so that the variable focal-length lens is controlled by a stored value.

(46) An adjusting method of an optical apparatus, an adjuster of an optical apparatus, or an optical apparatus provided with a variable focal-length lens adjusted by the adjusting method or the adjuster is such that, in the optical apparatus including the variable focal-length lens and a zoom optical system in which at least one optical element is moved to adjust a focus movement for zooming, shift between focus positions in a plurality of zoom states is measured, the optical element is positioned so that the shift is practically minimized or within a tolerance, and in this state, an image sensor or a display element is positioned so that the shift between the focus positions in the plurality of zoom states is within a tolerance.

(47) An adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster is such that, in the imaging device including the variable focal-length lens and the zoom optical system in which at least one optical element is moved to adjust a focus movement for zooming, shift between focus positions in a plurality of zoom states is measured, the optical element is positioned so that the shift is practically minimized, an image sensor is next positioned in this state so that the shift between the focus positions in the plurality of zoom states is practically minimized, and then the driving information of the variable focal-length lens is determined so that the focus of an object for test becomes practically best with respect to a combination of the zoom state and the object distance.

(48) An adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster is such that, in the imaging device including the variable focal-length lens and the zoom optical system in which at least one optical element is moved to adjust a focus movement for zooming, shift between focus positions in a plurality of zoom states is measured, the optical element is positioned so that the shift is within a tolerance, an image sensor is next positioned in this state so that the shift between the focus positions in the plurality of zoom states is within a tolerance, and then the driving information of the variable focal-length lens is determined so that the focus of an object for test becomes practically best with respect to a combination of the zoom state and the object distance.

(49) An adjusting method of an optical apparatus provided with a variable focal-length lens and a zoom optical system, an adjuster of an optical apparatus provided with a variable focal-length lens and a zoom optical system, or an optical apparatus provided with a variable focal-length lens adjusted by the adjusting method or the adjuster is such that, in the optical apparatus including the variable focal-length lens and the zoom optical system in which at least one optical element is moved to adjust a focus movement for zooming, shift between focus positions in a plurality of zoom states is measured, the optical element is positioned so that the shift is practically minimized or within a tolerance, and the driving information of the variable focal-length lens is determined so that the focus of an object for test becomes practically best with respect to a combination of the zoom state and the object distance.

(50) An adjusting method of a display device provided with a variable focal-length lens and a zoom optical system, an adjuster of a display device provided with a variable focal-length lens and a zoom optical system, or a display device provided with a variable focal-length lens adjusted by the adjusting method or the adjuster is such that, in the display device including the variable focal-length lens and the zoom optical system in which at least one optical element is moved to adjust a focus movement for zooming, shift between focus positions in a plurality of zoom states is measured, the optical element is positioned so that the shift is practically minimized or within a tolerance, a display element is next positioned in this state so that the shift between the focus positions in the plurality of zoom states is practically minimized, and then the driving information of the variable focal-length lens is determined so that a focus becomes practically best with respect to a combination of the zoom state and the object distance.

(51) An adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster is such that, in the imaging device including the variable focal-length lens and the zoom optical system in which at least one optical element is moved to adjust a focus movement for zooming, shift between focus positions in a plurality of zoom states is measured after the variable focal-length lens is driven by driving information corresponding to the plurality of zoom states, the optical element is positioned so that the shift is practically minimized or within a tolerance, an image sensor is next positioned in this state so that the shift between the focus positions in the plurality of zoom states is practically minimized, and then the driving information of the variable focal-length lens is determined so that the focus or contrast of an object for test becomes practically best with respect to a combination of the zoom state and the object distance.

(52) An adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster is such that, in the imaging device including the variable focal-length lens and the zoom optical system in which at least one optical element is moved to adjust a focus movement for zooming, shift between focus positions in a plurality of zoom states is measured after the variable focal-length lens is driven by driving information corresponding to the plurality of zoom states, the optical element is positioned so that the shift is practically minimized or within a tolerance, an image sensor is next positioned in this state so that the shift between the focus positions in the plurality of zoom states is practically minimized, and then a position read out from a look-up table (LUT) for driving the variable focal-length lens is selected so that the focus or contrast of an object for test becomes practically best with respect to a combination of the zoom state and the object distance.

(53) An adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster is such that, in the imaging device including the variable focal-length lens and the zoom optical system in which at least one optical element is moved to adjust a focus movement for zooming, shift between focus positions in a plurality of zoom states is measured after ordinary mirrors of shapes corresponding to the plurality of zoom states are mounted instead of the variable focal-length lens, the optical element is positioned so that the shift is practically minimized or within a tolerance, an image sensor is next positioned in this state so that the shift between the focus positions in the plurality of zoom states is practically minimized or within a tolerance, and then the driving information of the variable focal-length lens is determined so that the focus or contrast of an object for test becomes practically best with respect to a combination of the zoom state and the object distance.

(54) An imaging device includes a variable optical-property element, a driving circuit driving the variable optical-property element, and an image sensor. In this case, in order to compensate a change of an imaging state caused by at least one factor of temperature, humidity, a manufacturing error, a change of an object distance, and a zoom state, photographing is performed while referring to a look-up table (LUT) to change driving information provided to the variable optical-property element, and the driving information that the high-frequency component of a photographed image is practically maximized is assumed so that the variable optical-property element is driven by the driving information to perform photographing.

(55) A manufacturing method of an optical apparatus provided with a variable optical-property element or an optical apparatus provided with a variable optical-property element made by the manufacturing method is such that, in the optical apparatus provided with the variable optical-property element, an object for test is located at a preset position where its distance is known, driving information is provided to the variable optical-property clement in accordance with the distance, an image of the object for test is photographed, and the position of an image sensor is adjusted and fixed so that the focus or contrast of the image becomes nearly best.

(56) An adjusting method of an imaging device, an adjuster of an imaging device, or an imaging device provided with a variable optical-property element adjusted by the adjusting method or the adjuster is such that, in the imaging device including the variable optical-property element and a zoom lens in which at least one optical element is moved to adjust a focus movement for zooming, shift between focus positions in a plurality of zoom states is measured, the optical element is positioned so that the shift is practically minimized, and an image sensor is positioned in this state so that the shift between the focus positions in the plurality of zoom states is practically minimized.

(57) An optical apparatus includes a variable optical-property element and a driving circuit for driving the variable optical-property element. In this case, in order to compensate a change of an imaging state caused by at least one factor of temperature, humidity, a manufacturing error, a change of an object distance, and a zoom state, image formation is performed while changing driving information provided to the variable optical-property element, and the driving information that the focus or contrast of a formed image becomes best is assumed so that the variable optical-property element is driven by the driving information to perform the image formation.

(58) An imaging device includes a variable optical-property element, a driving circuit for driving the variable optical-property element, and an image sensor. In this case, in order to compensate a change of an imaging state caused by at least one factor of temperature, humidity, a manufacturing error, a change of an object distance, and a zoom state, photographing is performed while changing driving information provided to the variable optical-property element, and the driving information that the focus or contrast of a formed image becomes practically best is assumed so that the variable optical-property element is driven by the driving information to perform photographing.

(59) An imaging device includes a variable optical-property element, a driving circuit driving the variable optical-property element, and an image sensor. In this case, in order to compensate a change of an imaging state caused by at least one factor of temperature, humidity, and a manufacturing error, photographing is performed while referring to a look-up table (LUT) with respect to an axial direction along which an object distance is varied to change driving information provided to the variable optical-property element, and the driving information that the high-frequency component of a photographed image is practically maximized is assumed so that the variable optical-property element is driven by the driving information to perform photographing.

(60) An imaging device includes a variable optical-property element, a driving circuit driving the variable optical-property element, and an image sensor. In this case, in order to compensate a change of an imaging state caused by at least one factor of temperature, humidity, and a manufacturing error, photographing is performed while referring to a look-up table (LUT) with respect to an axial direction along which an object distance is varied to change driving information provided to the variable optical-property element, and the driving information that the focus or contrast of a photographed image becomes practically best is assumed so that the variable optical-property element is driven by the driving information to perform photographing.

(61) An optical apparatus includes a variable optical-property element and a driving circuit driving the variable optical-property element. In this case, in order to compensate a change of an imaging state caused by at least one factor of temperature, humidity, and a manufacturing error, driving information provided to the variable optical-property element is changed by referring to a look-up table (LUT) with respect to an axial direction along which an object distance is varied, and the driving information that an image in a practically best imaging state is obtained is determined so that the variable optical-property element is driven by the driving information to perform an operation.

(62) An imaging device includes a variable optical-property element, a driving circuit driving the variable optical-property element, an image sensor and a zoom optical system, and a look-up table (LUT) for driving the variable optical-property element, with a zoom state and an object distance as two axes. In this case, in order to compensate a change of an imaging state caused by at least one factor of temperature, humidity, and a manufacturing error, photographing is performed while referring to a two-dimensional look-up table (LUT) with respect to an axial direction along which the object distance is varied to change driving information provided to the variable optical-property element, and the driving information that the high-frequency component of a photographed image is practically maximized is assumed so that the variable optical-property element is driven by the driving information to perform photographing.

(63) An optical apparatus includes a variable optical-property element, a driving circuit driving the variable optical-property element, a zoom optical system, and a look-up table (LUT) for driving the variable optical-property element, with a zoom state and an object distance as two axes. In this case, in order to compensate a change of an imaging state caused by at least one factor of temperature, humidity, and a manufacturing error, image formation is performed while referring to a two-dimensional look-up table (LUT) with respect to an axial direction along which an object or image distance is varied to change driving information provided to the variable optical-property element, and the driving information that the focus or contrast of a formed image becomes nearly best is assumed so that the variable optical-property element is driven by the driving information to perform the image formation.

(64) A manufacturing method of an optical apparatus provided with a variable optical-property element, a control method of an optical apparatus provide with a variable optical-property element, or an optical apparatus provided with a variable optical-property element made by the manufacturing method is such that, after the adjustment described in item (55), the object for test located at the preset position where the distance is known is photographed again to change driving information provided to the variable optical-property element so that its focus or contrast is practically maximized, and the driving information in this case is stored in a memory so that the variable optical-property element is controlled by a stored value.

(65) A manufacturing method of an optical apparatus provided with a variable optical-property element, a control method of an optical apparatus provide with a variable optical-property element, or an optical apparatus provided with a variable optical-property element made by the manufacturing method is such that, after the adjustment described in item (55), the object for test located at the preset position where the distance is known is photographed again to change driving information provided to the variable optical-property element so that its focus or contrast becomes nearly best, and the driving information in this case is stored in a memory so that the variable optical-property element is controlled by a stored value.

(66) A manufacturing method of an optical apparatus provided with a variable optical-property element, a control method of an optical apparatus provide with a variable optical-property element, or an optical apparatus provided with a variable optical-property element made by the manufacturing method is such that an object for test located at a preset position where its distance is known is photographed to change driving information provided to the variable optical-property element so that the focus or contrast of the image of the object becomes nearly best, and the driving information in this case is stored in a memory so that the variable optical-property element is controlled by a stored value.

(67) An imaging device includes a variable optical-property element, a driving circuit driving the variable optical-property element, and an image sensor. In this case, in order to compensate a change of an imaging state caused by at least one factor of temperature, humidity, a manufacturing error, a change of an object distance, and a zoom state, photographing is performed while referring to a look-up table (LUT) to change a voltage or current applied to the variable optical-property element, and a driving voltage or current that the high-frequency component of a photographed image is practically maximized is assumed so that the variable optical-property element is driven by the voltage or current to perform photographing.

(68) An imaging device includes a variable optical-property element, a driving circuit driving the variable optical-property element, and an image sensor. In this case, in order to compensate a change of an imaging state caused by at least one factor of temperature, humidity, and a manufacturing error, photographing is performed while referring to a look-up table (LUT) with respect to an axial direction along which an object distance is varied to change a voltage or current applied to the variable optical-property element, and a driving voltage or current that the high-frequency component of a photographed image is practically maximized is assumed so that the variable optical-property element is driven by the voltage or current to perform photographing.

(69) An imaging device includes a variable optical-property element, a driving circuit driving the variable optical-property element, an image sensor and a zoom optical system, and a look-up table (LUT) for driving the variable optical-property element, with a zoom state and an object distance as two axes. In this case, in order to compensate a change of an imaging state caused by at least one factor of temperature, humidity, and a manufacturing error, photographing is performed while referring to a two-dimensional look-up table (LUT) with respect to an axial direction along which the object distance is varied to change a voltage or current applied to the variable optical-property element, and a driving voltage or current that the high-frequency component of a photographed image is practically maximized is assumed so that the variable optical-property element is driven by the value of the voltage or current to perform photographing.

(70) A manufacturing method of an optical apparatus provided with a variable optical-property element or an optical apparatus provided with a variable optical-property element made by the manufacturing method is such that, in the optical apparatus provided with the variable optical-property element, an object for test is located at a preset position where its distance is known, a voltage or current is applied to the variable optical-property element in accordance with the distance, an image of the object for test is photographed, and the position of an image sensor is adjusted and fixed so that the contrast of the image becomes nearly best.

(71) A manufacturing method of an optical apparatus provided with a variable optical-property element, a control method of an optical apparatus provide with a variable optical-property element, or an optical apparatus provided with a variable optical-property element made by the manufacturing method is such that, after the adjustment described in item (70), the object for test located at the preset position where the distance is known is photographed again to change a voltage or current applied to the variable optical-property element so that its contrast is practically maximized, and the value of the voltage or current is stored in a memory so that the variable optical-property element is controlled by a stored value.

(72) A manufacturing method of an optical apparatus provided with a variable optical-property element, a control method of an optical apparatus provide with a variable optical-property element, or an optical apparatus provided with a variable optical-property element made by the manufacturing method is such that an object for test located at a preset position where its distance is known is photographed to change a voltage or current applied to the variable optical-property element so that its contrast becomes nearly best, and the value of the voltage or current is stored in a memory so that the variable optical-property element is controlled by a stored value.

(73) An adjusting method of an optical apparatus, an adjuster of an optical apparatus, or an optical apparatus provided with a variable optical-property element adjusted by the adjusting method or the adjuster is such that, in the optical apparatus including the variable optical-property element and a zoom optical system in which at least one optical element is moved to adjust a focus movement for zooming, shift between focus positions in a plurality of zoom states is measured, the optical element is positioned so that the shift is practically minimized or within a tolerance, and in this state, an image sensor or a display element is positioned so that the shift between the focus positions in the plurality of zoom states is within a tolerance.

(74) An adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster is such that, in the imaging device including the variable optical-property element and the zoom optical system in which at least one optical element is moved to adjust a focus movement for zooming, shift between focus positions in a plurality of zoom states is measured, the optical element is positioned so that the shift is practically minimized, an image sensor is next positioned in this state so that the shift between the focus positions in the plurality of zoom states is practically minimized, and then the driving information of the variable optical-property element is determined so that the focus of an object for test becomes practically best with respect to a combination of the zoom state and the object distance.

(75) An adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster is such that, in the imaging device including the variable optical-property element and the zoom optical system in which at least one optical element is moved to adjust a focus movement for zooming, shift between focus positions in a plurality of zoom states is measured, the optical element is positioned so that the shift is within a tolerance, an image sensor is next positioned in this state so that the shift between the focus positions in the plurality of zoom states is within a tolerance, and then the driving information of the variable optical-property element is determined so that the focus of an object for test becomes practically best with respect to a combination of the zoom state and the object distance.

(76) An adjusting method of an optical apparatus provided with a variable optical-property element and a zoom optical system, an adjuster of an optical apparatus provided with a variable optical-property element and a zoom optical system, or an optical apparatus provided with a variable optical-property element adjusted by the adjusting method or the adjuster is such that, in the optical apparatus including the variable optical-property element and the zoom optical system in which at least one optical element is moved to adjust a focus movement for zooming, shift between focus positions in a plurality of zoom states is measured, the optical element is positioned so that the shift is practically minimized or within a tolerance, and the driving information of the variable optical-property element is determined so that the focus of an object for test becomes practically best with respect to a combination of the zoom state and the object distance.

(77) An adjusting method of a display device provided with a variable optical-property element and a zoom optical system, an adjuster of a display device provided with a variable optical-property element and a zoom optical system, or a display device provided with a variable optical-property element adjusted by the adjusting method or the adjuster is such that, in the display device including the variable optical-property element and the zoom optical system in which at least one optical element is moved to adjust a focus movement for zooming, shift between focus positions in a plurality of zoom states is measured, the optical element is positioned so that the shift is practically minimized or within a tolerance, a display element is next positioned in this state so that the shift between the focus positions in the plurality of zoom states is practically minimized, and then the driving information of the variable optical-property element is determined so that a focus becomes practically best with respect to a combination of the zoom state and the object distance.

(78) An adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster is such that, in the imaging device including the variable optical-property element and the zoom optical system in which at least one optical element is moved to adjust a focus movement for zooming, shift between focus positions in a plurality of zoom states is measured after the variable optical-property element is driven by driving information corresponding to the plurality of zoom states, the optical element is positioned so that the shift is practically minimized or within a tolerance, an image sensor is next positioned in this state so that the shift between the focus positions in the plurality of zoom states is practically minimized, and then the driving information of the variable optical-property element is determined so that the focus or contrast of an object for test becomes practically best with respect to a combination of the zoom state and the object distance.

(79) An adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster is such that, in the imaging device including the variable optical-property element and the zoom optical system in which at least one optical element is moved to adjust a focus movement for zooming, shift between focus positions in a plurality of zoom states is measured after the variable optical-property element is driven by driving information corresponding to the plurality of zoom states, the optical element is positioned so that the shift is practically minimized or within a tolerance, an image sensor is next positioned in this state so that the shift between the focus positions in the plurality of zoom states is practically minimized, and then a position read out from a look-up table (LUT) for driving the variable optical-property element is selected so that the focus or contrast of an object for test becomes practically best with respect to a combination of the zoom state and the object distance.

(80) An adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster is such that, in the imaging device including the variable optical-property element and the zoom optical system in which at least one optical element is moved to adjust a focus movement for zooming, shift between focus positions in a plurality of zoom states is measured after ordinary mirrors of shapes corresponding to the plurality of zoom states are mounted instead of the variable optical-property element, the optical element is positioned so that the shift is practically minimized or within a tolerance, an image sensor is next positioned in this state so that the shift between the focus positions in the plurality of zoom states is practically minimized or within a tolerance, and then the driving information of the variable optical-property element is determined so that the focus or contrast of an object for test becomes practically best with respect to a combination of the zoom state and the object distance.

(81) An adjusting method of an optical apparatus provided with a variable optical-property element and a zoom optical system, an adjuster of an optical apparatus provided with a variable optical-property element and a zoom optical system, or an optical apparatus provided with a variable optical-property element adjusted by the adjusting method or the adjuster is such that, in the imaging device including the variable optical-property element and the zoom optical system in which at least one optical element is moved to adjust a focus movement for zooming, shift between focus positions in a plurality of zoom states is measured after ordinary lenses of focal lengths corresponding to a plurality of zoom states are mounted instead of the variable optical-property element, the optical element is positioned so that the shift is practically minimized or within a tolerance, and then the driving information of the variable optical-property element is determined so that the focus or contrast of an object for test becomes practically best with respect to a combination of the zoom state and the object distance.

(82) An adjusting method of an imaging device provided with a variable optical-property element and a zoom optical system is such that, in an imaging device provided with the variable optical-property element and the zoom optical system in which at least one optical element is moved to adjust a focus movement for zooming, shift between focus positions in a plurality of zoom states is measured after ordinary lenses of focal lengths corresponding to the plurality of zoom states are mounted instead of the variable optical-property element, the optical element is positioned so that the shift is practically minimized or within a tolerance, an image sensor is next positioned in this state so that the shift between the focus positions in the plurality of zoom states is practically minimized or within a tolerance, and then the driving information of the variable optical-property element is determined so that the focus of an object for test becomes practically best with respect to a combination of the zoom state and the object distance.

(83) A manufacturing method of an optical apparatus provided with a variable mirror or an optical apparatus provided with a variable mirror made by the manufacturing method is such that an object for test is located at a preset position where its distance is known, driving information is provided to the variable mirror in accordance with the distance, an image of the object for test is photographed, and the position of an image sensor is adjusted and fixed so that the focus or contrast of the image becomes nearly best. In this case, the object for test is located in the proximity of a visual field or a photographic field.

(84) In a manufacturing method of an optical apparatus provided with a variable mirror, a control method of an optical apparatus provide with a variable mirror, or an optical apparatus provided with a variable mirror made by the manufacturing method, described in any one of items (8)-(10), the object for test is located in the proximity of a visual field or a photographic field.

(85) In a manufacturing method of an optical apparatus provided with a variable mirror or an optical apparatus provided with a variable mirror made by the manufacturing method, described in item (14), the object for test is located in the proximity of a visual field or a photographic field.

(86) In a manufacturing method of an optical apparatus provided with a variable mirror, a control method of an optical apparatus provide with a variable mirror, or an optical apparatus provided with a variable mirror made by the manufacturing method, described in item (15) or (16), the object for test is located in the proximity of a visual field or a photographic field.

(87) In an adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster, described in item (18) or (19), the object for test is located in the proximity of a visual field or a photographic field.

(88) In an adjusting method of an optical apparatus provided with a variable mirror and a zoom optical system, an adjuster of an optical apparatus provided with a variable mirror and a zoom optical system, or an optical apparatus provided with a variable mirror adjusted by the adjusting method or the adjuster, described in item (20), the object for test is located in the proximity of a visual field or a photographic field.

(89) In an adjusting method, of an imaging device provided with a variable mirror and a zoom optical system, an adjuster of an imaging device provided with a variable mirror and a zoom optical system, or an imaging device provided with a variable mirror adjusted by the adjusting method or the adjuster, described in item (22) or (23), the object for test is located in the proximity of a visual field or a photographic field.

(90) In an adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster, described in item (24), the object for test is located in the proximity of a visual field or a photographic field.

(91) In an adjusting method of an optical apparatus provided with a variable focal-length lens and a zoom optical system, an adjuster of an optical apparatus provided with a variable focal-length lens and a zoom optical system, or an optical apparatus provided with a variable focal-length lens adjusted by the adjusting method or the adjuster, described in item (25), the object for test is located in the proximity of a visual field or a photographic field.

(92) In an adjusting method of an imaging device provided with a variable focal-length lens and a zoom optical system, described in item (26), the object for test is located in the proximity of a visual field or a photographic field.

(93) In a manufacturing method of an optical apparatus provided with a variable focal-length lens or an optical apparatus provided with a variable focal-length lens made by the manufacturing method, described in item (28), the object for test is located in the proximity of a visual field or a photographic field.

(94) In a manufacturing method of an optical apparatus provided with a variable focal-length lens, a control method of an optical apparatus provide with a variable focal-length lens, or an optical apparatus provided with a variable focal-length lens made by the manufacturing method, described in any one of items (37)-(39), the object for test is located in the proximity of a visual field or a photographic field.

(95) In a manufacturing method of an optical apparatus provided with a variable focal length lens or an optical apparatus provided with a variable focal-length lens made by the manufacturing method, described in item (43), the object for test is located in the proximity of a visual field or a photographic field.

(96) In a manufacturing method of an optical apparatus provided with a variable focal-length lens, a control method of an optical apparatus provide with a variable focal-length lens, or an optical apparatus provided with a variable focal-length lens made by the manufacturing method, described in item (44) or (45), the object for test is located in the proximity of a visual field or a photographic field.

(97) In an adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster, described in item (47) or (48), the object for test is located in the proximity of a visual field or a photographic field.

(98) In an adjusting method of an optical apparatus provided with a variable focal-length lens and a zoom optical system, an adjuster of an optical apparatus provided with a variable focal-length lens and a zoom optical system, or an optical apparatus provided with a variable focal-length lens adjusted by the adjusting method or the adjuster, described in item (49), the object for test is located in the proximity of a visual field or a photographic field.

(99) In an adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster, described in item (51) or (52), the object for test is located in the proximity of a visual field or a photographic field.

(100) In an adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster, described in item (53), the object for test is located in the proximity of a visual field or a photographic field.

(101) In a manufacturing method of an optical apparatus provided with a variable optical-property element or an optical apparatus provided with a variable optical-property element made by the manufacturing method, described in item (55), the object for test is located in the proximity of a visual field or a photographic field.

(102) In a manufacturing method of an optical apparatus provided with a variable optical-property element, a control method of an optical apparatus provide with a variable optical-property element, or an optical apparatus provided with a variable optical-property element made by the manufacturing method, described in any one of items (64)-(66), the object for test is located in the proximity of a visual field or a photographic field.

(103) In a manufacturing method of an optical apparatus provided with a variable optical-property element or an optical apparatus provided with a variable optical-property element made by the manufacturing method, described in item (70), the object for test is located in the proximity of a visual field or a photographic field.

(104) In a manufacturing method of an optical apparatus provided with a variable optical-property element, a control method of an optical apparatus provide with a variable optical-property element, or an optical apparatus provided with a variable optical-property element made by the manufacturing method, described in item (71) or (72), the object for test is located in the proximity of a visual field or a photographic field.

(105) In an adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster, described in item (74) or (75), the object for test is located in the proximity of a visual field or a photographic field.

(106) In an adjusting method of an optical apparatus provided with a variable optical-property element and a zoom optical system, an adjuster of an optical apparatus provided with a variable optical-property element and a zoom optical system, or an optical apparatus provided with a variable optical-property element adjusted by the adjusting method or the adjuster, described in item (76), the object for test is located in the proximity of a visual field or a photographic field.

(107) In an adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster, described in item (78) or (79), the object for test is located in the proximity of a visual field or a photographic field.

(108) In an adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster, described in item (80), the object for test is located in the proximity of a visual field or a photographic field.

(109) In an adjusting method of an optical apparatus provided with a variable optical-property element and a zoom optical system, an adjuster of an optical apparatus provided with a variable optical-property element and a zoom optical system, or an optical apparatus provided with a variable optical-property element adjusted by the adjusting method or the adjuster, described in item (81), the object for test is located in the proximity of a visual field or a photographic field.

(110) In an adjusting method of an imaging device provided with a variable optical-property element and a zoom optical system, described in item (82), the object for test is located in the proximity of a visual field or a photographic field.

(111) A manufacturing method of an optical apparatus provided with a variable mirror or an optical apparatus provided with a variable mirror made by the manufacturing method is such that an object for test is located at a preset position where its distance is known, driving information is provided to the variable mirror in accordance with the distance, an image of the object for test is photographed, and the position of an image sensor is adjusted and fixed so that the focus or contrast of the image becomes nearly best. In this case, the object for test is located in the proximity of a visual field or a photographic field to compensate a manufacturing error of an optical system.

(112) In a manufacturing method of an optical apparatus provided with a variable mirror, a control method of an optical apparatus provide with a variable mirror, or an optical apparatus provided with a variable mirror made by the manufacturing method, described in any one of items (8)-(10), the object for test is located in the proximity of a visual field or a photographic field to compensate a manufacturing error of an optical system.

(113) In a manufacturing method of an optical apparatus provided with a variable mirror or an optical apparatus provided with a variable mirror made by the manufacturing method, described in item (14), the object for test is located in the proximity of a visual field or a photographic field to compensate a manufacturing error of an optical system.

(114) In a manufacturing method of an optical apparatus provided with a variable mirror, a control method of an optical apparatus provide with a variable mirror, or an optical apparatus provided with a variable mirror made by the manufacturing method, described in item (15) or (16), the object for test is located in the proximity of a visual field or a photographic field to compensate a manufacturing error of an optical system.

(115) In an adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster, described in item (18) or (19), the object for test is located in the proximity of a visual field or a photographic field to compensate a manufacturing error of an optical system.
(116) In an adjusting method of an optical apparatus provided with a variable mirror and a zoom optical system, an adjuster of an optical apparatus provided with a variable mirror and a zoom optical system, or an optical apparatus provided with a variable mirror adjusted by the adjusting method or the adjuster, described in item (20), the object for test is located in the proximity of a visual field or a photographic field to compensate a manufacturing error of an optical system.
(117) In an adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster, described in item (22) or (23), the object for test is located in the proximity of a visual field or a photographic field to compensate a manufacturing error of an optical system.
(118) In an adjusting method of an imaging device provided with a variable mirror and a zoom optical system, an adjuster of an imaging device provided with a variable mirror and a zoom optical system, or an imaging device provided with a variable mirror adjusted by the adjusting method or the adjuster, described in item (24), the object for test is located in the proximity of a visual field or a photographic field to compensate a manufacturing error of an optical system.
(119) In an adjusting method of an optical apparatus provided with a variable focal-length lens and a zoom optical system, an adjuster of an optical apparatus provided with a variable focal-length lens and a zoom optical system, or an optical apparatus provided with a variable focal-length lens adjusted by the adjusting method or the adjuster, described in item (25), the object for test is located in the proximity of a visual field or a photographic field to compensate a manufacturing error of an optical system.
(120) In an adjusting method of an imaging device provided with a variable focal-length lens and a zoom optical system, described in item (26), the object for test is located in the proximity of a visual field or a photographic field to compensate a manufacturing error of an optical system.
(121) In a manufacturing method of an optical apparatus provided with a variable focal-length lens or an optical apparatus provided with a variable focal-length lens made by the manufacturing method, described in item (28), the object for test is located in the proximity of a visual field or a photographic field to compensate a manufacturing error of an optical system.
(122) In a manufacturing method of an optical apparatus provided with a variable focal-length lens, a control method of an optical apparatus provide with a variable focal-length lens, or an optical apparatus provided with a variable focal-length lens made by the manufacturing method, described in any one of items (37)-(39), the object for test is located in the proximity of a visual field or a photographic field to compensate a manufacturing error of an optical system.
(123) In a manufacturing method of an optical apparatus provided with a variable focal length lens or an optical apparatus provided with a variable focal-length lens made by the manufacturing method, described in item (43), the object for test is located in the proximity of a visual field or a photographic field to compensate a manufacturing error of an optical system.
(124) In a manufacturing method of an optical apparatus provided with a variable focal-length lens, a control method of an optical apparatus provide with a variable focal-length lens, or an optical apparatus provided with a variable focal-length lens made by the manufacturing method, described in item (44) or (45), the object for test is located in the proximity of a visual field or a photographic field to compensate a manufacturing error of an optical system.
(125) In an adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster, described in item (47) or (48), the object for test is located in the proximity of a visual field or a photographic field to compensate a manufacturing error of an optical system.
(126) In an adjusting method of an optical apparatus provided with a variable focal-length lens and a zoom optical system, an adjuster of an optical apparatus provided with a variable focal-length lens and a zoom optical system, or an optical apparatus provided with a variable focal-length lens adjusted by the adjusting method or the adjuster, described in item (49), the object for test is located in the proximity of a visual field or a photographic field to compensate a manufacturing error of an optical system.
(127) In an adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster, described in item (51) or (52), the object for test is located in the proximity of a visual field or a photographic field to compensate a manufacturing error of an optical system.
(128) In an adjusting method of an imaging device provided with a variable focal-length lens and a zoom optical system, an adjuster of an imaging device provided with a variable focal-length lens and a zoom optical system, or an imaging device provided with a variable focal-length lens adjusted by the adjusting method or the adjuster, described in item (53), the object for test is located in the proximity of a visual field or a photographic field to compensate a manufacturing error of an optical system.
(129) In a manufacturing method of an optical apparatus provided with a variable optical-property element or an optical apparatus provided with a variable optical-property element made by the manufacturing method, described in item (55), the object for test is located in the proximity of a visual field or a photographic field to compensate a manufacturing error of an optical system.
(130) In a manufacturing method of an optical apparatus provided with a variable optical-property element, a control method of an optical apparatus provide with a variable optical-property element, or an optical apparatus provided with a variable optical-property element made by the manufacturing method, described in any one of items (64)-(66), the object for test is located in the proximity of a visual field or a photographic field to compensate a manufacturing error of an optical system.
(131) In a manufacturing method of an optical apparatus provided with a variable optical-property element or an optical apparatus provided with a variable optical-property element made by the manufacturing method, described in item (70), the object for test is located in the proximity of a visual field or a photographic field to compensate a manufacturing error of an optical system.

(132) In a manufacturing method of an optical apparatus provided with a variable optical-property element, a control method of an optical apparatus provide with a variable optical-property element, or an optical apparatus provided with a variable optical-property element made by the manufacturing method, described in item (71) or (72), the object for test is located in the proximity of a visual field or a photographic field to compensate a manufacturing error of an optical system.

(133) In an adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster, described in item (74) or (75), the object for test is located in the proximity of a visual field or a photographic field to compensate a manufacturing error of an optical system.

(134) In an adjusting method of an optical apparatus provided with a variable optical-property element and a zoom optical system, an adjuster of an optical apparatus provided with a variable optical-property element and a zoom optical system, or an optical apparatus provided with a variable optical-property element adjusted by the adjusting method or the adjuster, described in item (76), the object for test is located in the proximity of a visual field or a photographic field to compensate a manufacturing error of an optical system.

(135) In an adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster, described in item (78) or (79), the object for test is located in the proximity of a visual field or a photographic field to compensate a manufacturing error of an optical system.

(136) In an adjusting method of an imaging device provided with a variable optical-property element and a zoom optical system, an adjuster of an imaging device provided with a variable optical-property element and a zoom optical system, or an imaging device provided with a variable optical-property element adjusted by the adjusting method or the adjuster, described in item (80), the object for test is located in the proximity of a visual field or a photographic field to compensate a manufacturing error of an optical system.

(137) In an adjusting method of an optical apparatus provided with a variable optical-property element and a zoom optical system, an adjuster of an optical apparatus provided with a variable optical-property element and a zoom optical system, or an optical apparatus provided with a variable optical-property element adjusted by the adjusting method or the adjuster, described in item (81), the object for test is located in the proximity of a visual field or a photographic field to compensate a manufacturing error of an optical system.

(138) In an adjusting method of an imaging device provided with a variable optical-property element and a zoom optical system, described in item (82), the object for test is located in the proximity of a visual field or a photographic field to compensate a manufacturing error of an optical system.

(139) In a control method of a variable optical-property element and an optical apparatus having the control method, the control method includes the following procedure:
1. a temporary control signal is provided to the variable optical-property element to photograph an image in a state of the variable optical-property element governed by the control signal,
2. a signal for somewhat deforming the variable optical-property element is provided to the variable optical-property element to photograph another image in a state of a deformed variable optical-property element,
3. the high-frequency components of these two photographed images are compared and a larger value of the high-frequency components is thought of as the temporary control signal, and
4. the above steps 1-3 are repeated to find a control signal where the high-frequency component is maximized.

(140) An optical apparatus includes a deformable optical element, a circuit driving the deformable optical element, and an imaging means. In this case, a control method of the deformable optical element is to compensate a change of an imaging state caused by at least one factor of an ambient change, an individual difference, an object distance, and a zoom state through a means for evaluating the imaging state, a means for slightly changing the shape of the deformable optical element, and a means for determining a degree of improvement of the imaging state involved in the shape change of the deformable optical element.

(141) An optical apparatus includes a deformable optical element, a circuit driving the deformable optical element, an imaging means, and a look-up table (LUT) recording basic deformation patterns of the deformable optical element. In this case, in order to compensate a change of an imaging state caused by at least one factor of an ambient change, an individual difference, an object distance, and a zoom state, a control method of the deformable optical element has a means for evaluating the imaging state where the deformable optical element is deformed in accordance with the basic deformation patterns recorded in the LUT and a means for determining a degree of improvement of the imaging state of an optical system where the deformable optical element is deformed in accordance with the basic deformation patterns.

(142) An optical apparatus has control means of the control method set forth in item (140) or (141).

(143) A control method of a deformable optical element has the control method set forth in item (141) as a first step means and the control method set forth in item (140) as a second step means.

(144) The control method set forth in item (140) further has a means for storing the shape of an optical working surface of the deformable optical element, a means for changing the shape of the optical working surface by a shape control mechanism, a means for repeating processing in accordance with the number of shape control mechanisms, and a means for determining whether the shape of the optical working surface of the deformable optical element is the same.

(145) A control method of an optical system has a means for storing the imaging state of the optical system, a means for storing the degree of improvement of an imaging state where individual shape control mechanisms are operated to slightly change the shape of the optical working surface, a means for determining the next shape of the optical working surface in accordance with the degree of improvement of the imaging state stored in the storing means, and a means for determining whether there is the possibility of a further improvement by comparing the imaging state of the optical system in the next shape of the optical working surface with the imaging state stored.

(146) A control method of a deformable optical element in an optical apparatus including the deformable optical element, a circuit driving the deformable optical element, and an imaging means is such that the imaging state of the optical apparatus is acquired; the shape of the deformable optical element is slightly changed; the imaging state of the optical apparatus involved in this shape change is acquired; an imaging state after the shape change of the deformable optical element is compared with that before the shape change to evaluate the degree of improvement of the imaging state; and this processing is repeated until the imaging state ceases to be improved in order to compensate the change of the imaging state caused by at least one factor of an ambient change, an individual difference, an object distance, and a zoom state. In this case, a predetermined control signal (an applied voltage or current) is set (supplied) to the i-th control mechanism provided in the deformable optical element and thereby the imaging state of the optical apparatus where an optical working surface is deformed is acquired (by the intensity of the frequency component of an image obtained by using an imaging means or the intensity of light); the control signal is slightly changed and is set to the i-th control mechanism provided in the deformable optical element and thereby the imaging state of the optical apparatus where the optical working surface is deformed is acquired; the imaging state immediately before the surface is deformed is compared with a new imaging state so that when the imaging state is improved, a new control signal and imaging state are held, while when the imaging state is not improved, an original control signal and imaging state are used again; such processing is repeated with respect to all control mechanisms including a control mechanism $Z(i)$ (where i is 1–N and N is the full number of control mechanisms); and when the shape of the optical working surface at a point of time where the evaluation of the imaging state is finished with respect to a control mechanism $Z(N)$ is different from an original surface shape, processing is started again from the first.

(147) A control method of a deformable optical element in an optical apparatus including the deformable optical element, a circuit driving the deformable optical element, and an imaging means is such that the imaging state of the optical apparatus is acquired; the shape of the deformable optical element is slightly changed; the imaging state of the optical apparatus involved in this shape change is acquired; an imaging state after the shape change of the deformable optical element is compared with that before the shape change to evaluate the degree of improvement of the imaging state; and this processing is repeated until the imaging state ceases to be improved in order to compensate the change of the imaging state caused by at least one factor of an ambient change, an individual difference, an object distance, and a zoom state. In this case, a predetermined control signal (an applied voltage or current) is set (supplied) to the i-th control mechanism provided in the deformable optical element and thereby the imaging state of the optical apparatus where an optical working surface is deformed is acquired (by the intensity of the frequency component of an image obtained by using an imaging means or the intensity of light); the control signal is slightly changed and is set to the i-th control mechanism provided in the deformable optical element and thereby the imaging state of is the optical apparatus where the optical working surface is deformed is acquired; the imaging state immediately before the change is compared with a new imaging state so that when the imaging state is improved, this control signal and imaging state are held, the control signal is further slightly changed and is set to the control mechanism to thereby acquire the imaging state of the optical apparatus where the optical working surface is deformed, the imaging state immediately before the surface is deformed is compared with a new imaging state, and this processing is repeated until the imaging state ceases to be improved, while when the imaging state is not improved, an original control signal and imaging state are used again and such processing is repeated with respect to all control mechanisms including a control mechanism $Z(i)$ (where i is 1–N and N is the full number of control mechanisms).

(148) A control method of a deformable optical element in an optical apparatus including the deformable optical element, a circuit driving the deformable optical element, and an imaging means is such that the imaging state of the optical apparatus is acquired; the shape of the deformable optical element is slightly changed; the imaging state of the optical apparatus involved in this shape change is acquired; an imaging state after the shape change of the deformable optical element is compared with that before the shape change to evaluate the degree of improvement of the imaging state; and this processing is repeated until the imaging state ceases to be improved in order to compensate the change of the imaging state caused by at least one factor of an ambient change, an individual difference, an object distance, and a zoom state. In this case, a control signal $X(i)$ (where i is 1–N and N is the full number of control mechanisms) of an initial value is set to a control mechanism $Z(i)$; the control signal $X(i)$ set to the control mechanism $Z(i)$ is stored in a preset storage area $W_{X(i)}$ provided in the optical apparatus; an imaging state A1 of the optical apparatus is acquired in a state where the control signal $X(i)$ is provided; a value $X(i)+\delta X$ where the control signal $X(i)$ is slightly changed is set to the i-th control mechanism $Z(i)$; an imaging state A2 of the optical apparatus in this case is acquired; this imaging state A2 is applied to an evaluation function for quantitatively expressing the imaging state of the optical system to calculate a function value Y2; a change rate $C(i)$ $(=|Y2-Y1|/\delta X)$ of the evaluation function relating to a slight change $\delta X$ of the control signal $X(i)$ is found in the proximity of the imaging state A1; this change rate $C(i)$ is stored in a preset storage area $W_{C(i)}$ provided in the optical apparatus; the control signal $X(i)$ stored in the preset storage area $W_{X(i)}$ is set to the control mechanism $Z(i)$ to repeat processing from the acquirement of the imaging state A2 to the acquirement of the change rate $C(i)$ with respect to all control mechanisms including the control mechanism $Z(i)$; the change rate of the evaluation function stored in the preset storage area $W_{C(i)}$ is used to find a parameter $m(i)$ of a control signal $X'(i)=X(i)+m(i)\delta X$, bringing about a better imaging state than the imaging state A1; the parameter $m(i)$ bringing about the better imaging state is stored in a preset storage area $W_{m(i)}$ provided in the optical apparatus; the value of $\Sigma C(i)m(i)\delta X$ is calculated; whether the imaging state A1 is in the best imaging state is determined in accordance with the value of $\Sigma C(i)m(i)\delta X$; until the amount of change of the evaluation function is kept within a constant limit, the parameter of the imaging state stored in the storage area $W_{m(i)}$ is used to make the new control signal $X'(i)$, which is set to the control mechanism $Z(i)$; and the storage of the control signal $X(i)$ set to the control mechanism $Z(i)$ in the preset storage area $W_{X(i)}$ provided in the optical apparatus and processing after the acquirement of the imaging state A1 of the optical apparatus are repeated again.

(149) A control method of a deformable optical element in an optical apparatus including the deformable optical element, a circuit driving the deformable optical element, an imaging means, and a look-up table (LUT) recording basic deformation patterns of the deformable optical element is such that a value X(i) (where i is 1–N and N is the full number of control mechanisms) of a control signal (an applied voltage or current) to be set to a control mechanism Z(i) is extracted as a piece of basic deformation pattern data from the LUT recording a plurality of patterns; the control signal X(i) of this basic deformation pattern data is set to the control mechanism Z(i) provided in the deformable optical element, and thereby an imaging state A1 of the optical apparatus where an optical working surface is deformed is acquired (by the intensity of the frequency component of an image obtained by using an imaging means or the intensity of light); the next basic deformation pattern data is taken out from the LUT; the control signal X(i) of this basic deformation pattern data is set to the control mechanism Z(i) provided in the deformable optical element, and thereby an imaging state A2 of the optical apparatus where the optical working surface is deformed is acquired; the imaging state A1 is compared with the imaging state A2 so that when the imaging state is improved, the basic deformation pattern data of the control signal X(i) in an improved imaging state is stored and the value of the imaging state A2 is transferred to the imaging state A1; processing from the acquirement of the imaging state A2 to the comparison between the imaging states A1 and A2 is repeated with respect to all basic deformation pattern data of the LUT; and the control signal X(i) of the basic deformation pattern data stored is set to the control mechanism Z(i) to return to the imaging state in this case.

(150) An optical apparatus has a control means of the control method set forth in any one of item (146)-(149).

(151) A control method of a deformable optical element is such that an LUT constructed with different basic deformation pattern data is classified in accordance with conditions, such as an ambient change of temperature or humidity, an individual difference, an object distance, and a zoom state, to constitute an LUT group; photographic information on operation is input through a detecting means, not illustrated; an LUT most suitable for the working condition of the optical apparatus is selected from the LUT group through a control means, not illustrated, in accordance with this input information; and the control method described in item (149) is used to search the surface shape of the deformable optical element which is obtained from an imaging state closest to the best imaging state in the LUT.

(152) A control method of a deformable optical element is such that at a first step, the control of an optical working surface is made by the control method described in item (149) to search the surface shape of the deformable optical element which is obtained from an imaging state closest to the best imaging state in the LUT, and at a second step, the control of the optical working surface is made by the control method described in any one of items (146)-(148) and the shape of the optical working surface of the deformable optical element is feedback controlled so that the best imaging state is obtained.

(153) A control method of a deformable optical element is such that at a first step, the control of an optical working surface is made by the control method described in item (151) and an LUT most suitable for the working condition of the optical apparatus is selected from an LUT group constructed with different basic deformation pattern data classified in accordance with conditions, such as an ambient change of temperature or humidity, an individual difference, an object distance, and a zoom state to search the surface shape of the deformable optical element which is obtained from an imaging state closest to the best imaging state in the LUT, and at second step, the control of the optical working surface is made by the control method described in any one of items (146)-(148) and the shape of the optical working surface of the deformable optical element is feedback controlled so that the best imaging state is obtained.

Embodiments

In accordance with the drawings, the embodiments of the present invention will be described below.

Figure 2:
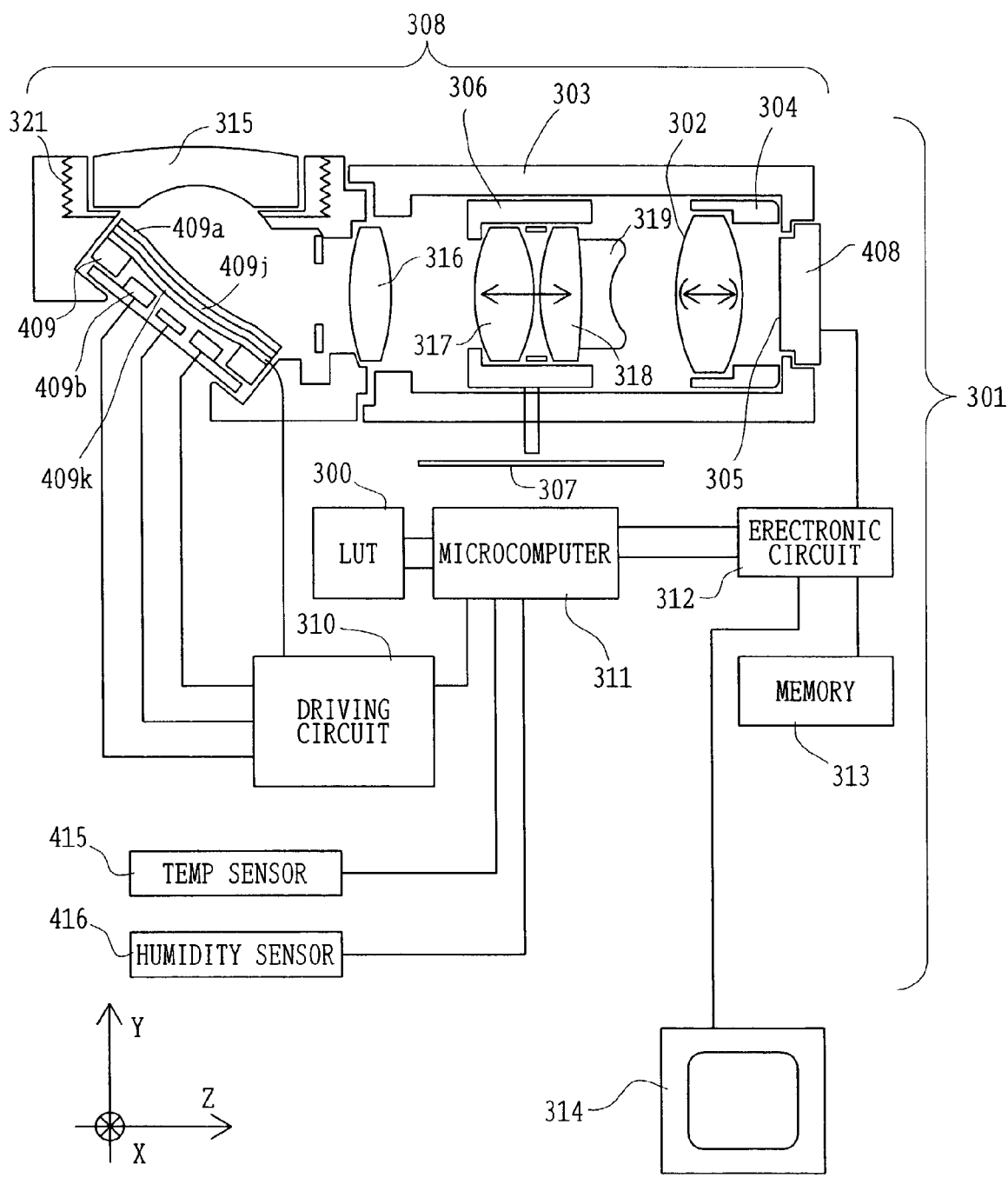
FIG. 2 is a view schematically showing the electronic imaging device using the variable mirror of another embodiment in the present invention.

FIG. 1 shows a single focal lens type electronic imaging device 301 using a variable mirror 409 of one embodiment in the present invention. FIG. 2 shows the electronic imaging device 301 using the variable mirror 409 of another embodiment in the present invention. Also, a TV monitor 314 is connected to the exterior of the electronic imaging device 301.

The electronic imaging device 301 shown in FIG. 1 is constructed with a concave lens 315, the variable mirror 409, a variable mirror driving circuit 310, a convex lens 316 which is a single focal lens, and a solid-state image sensor 408. Focusing for a change of an object distance is compensated by the variable mirror 409.

The electronic imaging device 301 shown in FIG. 2 includes the concave lens 315, the variable mirror 409, the variable mirror driving circuit 310, the convex lens 316, a convex lens 317 constituting a zoom lens, an aspherical convex lens 318 and a concave lens 319, a lens 302, and the solid-state image sensor 408. Either the shift of a focus position where the object distance is changed or a focus movement where the magnification of this optical system is changed, or both, are compensated by the variable mirror 409.

Each of such electronic imaging devices is used, for example, in a TV camera, a digital camera, an imaging device of a cellular phone, a camcorder, a monitoring camera, a robot's eye, etc.

The variable mirror 409 is a variable optical-property deformable mirror comprised of a thin film (reflecting surface) 409a of an aluminum coating and a plurality of electrodes 409b, which are constructed integrally with a deforming substrate 409j sandwiched between the reflecting surface 409a and a deforming electrode 409k.

The variable mirror driving circuit 310 is connected to individual electrodes 409b and the electrode 409k so that the variable mirror 409 can be driven.

In FIG. 1, reference numeral 300 represents a look-up table (LUT); 303, a lens barrel; 311, a microcomputer; 312, an electronic circuit; 313, a memory; 415, a temperature sensor; and 416, a humidity sensor. In FIG. 2, reference numerals 304 and 306 represent lens frames. These are provided as shown in the figures and constitute the single electronic imaging device 301 in each of FIGS. 1 and 2.

Now consider photography of a digital camera using the electronic imaging device 301 of FIG. 1. It is assumed here that the convex lens 316 and the lens barrel 303 are made of plastic.

It is assumed that, for example, at least one of the plastic lens 316, the plastic lens barrel 303, and the substrate 409j is expanded or contracted by a temperature change. In this case, the imaging position of an image obtained by the image sensor 408 is shifted from an imaging plane 305. Moreover, aberration of the image is changed.

Figure 3:
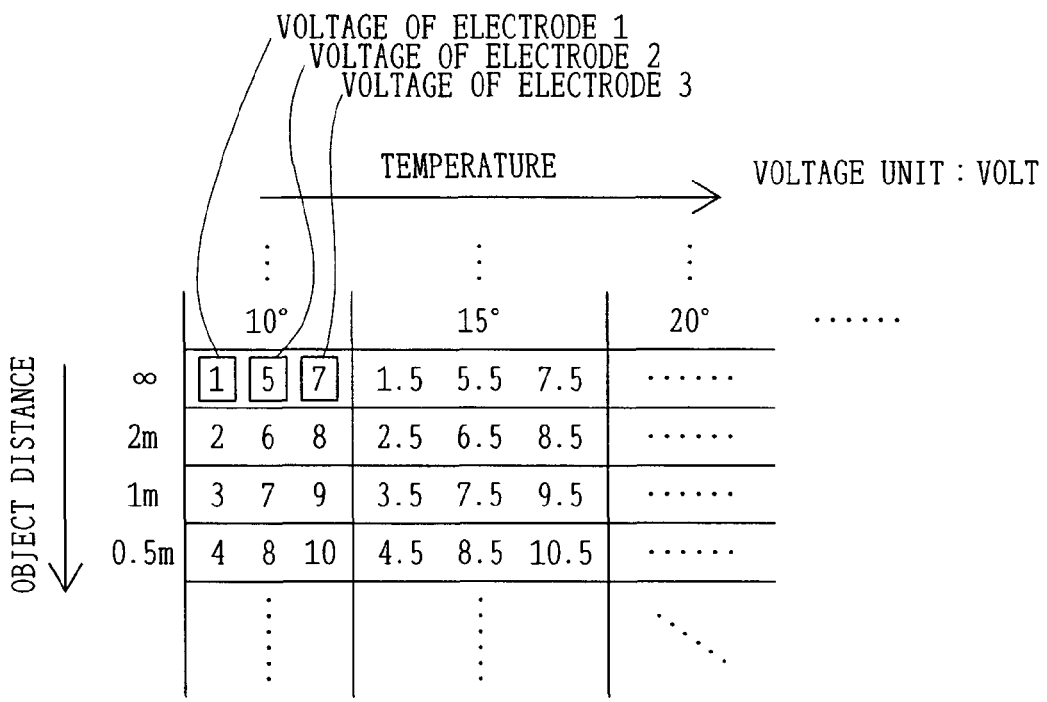
FIG. 3 is an explanatory view showing one example of a look-up table (LUT) used in the present invention.

In order to compensate this shift, the variable mirror 409 is driven through the microcomputer 311 as follows:

It is assumed that, in FIG. 3, voltages applied to the variable mirror 409 have, for example, values (3.5, 7.5, 9.5) at a temperature of 15° and an object distance of 1 m. In this state, photographing is performed and a photographed image is recorded. Subsequently, referring to the LUT 300, values (3, 7, 9) at a temperature of 10° and an object distance of 1 m are selected. The voltages of these values are applied to the plurality of electrodes 409b of the variable mirror 409 to deform the reflecting surface 409a. An image is photographed through the solid-state image sensor 408 and a photographed image is recorded. Then, values at a temperature of 20° and an object distance of 1 m are selected. The voltages of these values are applied to the electrodes 409b to deform the reflecting surface 409a, and an image is photographed and recorded.

In this way, reference to the LUT 300 is repeated in turn to deform the variable mirror 409 each time, and some images are photographed and recorded through the solid-state image sensor 408.

Figure 5:
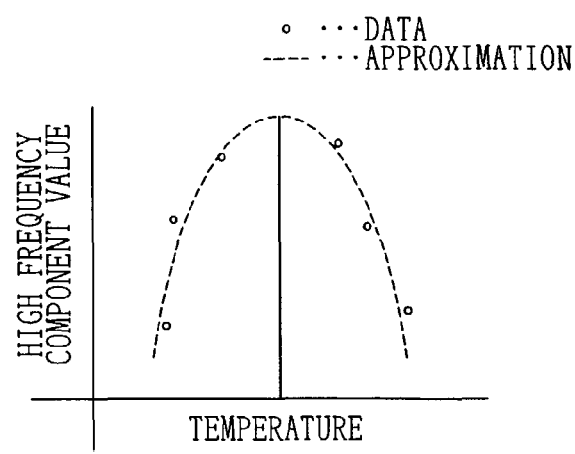
FIG. 5 is a graph of the high-frequency component plotted against the temperature where photographing is performed by a digital camera using the electronic imaging device of FIG. 1 so that the temperature is changed to refer to the LUT, a voltage is applied to the variable mirror by a value thus obtained to deform the variable mirror, an image is formed through a solid-state image sensor, and the high-frequency component is calculated from this image.

High-frequency components are calculated from these images. The high-frequency components in individual images are plotted in FIG. 5. In this figure, an approximate equation is found from discrete data, and a temperature where the high-frequency component is maximized is found from this approximate equation. If there are values corresponding to this temperature in the LUT 300, data at the temperature are furnished to the variable mirror 409. If not, two temperature data of closest values in the LUT are used to calculate data furnished to the variable mirror 409.

It is desirable that the LUT for reference in this case, as illustrated in FIG. 3, is constructed two-dimensionally in such a way that one data axis is taken as the object distance and the other data axis is taken as the temperature.

The temperature may include a negative value. In FIG. 3, a difference between two adjacent temperature values is 5°, but it may be as small as 1° or 0.5°. By doing so, the value (applied voltage) where the high-frequency component of the image is maximized can be calculated (assumed) more accurately. Also, this is not limited to the temperature and also holds for the object distance (for example, object distance values are set at intervals of 0.1 m).

The calculation of the high-frequency component of the image may be performed each time the image is photographed. By doing so, recording all the images becomes unnecessary.

In the disclosure so far, reference has been made to the case where the temperature is changed to calculate data applied to the variable mirror 409. However, in the case where the temperature is detected by the temperature sensor 415, the voltages applied to the variable mirror 409 may be changed in accordance with numerical values of a table in the LUT in which the object distance is changed with respect to a table group in the LUT corresponding to the temperature.

An image shift by the temperature change is different in amount from that by the object distance change. Thus, when the LUT constructed two-dimensionally as described above is used, the image shift can be corrected more accurately.

Figure 4:
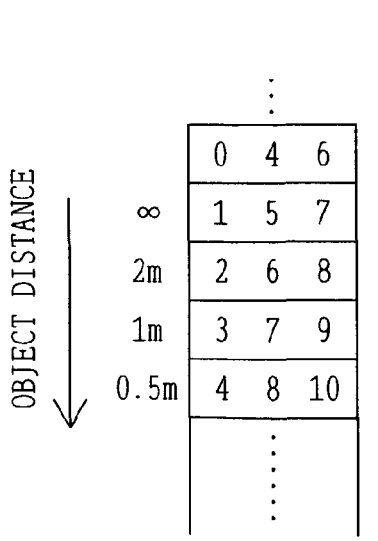
FIG. 4 is an explanatory view showing another example of the LUT used in the present invention.

Alternatively, the LUT, as shown in FIG. 4, may be constructed one-dimensionally with only the object distance. In this case, temperature detection is not necessary and the temperature change may be thought of as the object distance change to drive the variable mirror 409. This somewhat impairs accuracy, but has the merit that the LUT can be simplified.

Figure 6:
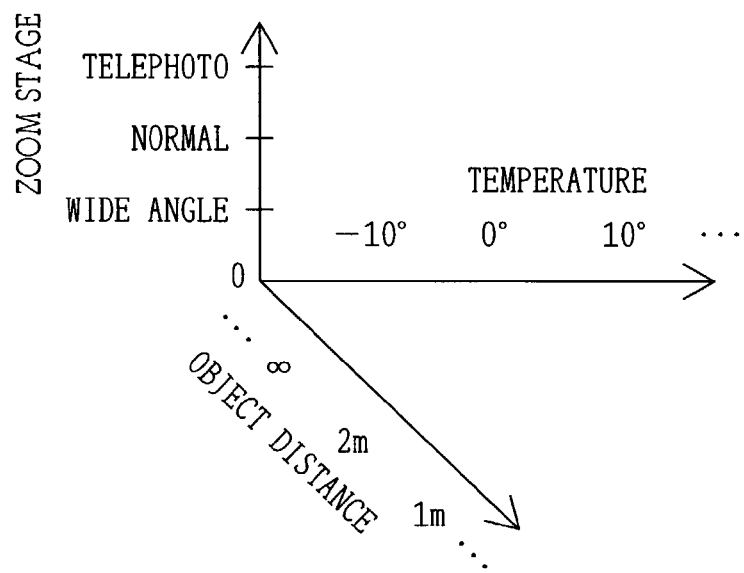
FIG. 6 is an explanatory view showing still another example of the LUT used in the present invention.

As another case, when the electronic imaging device is provided with a zoom lens such as that shown in FIG. 2, it is recommended that the LUT, as illustrated in FIG. 6, is constructed three-dimensionally with the object distance, the temperature, and the zoom state.

In this case, to see a zoom state of the zoom lens, as shown in FIG. 2, an encoder 307 may be provided so that the zoom state is assumed from the position of the zoom lens. Alternatively, when the lens frame 306 is driven by a pulse motor, the number of pulses may be counted so that the zoom state is assumed.

Figure 7:
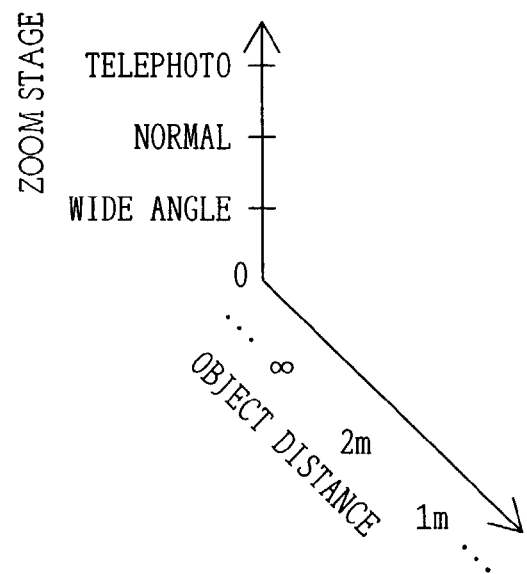
FIG. 7 is an explanatory view showing a further example of the LUT used in the present invention.

As shown in FIG. 2, when the electronic imaging device 301 has the zoom lens, the degree of freedom of the temperature change may be neglected, as illustrated in FIG. 7, to use an LUT constructed two-dimensionally with the zoom state and the object distance. In this case, the temperature change is thought of as the object distance change.

Alternatively, the LUT constructed one-dimensionally with the object distance alone may be used. In this case, the focus movement attributable to temperature and zoom is compensated by driving the variable mirror 409 in terms of the object distance change.

In the above disclosure, reference has been chiefly made to correction for the focus movement and the fluctuation of aberration where the temperature is changed. However, even when humidity, instead of the temperature, is changed, the focus movement and the fluctuation of aberration can be corrected as mentioned above. In this case, it is only necessary to detect the humidity through the humidity sensor 416.

A current or the volume of a fluid may be used, instead of the voltage, to make correction, depending on the driving system of the variable mirror. In the present invention, such values are referred to as driving information. The voltage, current, or fluid is also referred to as a driving source.

The lens 302 may be made of rubber, synthetic resin, or organic or inorganic hybrid material, in addition to plastic. It may, of course, be made of glass. The lens barrel 303 may be made of metal.

Figure 8:
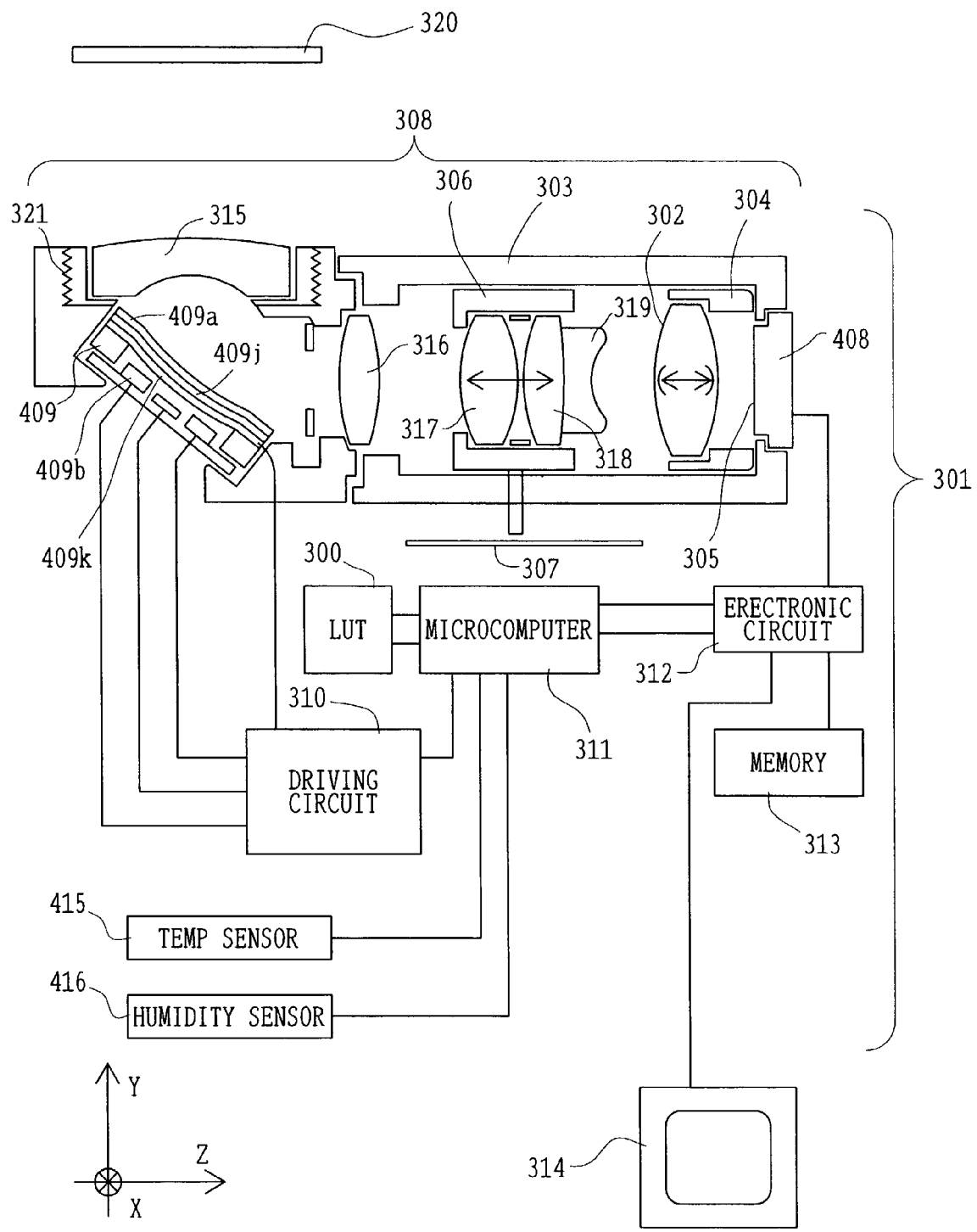
FIG. 8 is a schematic view for explaining an assembly process of the electronic imaging device of FIG. 2.

Subsequently, a description is given of an assembly process of the electronic imaging device, using FIG. 8. Also, the assembly of the electronic imaging device 301 shown in FIG. 2 is described here.

In front of the lens 315, a resolution chart 320 is placed as an example of an object for test at a preset position where a distance is known. Also, a bright spot, the image of a collimator, or the image of a test chart by a lens, may be used instead of the resolution chart 320. Such an example is also assumed to come into the category of the object for test.

First, the lens frame 306 of the zoom lens is located at a position in a reference state. In this reference state, when a choice is made so that the absolute value of the magnification of the lenses 317-319 becomes 1, adjustment can be made with good accuracy.

Then, the voltage (design value) of an initial value according to the object distance to the resolution chart 320 is applied to the variable mirror 409. The solid-state image sensor 408 is moved back and forth along the optical axis (Z axis) and is located and fixed at a position where the contrast of a chart image is optimized.

Where a mounting error caused when the solid-state image sensor 408 is fixed weighs on one's mind (comes into question), the following adjustment is made.

After the solid-state image sensor 408 has been located and fixed, the resolution chart is photographed again. Next, the voltage applied to the variable mirror 409 is finely adjusted so that the focusing and contrast of the chart image becomes best. A value obtained by the above design value or this fine adjustment is used to optically carry out a simulation. It is only necessary to calculate a proper applied voltage at each distance from the simulation and register this result as data in the LUT. By doing so, the data of the LUT can be obtained from the position of one resolution chart. Actual photographing is performed while referring to the value of the LUT finely adjusted in this way.

If the resolution chart 320 is set at some kinds of positions and an optimum applied voltage to the variable mirror at each position is determined in accordance with an actually measured value, the focus adjustment can be made with respect to each distance. In this case, the applied voltage is found in accordance with not the simulation but the actually measured value. Hence, the data of the LUT can be obtained with a higher degree of accuracy.

Since the size of the image formed on the image sensor varies with the distance, a plurality of resolution charts 320 of different pattern sizes may be provided. For example, a fine pattern chart is provided for a short distance and a rough pattern chart for a long distance.

In this way, the focus adjustment may be made so that the image of the same size is formed on the solid-state image sensor 408 even though various distances are provided.

In order to finely adjust the voltage applied to the variable mirror 409, the value of the best focus may be selected from a preset LUT (for example, design values) so that the address of the LUT is stored. In this case, actual photographing is performed while referring to the address.

The methods discussed above can also be used for the focus adjustment of a single focal lens provided in an imaging device such as that shown in FIG. 1.

Even when variations arise on fabrication of the variable mirror 409, an imaging system 308, optical elements, or the lens barrel 303, the LUT is selected along the axis of the object distance and the voltage applied to the variable mirror 409 is changed to find a voltage that the high-frequency component of the image is maximized as the optimum voltage, in order to compensate the fluctuation of the image position or aberration caused by the variations. In this way, the variations may be corrected.

Subsequently, consider the case where the lens 302 is moved by cams, with the role of a compensator, together with the lenses 317-319 which are variators, when the zoom state is changed through the optical system provided in the electronic imaging device 301. That is, this refers to the case of a zoom optical system in which at least two or more lens units are moved. In this case, one or more motors are required for zooming.

The position of the lens frame 304 is detected by the number of pulses sent from the driving circuit to a driving stepping motor, not shown. A zoom optical system constructed so that at least two lens units are moved by the cam, using a single motor, is advantageous for cost and electric power.

In the zoom optical system in which two or more lens units are moved, the solid-state image sensor 408 and the concave lens 315 are first positioned as follows.

The variable mirror 409 is driven by reference driving information of the variable mirror (for example, the design value of the voltage or current) in regard to a reference object distance and zoom state. In this case, the lens frame 306 and the lenses 302 and 315 are moved to reference positions. The position of the solid-state image sensor 408 is adjusted and fixed once so that the focus or contrast of the resolution chart 320 becomes best.

The lens frame 306 and the lens 302 are then moved and individual zoom states are changed. At the same time, the variable mirror 409 is driven by the reference driving information of the variable mirror 409 in accordance with each zoom state. There is a design value as the driving information in this case.

The solid-state image sensor 408 is moved back and forth in the Z direction so that the contrast of the resolution chart 320 becomes best in each zoom state, and the position of the solid-state image sensor 408 is measured by a micrometer and stored. A change of the position of the solid-state image sensor 408 is an amount called a focus movement on zooming. The concave lens 315 and the convex lens 316, except for the lenses 317-319 and the lens 302, are moved so that the amount of the focus movement is minimized or within a tolerance. (Also, in FIG. 8, the imaging system is designed so that the concave lens 315 can be moved in the Y direction through a screw 321.

When the amount of the focus movement has been minimized or kept to within the tolerance, the concave lens 315 or the convex lens 316, except for the lenses 317-319 and the lens 302, is fixed.

The zoom state is changed again, and the position of the solid-state image sensor 408 is adjusted and fixed such that the focus movement on zooming is minimized and within the tolerance.

Also, in the above description, in order to reduce the amount of the focus movement on zooming, the concave lens 315 is moved through the screw 321 or the lens 316 is moved. Instead, the position of the lens 302 or the positions of the lenses 317-319 may be adjusted.

Foe example, where the lens 302 or the lens frame 306 is driven by the cam, the shape or position of the groove of the cam is changed. Where the lens 302 or the lenses 317-319 are driven by the stepping motor, the number of driving pulses may be changed. In either case, the position of the lens can be adjusted.

The position of the mirror or the variable mirror, instead of the lens, may be adjusted. That is, it is only necessary to adjust the position of an optical element.

In this case, the resolution chart 320 may be photographed in accordance with a combination of the object distance with the zoom state so that driving information such as a voltage or current value that the contrast of the chart becomes best is written in the LUT 300.

Alternatively, the LUT may be previously provided, for example, such as that shown in FIG. 7, so that the resolution chart 320 is photographed in accordance with a combination of the object distance with the zoom state and the read position of the LUT where the contrast of the chart becomes best is selected and stored in the memory.

When the read position of the LUT in this case is selected along the axial direction of the object distance, the resolution is easily kept above some level in a plurality of states. This is more favorable.

Also, the adjusting method where two lens units of the lenses 317-319 and the lens 302 are moved, described here, may, of course, be used for the adjustment of the imaging device provided with an optical compensating zoom lens using the variable mirror or a zoom lens using the variable mirror in which at least three lens units are moved.

Alternatively, it may be used for the adjustment of the imaging device provided with the zoom lens using the variable mirror in which only one lens unit is moved, described early.

If the zoom state is regarded as one, it can be used for the adjustment of the imaging device provided with the single focal lens. In this case, an adjusting process may be omitted, such as the write in the LUT or the selection of the read position of the LUT of the driving information of a voltage or current value that the contrast of the chart becomes best in accordance with the object distance with the zoom state.

In the adjusting method of the imaging system of the zoom lens in which two lens units are moved, mentioned above, the variable mirror is driven in accordance with reference driving information in each zoom state and the focus movement involved in zooming is studied. Instead, an ordinary mirror made of glass of the same shape as the variable mirror in each zoom state may be used for the adjustment. In this case, there is the merit that the error of the shape of the variable mirror on adjustment can be eliminated.

The scope of the present invention disclosed so far refers to the imaging device. However, not to speak of the imaging device, the same consideration can be applied to all the optical apparatuses, such as an observation device using the variable mirror, a display device, optical communication, an optical information processing device, etc.

Figure 20:
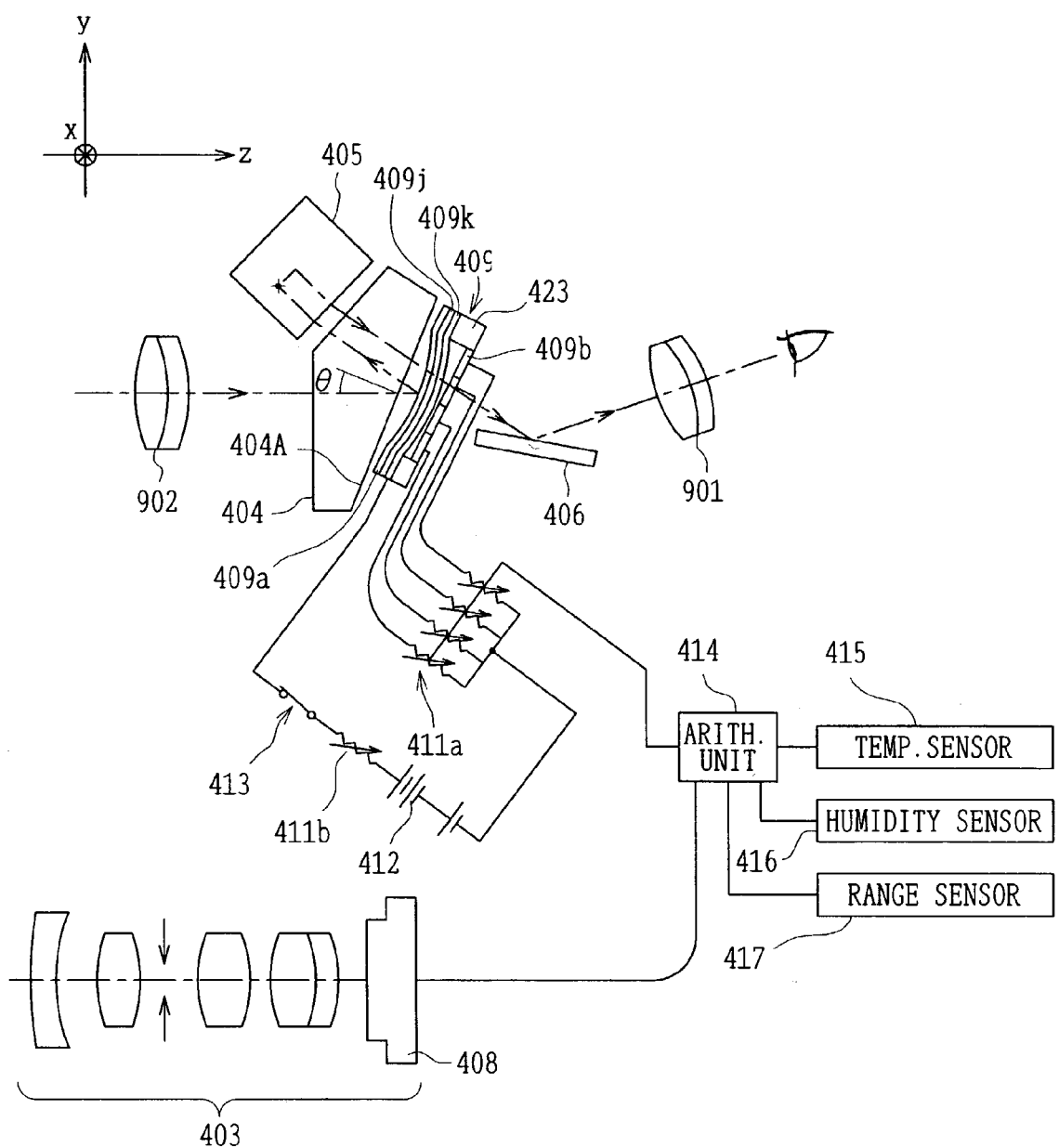
FIG. 20 is a diagram schematically showing a Keplerian finder for a digital camera used as the optical apparatus of the present invention which is an observation optical system in which a deformable mirror is used.

For example, in the finder of FIG. 20, variation of a diopter caused by a change of temperature or humidity or a manufacturing error can be corrected by shifting the read position of the LUT for driving the variable mirror in the direction of the object distance.

In the adjusting method of zooming or the focus adjustment where the finder provided with the variable mirror is assembled, the adjusting method of the zoom lens in which two lens units are moved can be used as it is.

It is only necessary to mount a reference TV camera instead of the eye and study the focus of a reference object as in the imaging device.

Also, although in the above description the variable mirror has been used in any example, the correcting, adjusting, or control method thereof is applicable equally well to the variable optical-property element such as the variable focal-length lens.

Figure 9:
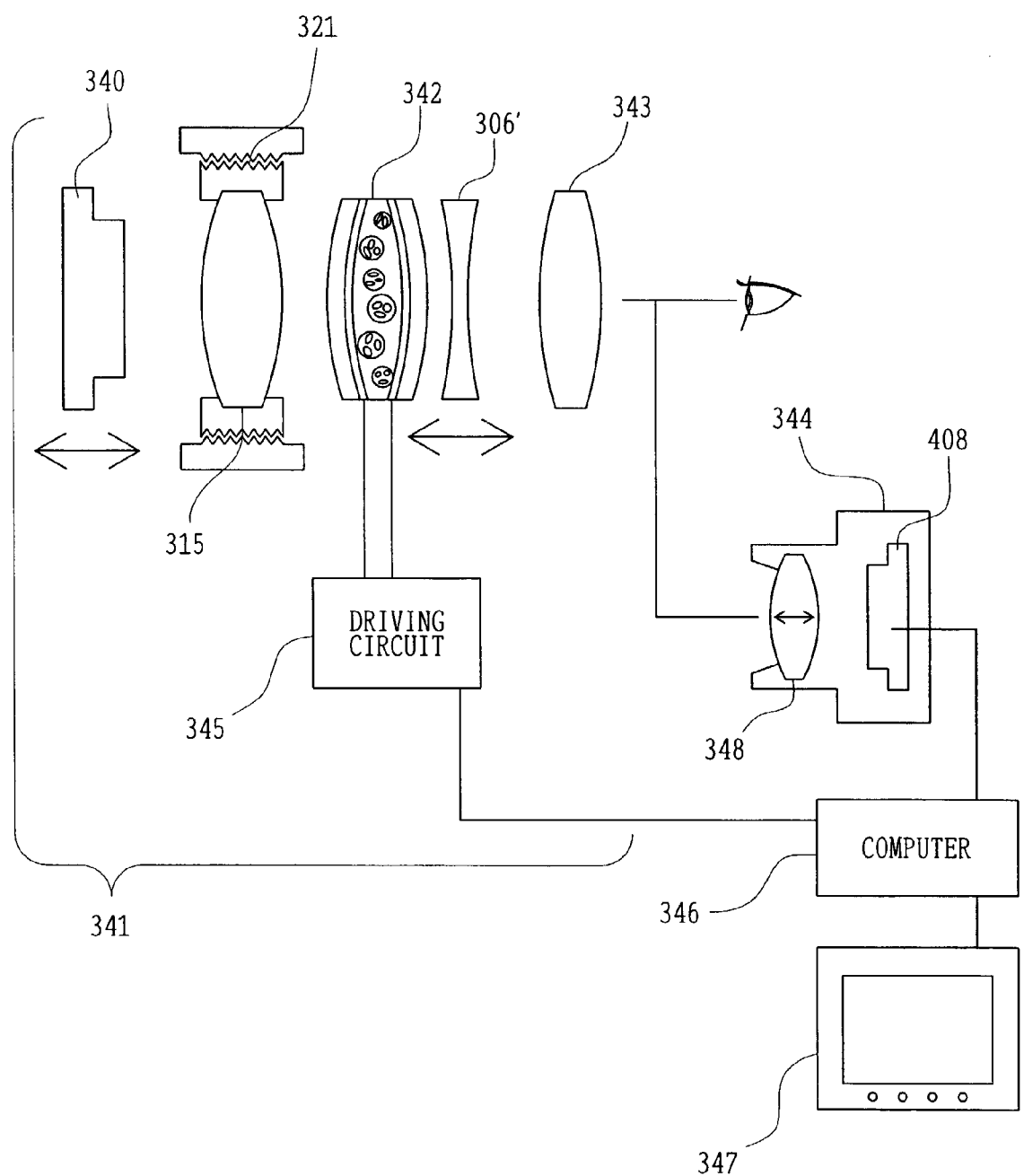
FIG. 9 is a view schematically showing an electronic viewfinder using a display element, such as an LCD, of another embodiment in the present invention.

FIG. 9 shows an electronic view-finder 341 using a display element 340, such as an LCD, of another embodiment in the present invention.

A variable liquid crystal focal-length lens 342 is used for compensation for the focus movement and variation of the diopter. In FIG. 9, reference numerals 315, 306', and 343 denote lenses, 321 denotes a screw, 344 denotes a TV camera used in assembly adjustment, 345 denotes a driving circuit for the variable liquid crystal focal-length lens 342, 346 denotes a computer, and 347 denotes a TV monitor.

When the electronic view-finder 341 is assembled, positioning of the display element 340 and the determination of driving information of the variable liquid crystal focal-length lens 342 is made as follows:

First, the variable focal-length lens 342 is driven so that a reference diopter and zoom state are obtained by predetermined driving information. The lens 306' is located at a reference position.

Then, the lens 306' and the variable focal-length lens 342 are moved to change the zoom state, and an image displayed on the display element 340 is photographed by the TV camera 344. This image is observed through the TV monitor 347 and an out-of-focus state is studied. Specifically, it is desirable that a lens 348 is moved back and forth while viewing the image of the TV monitor 347 and the out-of-focus state is studied.

From the amount of focus movement on zooming thus obtained, the amount of movement of the lens 315 is assumed.

In accordance with this assuming value, the lens 315 is positioned through the screw 321 so that the amount of focus movement on zooming is minimized.

Subsequently, the display element 340 is moved back and forth and is fixed at the position where the amount of focus movement on zooming is minimized and a preset diopter is obtained.

Finally, the driving state of the variable liquid crystal focal-length lens 342 is optimized so that the preset diopter is obtained with respect to each of various combinations of zoom states with diopters, and is recorded in a memory of the driving circuit 345 for the variable liquid crystal focal-length lens 342.

By doing so, an electronic view-finder with good performance is obtained. Also, the final adjusting process for recording the driving state in the memory of the driving circuit 345 may be omitted.

The memory of the driving circuit 345 is a two-dimensional LUT, for instance. In this case, one axis is taken as a change of an image distance (namely, the diopter) and the other axis is taken as the zoom state.

Each of the LUTs used in the above description may be a mathematical table provided in the memory or functions with some arguments. It is only necessary to determine the value of each argument.

The resolution chart 320 may contain a test chart corresponding not only to the center of the object to be photographed, but also to the periphery thereof. That is, it may contain a test chart corresponding to the center and periphery of the photographic field of the visual field.

When the driving information of the variable mirror is optimized so that a plurality of test charts corresponding to the positions of different objects become best in contrast, the inclination, partial blurring, or poor resolution of an image caused by the manufacturing error of the optical apparatus can be corrected. This is favorable because a better optical system or optical apparatus is obtained.

Such techniques are applicable to any case in the present invention.

Control Method

Subsequently, a description is given of the embodiments of the control method of the deformable optical element in the present invention.

As mentioned above, the control method of the deformable optical element in the present invention is such that the imaging state of the optical apparatus is acquired; the shape of the deformable optical element is slightly changed; the imaging state of the optical apparatus involved in this shape change is acquired; an imaging state after the shape change of the deformable optical element is compared with that before the shape change to evaluate the degree of improvement of the imaging state; and this processing is repeated until the imaging state ceases to be improved in order to compensate the change of the imaging state caused by at least one factor of an ambient change, an individual difference, an object distance, and a zoom state.

The optical apparatus to which the control method of the present invention is applied has an optical system including a deformable optical element, a circuit driving the deformable optical element, and an imaging means.

The deformable optical element is an optical element in which the physical shape of its optical working surface can be controlled by an electric signal from the exterior, for example, as in the variable mirror, and is constructed with a deformable optical working surface and a shape control mechanism. The shape control mechanism is designed to utilize an electrostatic force such as a force exerted between the electrodes, for example, denoted by 409b in FIG. 1, or an electromagnetic force, and is operated in accordance with a control signal (of an applied voltage or current) from the exterior to change the shape of the optical working surface. In practice, in order to obtain a desired shape, a plurality of shape control mechanisms are provided to a single deformable optical element.

The circuit driving the deformable optical element is constructed so that a control signal deforming the shape of the optical working surface in accordance with an input signal from the optical apparatus is supplied to each of the shape control mechanisms.

The imaging means mounted to the optical apparatus is constructed with a solid-state image sensor such as a CCD or CMOS, or a photoelectric converting element such as a line sensor.

Here, reference is made to factors which changes the imaging state of the deformable optical element.

The change of the imaging state, in addition to the change of the object distance or zoom state on photographing, may be produced by the fact that the shape or refractive index of a lens or mirror constituting the optical system is different from a preset design value.

The former is the change of the imaging state that its occurrence is anticipated at the step of design on optical principle, whereas the latter is the ambient change or the change of the individual difference brought about after design, and thus it is difficult to anticipate the change of the imaging state.

Here, the ambient change refers to a change of ambience in which the optical apparatus is provided at a point of time where it is just used, and a change of temperature or humidity is cited as an example. The individual difference refers to the fact that the imaging state varies with an individual optical apparatus because of the manufacturing error produced by the realization of design or deterioration with age caused by long-continued use.

The control method of the present invention is aimed at achieving the best imaging state, and the intensity of the frequency component of an image obtained by using the imaging means or the intensity of light is used for an evaluation means of the imaging state for determining the degree of improvement of the imaging state.

The driving circuit of the deformable optical element constructed to slightly change at least one of the shape control mechanisms of the deformable optical element is used for a means of slightly change the shape of the deformable optical element.

In order to always obtain the best imaging state in the optical system including the deformable optical element as mentioned above, it is desirable that the shape of the optical working surface of the deformable optical element is feedback controlled in accordance with the evaluation result of the imaging state until the imaging state becomes best.

According to the control method of the present invention, such feedback control is made, and hence the deformable optical element can be deformed into an optimum shape so that the influence of the change of the imaging state produced by elements other than the deformable optical element is minimized.

According to the control method of the present invention, the influence of the change of the imaging state caused by the change of the object distance or the zoom state in the prior art can be eliminated, and the influences of the ambient change and the change of the imaging state by the individual difference, which formerly have never been offset, can also be eliminated.

According to the control method of the present invention, when the surface shape of the deformable optical element is determined so that the best imaging state is obtained, the best imaging state can be brought about in any surface shape of the deformable optical element before control.

The control method of the deformable optical element of the present invention may be followed so that the change of the shape of the optical working surface of the deformable optical element which can be anticipated after design and manufacture, such as the change of the zoom state, is stored as the basic deformation pattern in the LUT to search an imaging state closest to the best imaging state in the basic deformation pattern from the result applying the pattern. According to such a control method, an infinite number of shapes of the optical working surface are selected from a discrete finite pattern, and a speed reaching an imaging state closest to the best imaging state can be increased.

Furthermore, in the control method of the deformable optical element of the present invention, it is favorable to first search the surface shape of the deformable optical element that an imaging state closest to the best imaging state is obtained in the LUT, and then to use the feedback control for the shape of the optical working surface of the deformable optical element so that the best imaging state is obtained. According to such a control method, the shape of the optical working surface of the deformable optical element which brings about an imaging state closest to the best imaging state is acquired, and as a result, it becomes possible to reach the best imaging state and to facilitate the acquirement of the best imaging state.

The control method of the present invention is applicable not only to the deformable optical element, but also to other variable optical-property elements.

Figure 10:
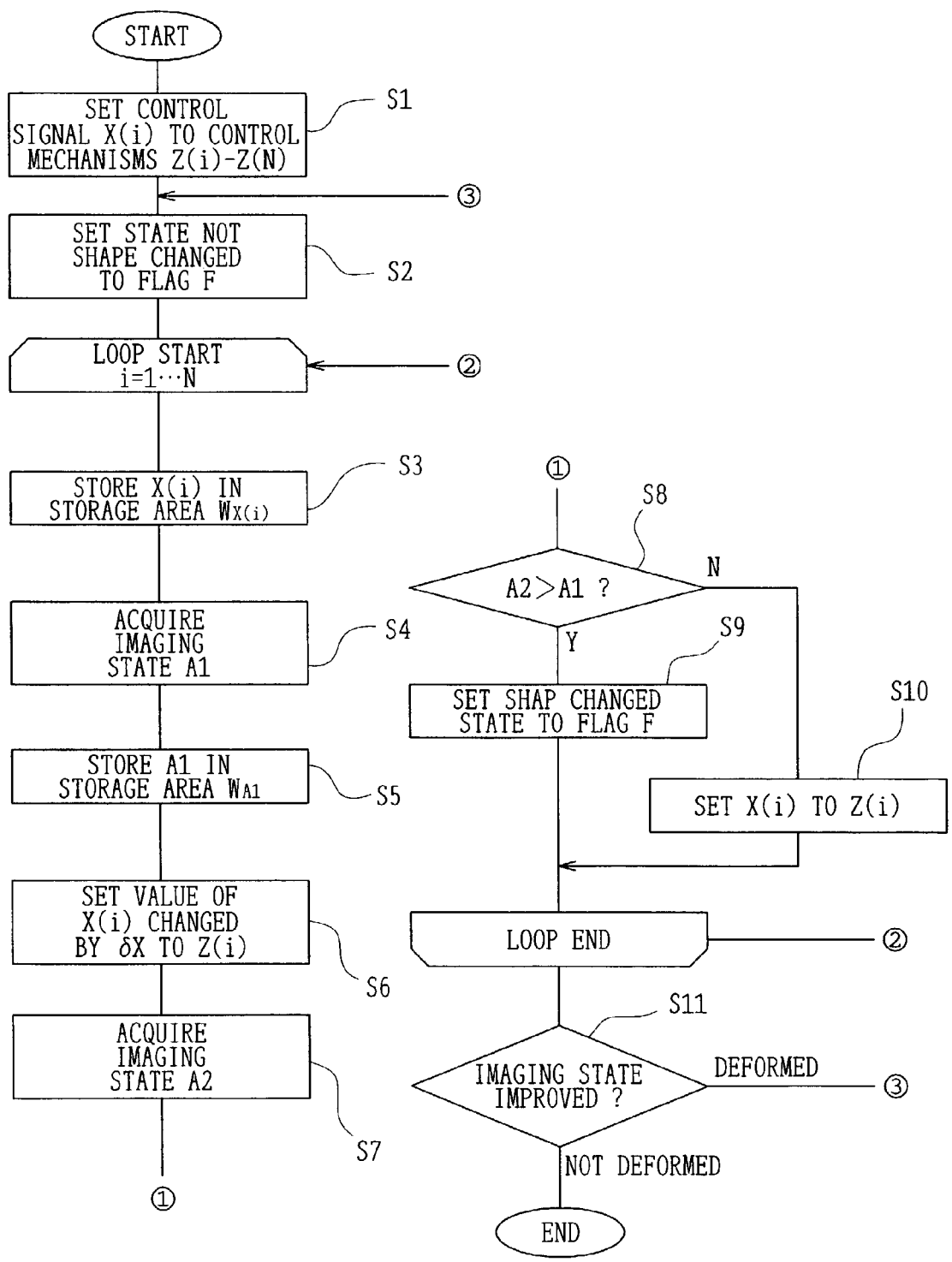
FIG. 10 is a flowchart illustrating one embodiment of the control method of the deformable optical element in the present invention.

FIG. 10 is a flowchart illustrating one embodiment of the control method of the deformable optical element in the present invention.

In the control method of this embodiment, a predetermined control signal (an applied voltage or current) is first set (supplied) to the i-th control mechanism provided in the deformable optical element and thereby the imaging state of the optical apparatus where the optical working surface is deformed is acquired (by the intensity of the frequency component of an image obtained by using the imaging means or the intensity of light). Then, the control signal is slightly changed and is set to the i-th control mechanism provided in the deformable optical element and thereby the imaging state of the optical apparatus where the optical working surface is deformed is acquired. The imaging state immediately before the surface is deformed is compared with a new imaging state. When the imaging state is improved, a new control signal and imaging state are held. On the other hand, when the imaging state is not improved, an original control signal and imaging state are used again. Such processing is repeated with respect to all the control mechanisms including a control mechanism Z(i) (where i is 1–N and N is the full number of control mechanisms). If the shape of the optical working surface at a point of time where the evaluation of the imaging state is finished with respect to a control mechanism Z (N) is not different from an original surface shape, processing is finished. It is different, processing is started again from the first.

Specifically, as shown in FIG. 10, a control signal X(i) of an initial value is first set to each of control mechanisms Z(i)–Z (N) (Step S1). The deformable optical element is deformed into a shape according to a set value.

A value indicating a state where the shape is not changed (for example, "0") is then set to a deformation determining flag F (Step S2).

Subsequently, the following processing is performed with respect to all the control mechanisms including the control mechanism Z(i).

The control signal X(i) set to the i-th control mechanism Z(i) is stored in a preset storage area $W_{X(i)}$ provided in the optical apparatus (Step S3). An imaging state A1 of the optical apparatus is acquired (Step S4) and is stored in a preset storage area $W_{A1}$ provided in the optical apparatus (Step S5). A value X(i)+δX where the control signal X(i) is slightly changed is set to the i-th control mechanism Z(i) (Step S6). In this case, the deformable optical element is deformed into a shape according to a set value. An imaging state A2 of the optical apparatus in this case is acquired (Step S7). This imaging state A2 is compared with the imaging state A1 stored in the storage area $W_{A1}$ (Step S8). If the imaging state is improved (the value of the imaging state A2 is larger than that of the imaging state A1), a value indicating a state where the shape is changed (for example, "1") is set to the deformation determining flag F (Step S9). On the other hand, if the imaging state is not improved (the value of the imaging state A2 is equal to or smaller than that of the imaging state A1), the control signal X(i) immediately before stored in the storage area $W_{X(i)}$ is set to the i-th control mechanism Z(i) (Step S10). In this case, the deformable optical element is deformed into an original shape in accordance with a set value.

After the processing of Steps S3-S10 has been completed with respect to all the control mechanisms including the control mechanism Z(i), whether the imaging state is improved is checked by the deformation determining flag F (Step S11).

When the value of the deformation determining flag F corresponds to the value indicating a state where the shape is changed (for example, "1"), the imaging state is regarded as improved and the processing of Steps S2-S11 is repeated. When the value of the deformation determining flag F corresponds to the value indicating a state where the shape is not changed (for example, "0"), the imaging state is regarded as ceasing to be improved and the processing is completed. Whereby, the optical apparatus is brought into the best imaging state.

According to the control method of the present invention, the shape of the optical working surface of the deformable optical element is feedback controlled in accordance with the evaluation result of the imaging state until the imaging state becomes best. Hence, the deformable optical element can be deformed into an optimum shape so that the influence of the change of the imaging state produced by elements other than the deformable optical element is minimized. According to the control method of the present invention, the influence of the change of the imaging state caused by the change of the object distance or the zoom state in the prior art can be eliminated, and the influences of the ambient change and the change of the imaging state by the individual difference, which formerly have never been offset, can also be eliminated. According to the control method of the present invention, the best imaging state can be brought about in any surface shape of the deformable optical element before control.

Figure 11:
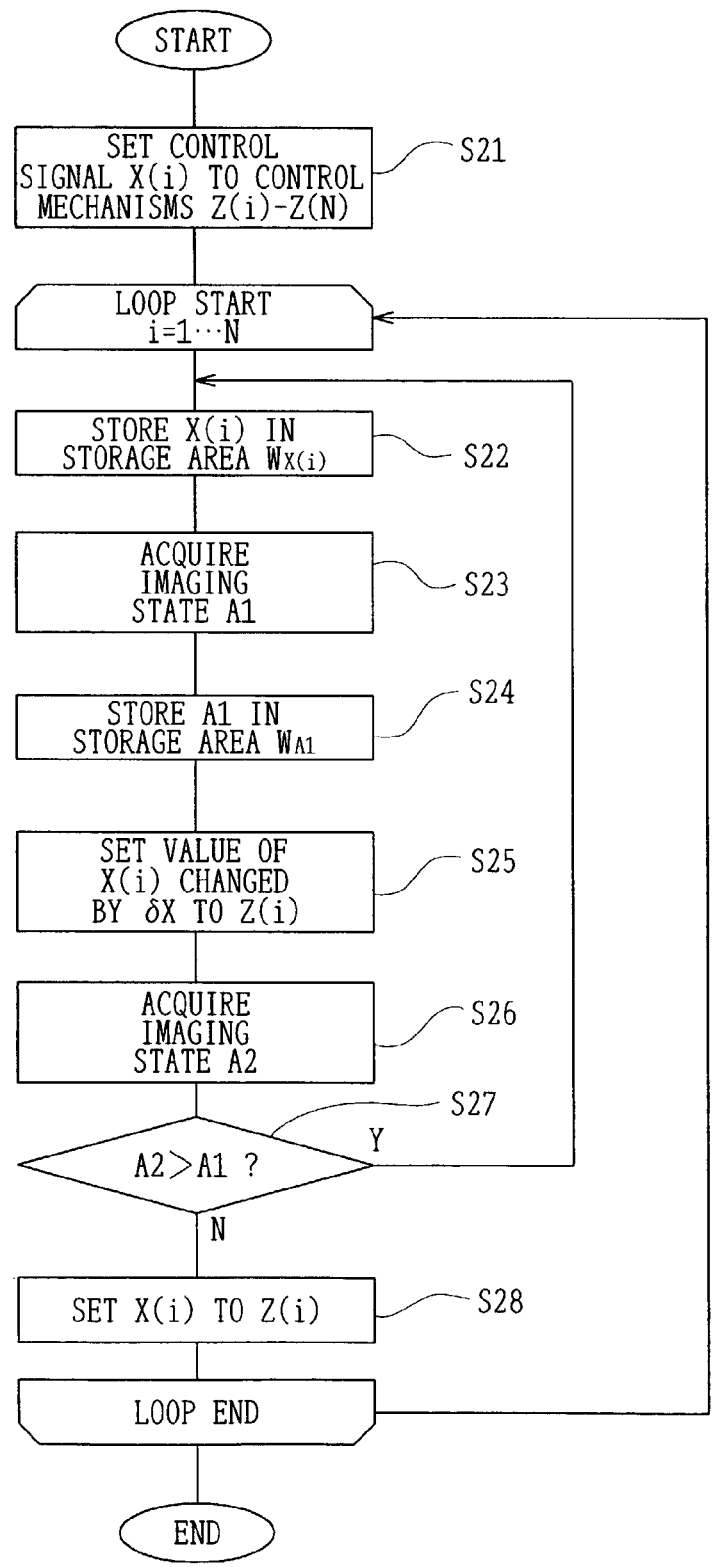
FIG. 11 is a flowchart illustrating another embodiment of the control method of the deformable optical element in the present invention.

FIG. 11 is a flowchart illustrating another embodiment of the control method of the deformable optical element in the present invention.

In the control method of this embodiment, a predetermined control signal (an applied voltage or current) is first set (supplied) to the i-th control mechanism provided in the deformable optical element and thereby the imaging state of the optical apparatus where the optical working surface is deformed is acquired (by the intensity of the frequency component of an image obtained by using the imaging means or the intensity of light). Then, the control signal is slightly changed and is set to the i-th control mechanism provided in the deformable optical element and thereby the imaging state of the optical apparatus where the optical working surface is deformed is acquired. The imaging state immediately before the surface is deformed is compared with a new imaging state. When the imaging state is improved, this control signal and imaging state are held, the control signal is further slightly changed and is set to the control mechanism, the imaging state of the optical apparatus where the optical working surface is deformed is acquired thereby, and the imaging state immediately before the surface is deformed is compared with a new imaging state. This processing is repeated until the imaging state ceases to be improved. When the imaging state is not improved, an original control signal and imaging state are used again. Such processing is repeated with respect to all control mechanisms including a control mechanism Z(i) (where i is 1–N and N is the full number of control mechanisms). At a point of time where the evaluation of the imaging state of the control mechanism Z (N) is finished, the imaging state is regarded as ceasing to be improved and the processing is completed.

Specifically, as shown in FIG. 11, the control signal X(i) of the initial value is first set to each of the control mechanisms Z(i)–Z(N) (Step S21). The deformable optical element is deformed into a shape according to a set value.

Subsequently, the following processing is performed with respect to all the control mechanisms including the control mechanism Z(i) until the imaging state ceases to be improved.

The control signal X(i) set to the i-th control mechanism Z(i) is stored in the preset storage area $W_{X(i)}$ provided in the optical apparatus (Step S22). The imaging state A1 of the optical apparatus is acquired (Step S23) and is stored in the preset storage area $W_{A1}$ provided in the optical apparatus (Step S24). A value where the control signal X(i) is slightly changed by +δX is set to the i-th control mechanism Z(i) (Step S25). In this case, the deformable optical element is deformed into a shape according to a set value. The imaging state A2 of the optical apparatus in this case is acquired (Step S26). This imaging state A2 is compared with the imaging state A1 stored in the storage area $W_{A1}$ (Step S27). If the imaging state is improved (the value of the imaging state A2 is larger than that of the imaging state A1), the processing of Steps S2-S27 is repeated. On the other hand, if the imaging state is not improved (the value of the imaging state A2 is equal to or smaller than that of the imaging state A1), the value of the control signal X(i) immediately before stored in the storage area $W_{X(i)}$ is set to the i-th control mechanism Z(i) (Step S28). In this case, the deformable optical element is deformed into an original shape in accordance with a set value.

The processing of Steps S22-S28 is completed with respect to all the control mechanisms including the control mechanism Z(i) and thereby the optical apparatus is brought into the best imaging state.

According to the control method of the embodiment, the same effect as the control method of the embodiment of FIG. 10 is secured.

Figure 12:
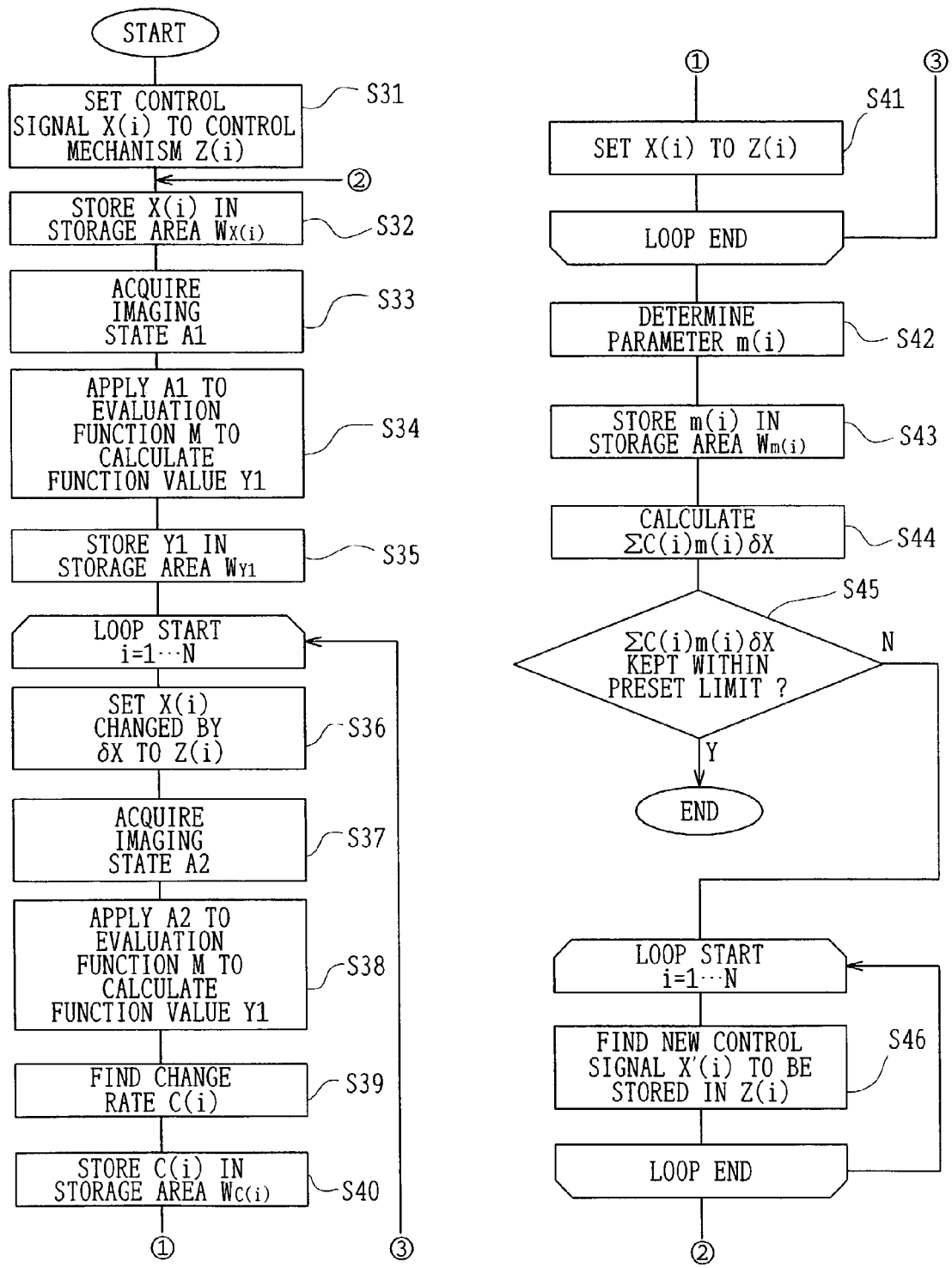
FIG. 12 is a flowchart illustrating still another embodiment of the control method of the deformable optical element in the present invention.

FIG. 12 is a flowchart illustrating still another embodiment of the control method of the deformable optical element in the present invention.

In the control method of this embodiment, the shape control is made by an optimization technique using an evaluation function.

First, reference is made to an evaluation function M used in the embodiment.

The evaluation function M described here refers to a function quantitatively expressing the imaging state of the optical system. For example, when a certain imaging state A is acquired, the evaluation function can be generally expressed as M=M(A). In the imaging state, if an image is cited as an example, imaging performance can be extracted by separating into imaging performance $a_1$ at about the center of the image and imaging performance $a_2$ on the periphery thereof. Thus, when pieces of imaging performance to be determined as to whether the best imaging state is brought about are represented by $a_1, \ldots, a_k$ and ideal target values of the pieces of imaging performance indicating the best imaging state represented by $a_{10}, \ldots, a_{k0}$, the evaluation function can be expressed as follows:

$$M=(a_1-a_{10})^2+\ldots+(a_k-a_{k0})^2$$

In this evaluation function, as each piece of imaging performance of the imaging state approaches the target value imparted in advance, the best imaging state which can be actually obtained is brought about and the value of the evaluation function in this case is kept to a minimum. In other words, when the evaluation function is minimized, the best imaging state which can be practically acquired is brought about. The evaluation function varies with the specification and application of the optical system. Thus, it is needless to say that the best imaging state can also be obtained at the maximum value of the evaluation function, depending on the usage of the evaluation function.

The procedure of the shape control will be described below, using the flowchart. Here, the evaluation function M is a function which indicates a gain and takes the minimum value in the best imaging state.

First, the control signal X(i) of the initial value is set to the control mechanism Z(i) (Step S31). Whereby, the shape of the deformable optical element is changed in accordance with a set value.

Then, the control signal X(i) set to the control mechanism Z(i) is stored in the preset storage area $W_{X(i)}$ provided in the optical apparatus (Step S32).

The imaging state A1 of the optical apparatus is acquired in a state where the control signal X(i) is provided (Step S33).

This imaging state A1 is applied to the evaluation function M to calculate a function value Y1 (Step S34). The function value Y1 is stored in a preset storage area $W_{Y1}$ provided in the optical apparatus (Step S35).

Subsequently, the following processing is performed with respect to all the control mechanisms including the control mechanism Z(i).

The value X(i)+δX where the control signal X(i) is slightly changed is set to the i-th control mechanism Z(i) (Step S36). The deformable optical element in this case is deformed in accordance with a set value. The imaging state A2 of the optical apparatus in this case is acquired (Step S37). This imaging state A2 is applied to the evaluation function M to calculate a function value Y2 (Step S38). A change rate C(i) (=Y2−Y1) of the evaluation function relating to a slight change δX of the control signal X(i) is found in the proximity of the imaging state A1 (Step S39). This change rate C(i) is stored in a preset storage area $W_{C(i)}$ provided in the optical apparatus (Step S40). The control signal X(i) stored in the preset storage area $W_{X(i)}$ is set to the control mechanism Z(i) (Step S41). The deformable optical element is deformed in accordance with this set value. The processing of Steps S36-S41 is repeated with respect to all control mechanisms including a control mechanism Z(i).

After the processing of Steps S36-S41 has been completed with respect to all the control mechanisms including the control mechanism Z(i), the change rate of the evaluation function stored in the preset storage area $W_{C(i)}$ is used to find a parameter m(i) of a control signal X'(i)=X(i)+m(i)δX, bringing about a better imaging state than the imaging state A1 (Step S42).

Here, techniques of finding the parameter m(i), called optimization, are of various types. A description is given here of an example using a technique called a gradient method.

The value of the evaluation function of an imaging state A' in which the control signal is changed to X'(i)=X(i)+m(i)δX in the proximity of the imaging state A1 can be expressed, in terms of a linear combination using the change rate C(i), as $$M(A')=M(A1)+\Sigma C(i)m(i)\delta X$$

In order to improve the imaging state, the evaluation function in the new imaging state A' must satisfy the following condition:

$$M(A')<M(A1)$$

That is, it is necessary to find m(i)δX applied to the following condition:

$$M(A')-M(A1)=\Sigma C(i)m(i)\delta X<0$$

Whereby, the imaging state A' becomes better than the imaging state A1. Here, the absolute value of the parameter m(i) can be chosen as a fixed value of the control signal or a value within the limit of linear approximation, and the sign of the parameter m(i) is chosen so as to satisfy the condition, $C(i)m(i)\delta X<0$ As mentioned above, the techniques of optimization of finding the control signal X'(i) so that a better imaging state is obtained are of various types such as a least squares method in addition to the above gradient method, but any type may be used.

Subsequently, the parameter m(i) bringing about the better imaging state is stored in a preset storage area $W_{m(i)}$ provided in the optical apparatus (Step S43). The value of $\Sigma C(i)m(i)\delta X$ is calculated (Step S44). Whether the imaging state A1 is in the best imaging state is determined. In this case, if the evaluation function has the minimum value due to its property, the imaging state A1 can be assumed as the best imaging state. The determination of whether the minimum value is reached depends on whether the value of $\Sigma C(i)m(i)\delta X$ is kept within a constant limit (Step S45).

Where the amount of change of the evaluation function is not kept within a constant limit, the parameter of the imaging state stored in the storage area $W_{m(i)}$ is used to make the new control signal X'(i), which is set to the control mechanism Z(i) (Step S46). In this case, the deformable optical element is deformed into a newly set shape. The processing of Steps S32-S45 is repeated.

On the other hand, where it is kept within the constant limit, processing is completed on the assumption that there is no possibility of improvement.

According to the control method of the embodiment, the same effect as the control method of the embodiment of FIG. 10 is secured.

Figure 13:
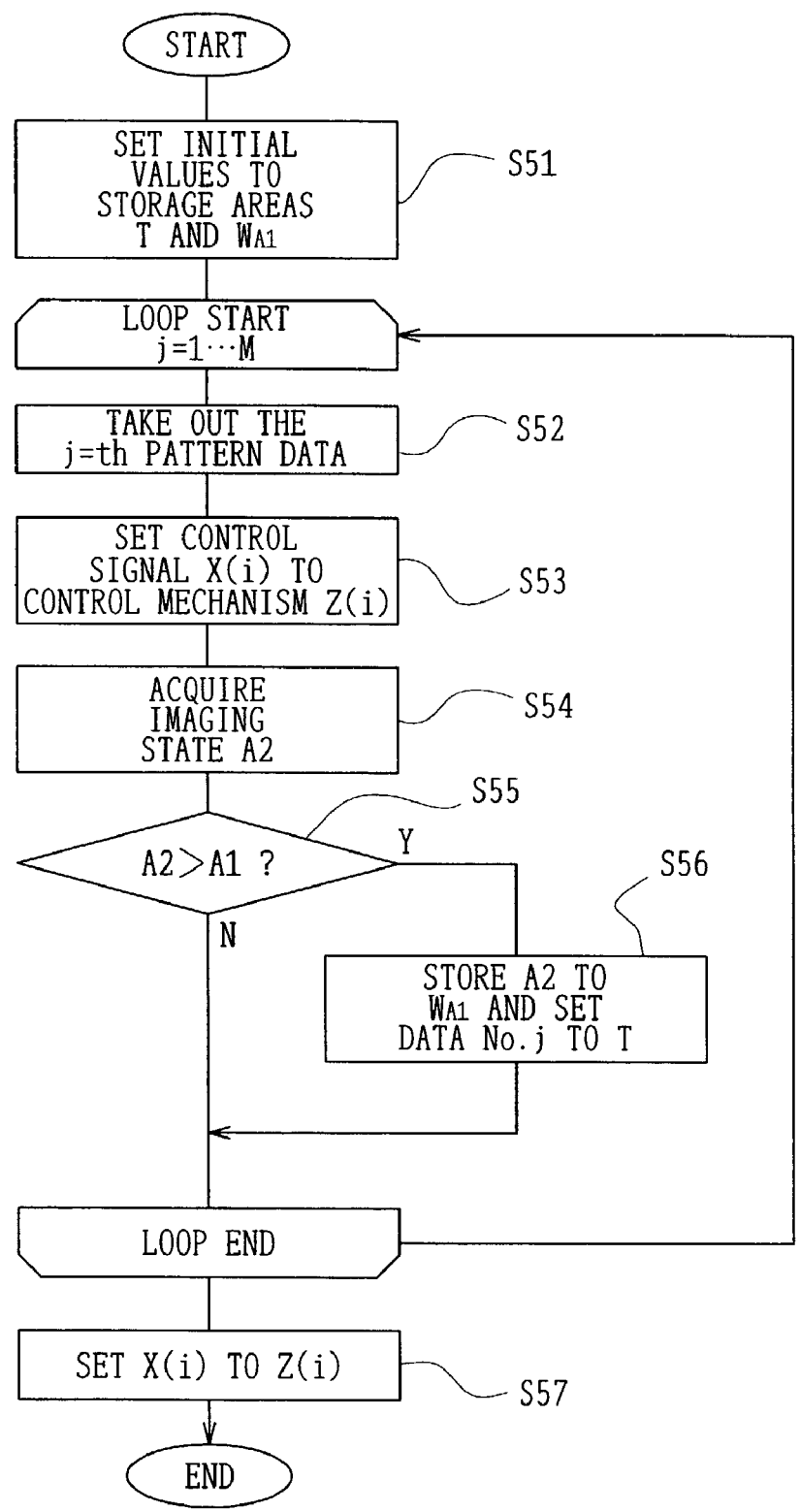
FIG. 13 is a flowchart illustrating a further embodiment of the control method of the deformable optical element in the present invention.

FIG. 13 is a flowchart illustrating a further embodiment of the control method of the deformable optical element in the present invention. FIG. 14 shows one example of the LUT used in the control method of this embodiment.

In the control method of the embodiment, the value X(i) of a control signal (an applied voltage or current) to be set to the control mechanism Z(i) is extracted as a piece of basic deformation pattern data from the LUT recording a plurality of patterns, the control signal X(i) of this basic deformation pattern data is set to the control mechanism Z(i) provided in the deformable optical element, and thereby the imaging state A1 of the optical apparatus where the optical working surface is deformed is acquired (by the intensity of the frequency component of an image obtained by using an imaging means or the intensity of light). The next basic deformation pattern data is taken out from the LUT, the control signal X(i) of this basic deformation pattern data is set to the control mechanism Z(i) provided in the deformable optical element, and thereby the imaging state A2 of the optical apparatus where the optical working surface is deformed is acquired. Subsequently, the imaging state A1 is compared with the imaging state A2. When the imaging state is improved, the basic deformation pattern data of the control signal X(i) in an improved imaging state is stored and the value of the imaging state A2 is transferred to the imaging state A1. Processing from the acquirement of the imaging state A2 to the comparison between the imaging states A1 and A2 is repeated with respect to all basic deformation pattern data of the LUT. Then, the control signal X(i) of the basic deformation pattern data stored is set to the control mechanism Z(i) to return to the imaging state in this case.

Specifically, in the look-up table, for example, as illustrated in FIG. 14, the value X(i) of a control signal (an applied voltage or current) to be set to the control mechanism Z(i) is recorded as a piece of basic deformation pattern data, including M pieces.

In the embodiment, as shown in FIG. 13, initial values are first set to a basic deformation data number storage area T and an imaging state storage area $W_{A1}$ (Step S51).

Then, the following processing is performed with respect to the j-th basic deformation pattern data (where j is 1–M) in the LUT.

The j-th basic deformation pattern data is taken out (Step S52). The control signal X(i) of the j-th basic deformation pattern data is set to the control mechanism Z(i) provided in the deformable optical system (Step S53). In this case, the deformable optical element is deformed into a shape according to a set value. The imaging state A2 of the optical apparatus in this case is then acquired (Step S54). This imaging state A2 is compared with the imaging state A1 stored in the storage area $W_{A1}$ (Step S55). If the imaging state is improved (the value of the imaging state A2 is larger than that of the imaging state A1), the imaging state A2 is thought of as the imaging state A1 and is stored in the storage area $W_{A1}$, and the data number j is set to the basic deformation data number storage area T (Step S56). The processing of Steps S53-S55 is repeated. If the imaging state is not improved (the value of the imaging state A2 is equal to or smaller than that of the imaging state A1), the processing of Steps S53-S55 is repeated.

When the processing of Steps S53-S56 is completed with respect to all the basic deformation pattern data, the basic deformation pattern data of the data number j set to the basic deformation data number storage area T is called, and the control signal X(i) of the j-th basic deformation pattern data is set to the control mechanism Z(i) provided in the deformable optical element (Step S57). In this case, the deformable optical element is deformed into a shape according to a set value, and the optical apparatus is brought into an imaging state closest to the best imaging state.

According to the control method of the embodiment, an infinite number of shapes of the optical working surface are selected from a discrete finite pattern, and a speed reaching an imaging state closest to the best imaging state can be increased.

FIG. 15 is a flowchart illustrating another embodiment of the control method of the deformable optical element in the present invention. FIG. 16 shows one example of an LUT group used in the control method of the embodiment. FIGS. 17A and 17B show examples of LUTs used in the embodiment.

In the control method of this embodiment, LUTs constructed with different basic deformation pattern data are classified in accordance with the conditions of the ambient change of temperature or humidity, the individual difference, the object distance, and the zoom state to constitute an LUT group. Photographic information on operation is input through a detecting means, not shown (Step S61). An LUT most suitable for the working condition of the optical apparatus is selected from the LUT group in accordance with input information through a control means, not shown (Step S62). Then, the control method shown in FIG. 13 is used to search the surface shape of the deformable optical element obtained from an imaging state closest to the best imaging state in the LUT (Step S63).

FIG. 18 is a flowchart illustrating another embodiment of the control method of the deformable optical element in the present invention.

In the control method of this embodiment, at a first step, the optical working surface is controlled by the control method shown in FIG. 13 to search the surface shape of the deformable optical element obtained from an imaging state closest to the best imaging state in the LUT (Step S71). Then, at a second step, the optical working surface is controlled by the control method shown in FIG. 10, and the shape of the optical working surface of the deformable optical element is feedback controlled, thereby bringing about the best imaging state (Step S72).

Also, as a modified example of the embodiment, at the second step, the optical working surface may be controlled by the control method shown in FIG. 11 or 12 so that the shape of the optical working surface of the deformable optical element is feedback controlled and thereby the best imaging state is obtained.

According to the control method of the embodiment, the shape of the optical working surface of the deformable optical element which brings about an imaging state closest to the best imaging state is acquired, and as a result, it becomes possible to reach the best imaging state and to facilitate the acquirement of the best imaging state.

FIG. 19 is a flowchart illustrating another embodiment of the control method of the deformable optical element in the present invention.

In the control method of this embodiment, at a first step, the optical working surface is controlled by the control method shown in FIG. 15 and an LUT most suitable for the working condition of the optical apparatus is selected from an LUT group constructed with different basic deformation pattern data classified in accordance with conditions, such as the ambient change of temperature or humidity, the individual difference, the object distance, and the zoom state to search the surface shape of the deformable optical element which is obtained from an imaging state closest to the best imaging state in the LUT (Step S81). At second step, the optical working surface is controlled by the control method shown in FIG. 12 and the shape of the optical working surface of the deformable optical element is feedback controlled so that the best imaging state is obtained (Step S82).

Also, as a modified example of the embodiment, at the second step, the optical working surface may be controlled by the control method shown in FIG. 10 or 11 so that the shape of the optical working surface of the deformable optical element is feedback controlled and thereby the best imaging state is obtained.

According to the control method of the embodiment, the same effect as the control method of the embodiment shown in FIG. 18 is secured, and the speed bringing about an imaging state closest to the best imaging state by the LUT data can be made higher than in the embodiment of FIG. 18.

In the present invention, time required to obtain the final compensating signal can be reduced, irrespective of the degree of a difference between the mirror shape governed by the initial compensating signal and that of the optimum imaging performance. In the present invention, an imaging device in which there are few mechanical moving parts and which is small in size and light in weight and has a high degree of accuracy can be realized.

Further, in the present invention, a control method can be provided which is capable of compensating ambient conditions such as temperature and humidity or the deterioration of an imaging state inherent to a device, such as a manufacturing error. In the present invention, another control method can be provided which is capable of reducing time required to bring about the optimum imaging state with respect to changes of various imaging states.

Variable Optical Elements

Subsequently, reference is made to the structural examples of variable optical-property elements (for example, deformable mirrors and variable focal-length lenses) applicable to the imaging device or the optical apparatus in the present invention.

FIG. 20 shows a Keplerian finder for a digital camera using a variable optical-property mirror as a variable mirror applicable to the zooming optical system of the present invention. It can, of course, be used for a silver halide film camera. Reference is first made to a variable optical-property mirror 409.

The variable optical-property mirror 409 refers to a variable optical-property deformable mirror (which is hereinafter simply called a deformable mirror) in which the periphery of the deformation layer of a three-layer structure including an electrode k, a deformable substrate 409j, and a thin film (reflecting surface) 409a, functioning as a reflecting surface, coated with aluminum on the substrate 409j is fixed on a support 423, and a plurality of electrodes 409b provided in spaced relation with respect to the electrode 409k are fixed on the lower side of the support 423. Reference numeral 411a denotes a plurality of variable resistors connected to the electrodes 409b; 412 denotes a power supply connected between the electrode 409k and the electrodes 409b through a variable resistor 411b and a power switch 413; 414 denotes an arithmetical unit for controlling the resistance values of the plurality of variable resistors 411a; and 415, 416, and 417 denote a temperature sensor, a humidity sensor, and a range sensor, respectively, connected to the arithmetical unit 414, which are arranged as shown in the figure to constitute one optical apparatus.

Each of the surfaces of an objective lens 902, an eyepiece 901, a prism 404, an isosceles rectangular prism 405, a mirror 406, and the deformable mirror 409 need not necessarily be planar, and may have any shape such as a spherical or rotationally symmetrical aspherical surface; a spherical, planar, or rotationally symmetrical aspherical surface which has decentration with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred to as to an extended surface. Also, the decentration means either displacement (shift) or tilt, or both.

The thin film 409a, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187-190, 1997, is such that when voltages are applied between the plurality of electrodes 409b and the electrode 409k, the thin film 409a is deformed by the electrostatic force and its surface profile is changed. Whereby, not only can focusing be adjusted to the diopter of an observer, but also it is possible to suppress deformations and changes of refractive indices, caused by temperature and humidity changes of the lenses 902 and 901 and/or the prism 404, the isosceles rectangular prism 405, and the mirror 406, or the degradation of imaging performance by the expansion and deformation of a lens frame and assembly errors of parts, such as optical elements and frames. In this way, a focusing adjustment and correction for aberration produced-by the focusing adjustment can be always properly made.

Figure 22:
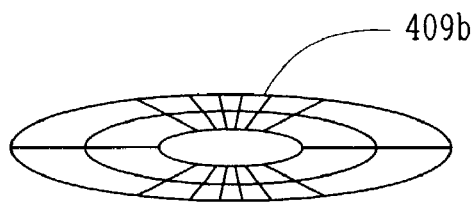
FIG. 22 is an explanatory view showing one aspect of electrodes used in the example of FIG. 21.
Figure 23:
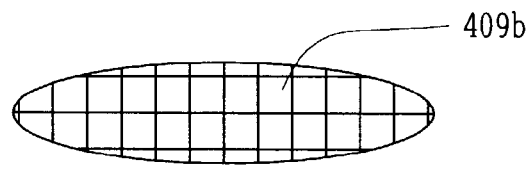
FIG. 23 is an explanatory view showing another aspect of electrodes used in the example of FIG. 21.

Also, it is only necessary that the profile of the electrodes 409b, for example, as shown in FIG. 22 or 23, has a concentric or rectangular division pattern and is selected in accordance with the deformation of the thin film 409a.

When the deformable mirror 409 is used, light from an object is refracted by the entrance and exit surfaces of the objective lens 902 and the prism 404, and after being reflected by the deformable mirror 409, is transmitted through the prism 404. The light is further reflected by the isosceles rectangular prism 405 (in FIG. 20, a mark+on the optical path indicates that a ray of light travels toward the back side of the plane of the page), and is reflected by the mirror 406 to enter the eye through the eyepiece 901. As mentioned above, the lenses 901 and 902, the prisms 404 and 405, and the deformable mirror 409 constitute the observation optical system of the optical apparatus. The surface profile and thickness of each of these optical elements is optimized and thereby aberration of an object surface can be minimized.

Specifically, the configuration of the thin film 409a functioning as the reflecting surface is controlled in such a way that the resistance values of the variable resistors 411a are changed by signals from the arithmetical unit 414 to optimize imaging performance. Signals corresponding to ambient temperature and humidity and a distance to the object are input into the arithmetical unit 414 from the temperature sensor 415, the humidity sensor 416, and the range sensor 417. In order to compensate for the degradation of imaging performance due to the ambient temperature and humidity and the distance to the object in accordance with these input signals, the arithmetical unit 414 outputs signals for determining the resistance values of the variable resistors 411a so that voltages by which the configuration of the thin film 409a is determined are applied to the electrodes 409b. Thus, since the thin film 409a is deformed with the voltages applied to the electrodes 409b, that is, the electrostatic forces, it assumes various shapes including an aspherical surface, according to circumstances. The range sensor 417 need not necessarily be used, and in this case, it is only necessary that an imaging lens 403 constructed as the imaging optical system of the digital camera is moved so that a high-frequency component of an image signal from a solid-state image sensor 408 is roughly maximized, and the object distance is calculated from this position so that an observer's eye is able to focus upon the object image by deforming the deformable mirror. When the deformable mirror 409 is made by using lithography, high fabrication accuracy and good quality are easily obtained.

When the deformable substrate 409j is made of synthetic resin, such as polyimide, it can be considerably deformed even at a low voltage, which is advantageous. Also, the prism 404 and the deformable mirror 409 can be integrally configured into a unit. This is advantageous for assembly.

In FIG. 20, the reflecting surface 409a and the deforming electrode 409k sandwiching the deforming substrate 409j between them are integrally constructed, and thus there is the merit that some manufacturing methods can be chosen. The reflecting surface 409a may be designed so that it is also used as the electrode 409k. This brings about the merit that the structure is simplified because both are configured into one.

Although not shown in the figure, the solid-state image sensor 408 may be constructed integrally with the substrate of the deformable mirror 409 by a lithography process.

When each of the lenses 901 and 902, the prisms 404 and 405, and the mirror 406 is configured by a plastic mold, an arbitrary curved surface of a desired configuration can be easily obtained and its fabrication is simple. In the above description, the lenses 902 and 901 are arranged separately from the prism 404. However, if the prisms 404 and 405, the mirror 406, and the deformable mirror 409 are designed so that aberration can be eliminated without providing the lenses 902 and 901, the prisms 404 and 405 and the deformable mirror 409 will be configured as one optical block, and the assembly is facilitated. Parts or all of the lenses 902 and 901, the prisms 404 and 405, and the mirror 406 may be made of glass. By doing so, an observation optical system with a higher degree of accuracy is obtained. It is favorable that the profile of the reflecting surface of the deformable mirror is a free-formed surface. This is because correction for aberration can be facilitated, which is advantageous.

The free-formed surface used in the present invention is defined by the following equation. The Z axis in this defining equation constitutes an axis of the free-formed surface.

$$Z = cr^2 / \left[1 + \sqrt{1 - (1+k)c^2 r^2}\right] + \sum_{j=2}^{M} C_j X^m Y^n \tag{a}$$

where, the first term of this equation is a spherical surface term, and the second term is a free-formed surface term. M is a natural number of 2 or larger.

In the spherical surface term,
c: curvature of the vertex,
k: conic constant,
$r = \sqrt{(X^2 + Y^2)}$ The free-formed surface term is as follows:

$$\sum_{j=2}^{M} C_j X^m Y^n =$$

$C_2 X + C_3 Y + C_4 X^2 + C_5 XY + C_6 Y^2 + C_7 X^3 + C_8 X^2 Y + C_9 XY^2 +$ $C_{10} Y^3 + C_{11} X^4 + C_{12} X^3 Y + C_{13} X^2 Y^2 + C_{14} XY^3 + C_{15} Y^4 +$ $C_{16} X^5 + C_{17} X^4 Y + C_{18} X^3 Y^2 + C_{19} X^2 Y^3 + C_{20} XY^4 + C_{21} Y^5 +$ $C_{22} X^6 + C_{23} X^5 Y + C_{24} X^4 Y^2 + C_{25} X^3 Y^3 + C_{26} X^2 Y^4 +$

-continued $C_{27} XY^5 + C_{28} Y^6 + C_{29} X^7 + C_{30} X^6 Y + C_{31} X^5 Y^2 +$ $C_{32} X^4 Y^3 + C_{33} X^3 Y^4 + C_{34} X^2 Y^5 + C_{35} XY^6 + C_{36} Y^7$ where, $C_j$ (j is an integer of 2 or larger) is a coefficient.

The above-mentioned free-formed surface never generally has a symmetric surface for both the X-Z plane and the Y-Z plane. However, by bringing all odd-number order terms of X to 0, a free-formed surface having only one symmetrical surface parallel to the Y-Z plane is obtained. By bringing all odd-number order terms of Y to 0, a free-formed surface having only one symmetrical surface parallel to the X-Z plane is obtained.

Also, although in FIG. 20 the arithmetical unit 414, the temperature sensor 415, the humidity sensor 416, and the range sensor 417 are provided so that the deformable mirror 409 compensates for the changes of the temperature, the humidity, and the object distance, the present invention is not limited to this construction. That is, the arithmetical unit 414, the temperature sensor 415, the humidity sensor 416, and the range sensor 417 may be eliminated so that the deformable mirror 409 compensates for only a change of an observer's diopter.

Figure 21:
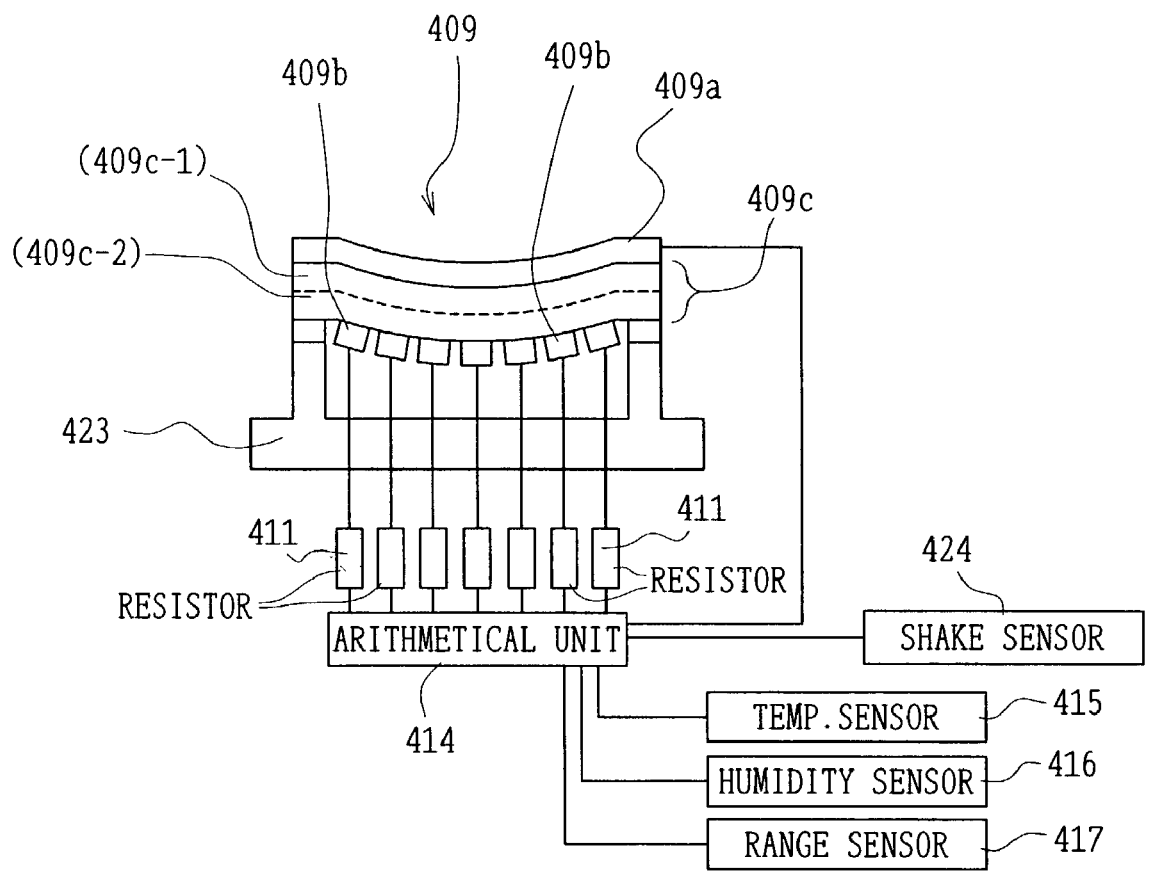
FIG. 21 is a diagram schematically showing another example of the deformable mirror applicable as a variable mirror.

FIG. 21 shows another example of the deformable mirror 409 applicable as the variable mirror used in the optical apparatus of the present invention. In the deformable mirror of this example, a piezoelectric element 409c is interposed between the thin film 409a and the plurality of electrodes 409b, and these are placed on the support 423. A voltage applied to the piezoelectric element 409c is changed in accordance with each of the electrodes 409b, and thereby the piezoelectric element 409c causes expansion and contraction which are partially different so that the shape of the thin film 409a can be changed. The configuration of the electrodes 409b, as illustrated in FIG. 22, may have a concentric division pattern, or as in FIG. 23, may be a rectangular division pattern. As other patterns, proper configurations can be chosen.

In FIG. 21, reference numeral 424 represents a shake sensor connected to the arithmetical unit 414. The shake sensor 424, for example, detects the shake of a digital camera in photographing and changes the voltages applied to the electrodes 409b through the arithmetical unit 414 and variable resistors 411 in order to deform the thin film (reflecting surface) 409a to compensate for the blurring of an image caused by the shake. At this time, signals from the temperature sensor 415, the humidity sensor 416, and range sensor 417 are taken into account simultaneously, and focusing and compensation for temperature and humidity are performed. In this case, stress is applied to the thin film 409a by the deformation of the piezoelectric element 409c, and hence it is good practice to design the thin film 409a so that it has a moderate thickness and a proper strength. Also, the piezoelectric element 409c, as described later, may have a two-layer structure denoted by 409c-1 and 409c-2, depending on material used.

Figure 24:
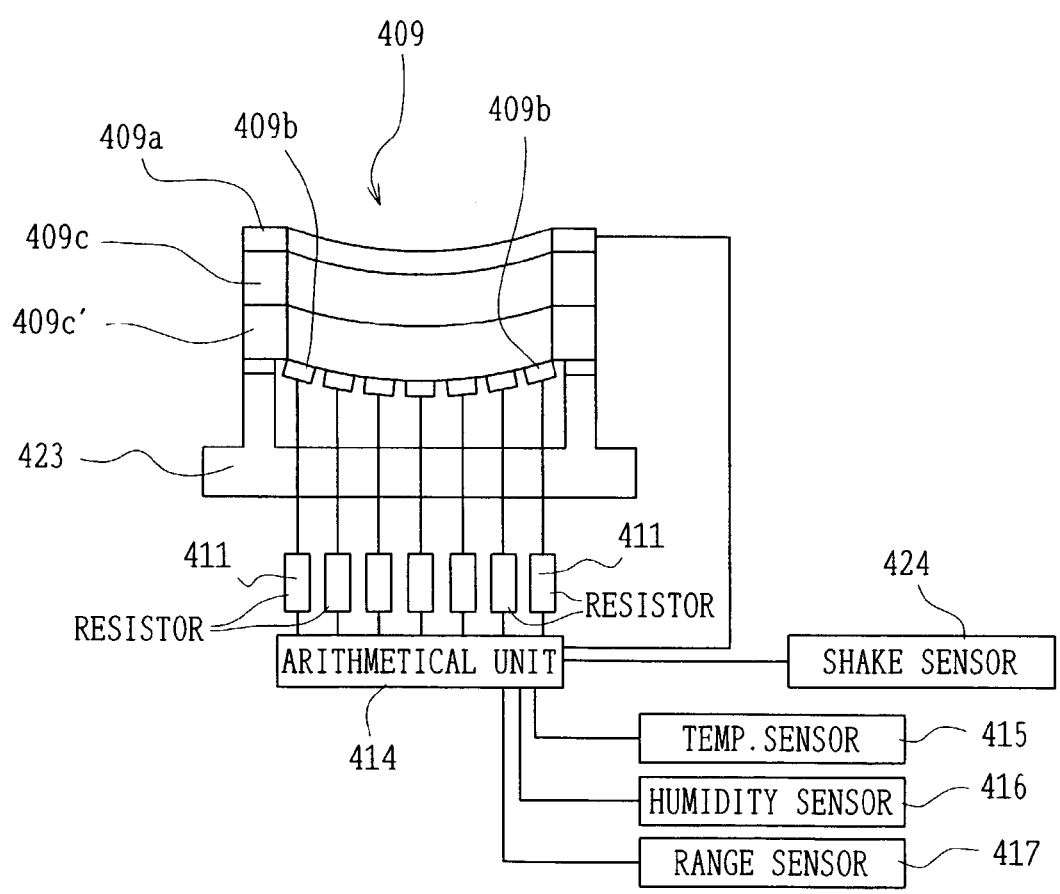
FIG. 24 is a view schematically showing another example of the deformable mirror.

FIG. 24 shows still another example of the deformable mirror 409 applicable as the variable mirror used in the optical apparatus of the present invention. This example has the same construction as the deformable mirror of FIG. 21 with the exception that two piezoelectric elements 409c and 409c' are interposed between the thin film 409a and the plurality of electrodes 409b and are made with substances having piezoelectric characteristics which are reversed in direction. Specifically, when the piezoelectric elements 409c and 409c' are made with ferroelectric crystals, they are arranged so that their crystal axes are reversed in direction with respect to each other. In this case, the piezoelectric elements 409c and 409c' expand or contract in a reverse direction when voltages are applied, and thus there is the advantage that a force for deforming the thin film (reflecting surface) 409a becomes stronger than in the example of FIG. 21, and as a result, the shape of the mirror surface can be considerably changed. Other reference numerals of FIG. 24 are the same as in FIG. 21.

For substances used for the piezoelectric elements 409c and 409c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When these piezoelectric elements are used, it is also possible to properly deform the thin film 409a in each of the above examples if their thicknesses are made uneven.

As materials of the piezoelectric elements 409c and 409c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the surface of the deformable mirror, which is favorable.

Figure 25:
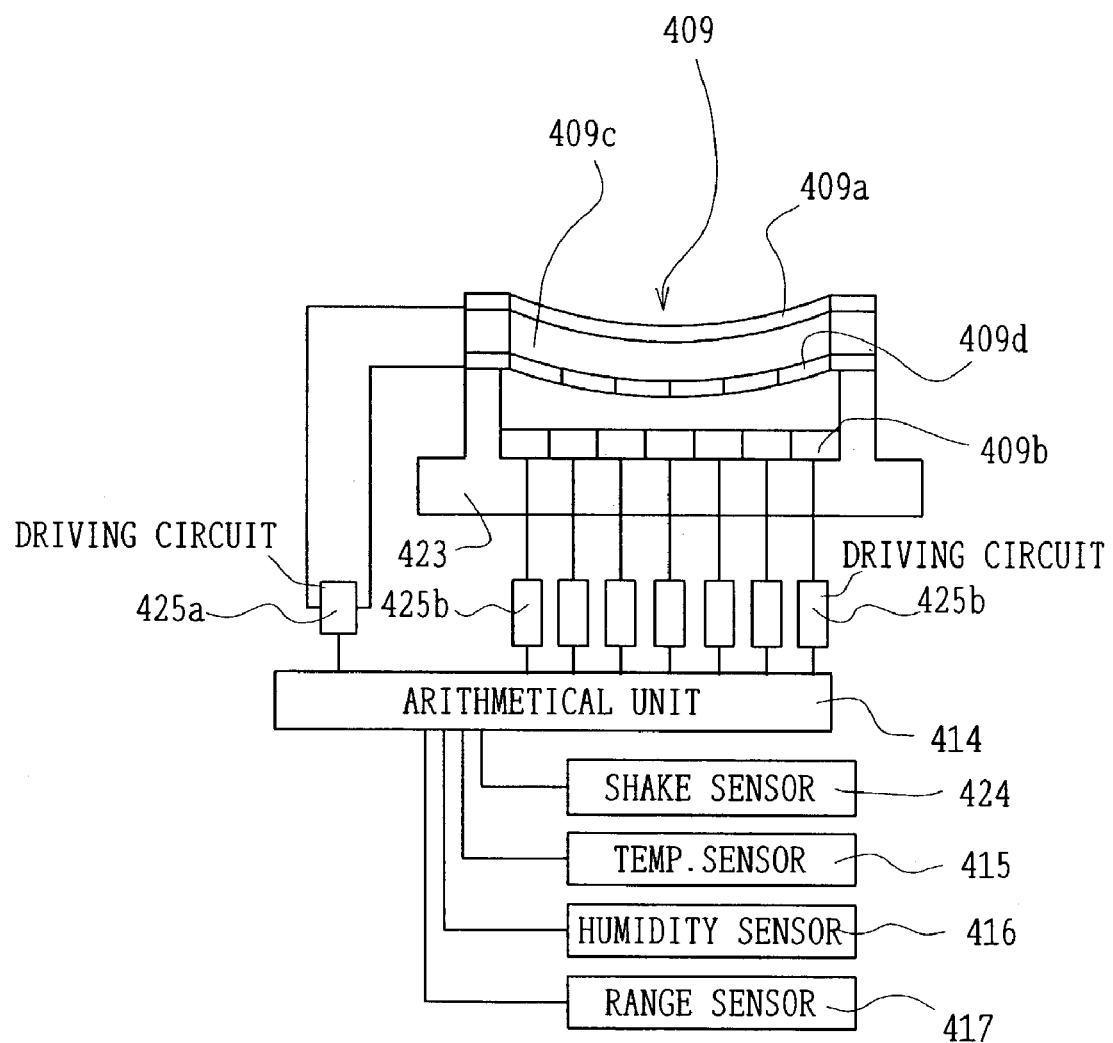
FIG. 25 is a view schematically showing another example of the deformable mirror.

When an electrostrictive substance, for example, acrylic elastomer or silicon rubber, is used for the piezoelectric element 409c shown in FIGS. 21 and 25, the piezoelectric element 409c, as indicated by a broken line in FIG. 21, may have the two-layer structure in which a substrate 409c-1 is cemented to an electrostrictive substance 409c-2.

FIG. 25 shows another example of the deformable mirror 409 applicable as the variable mirror used in the optical apparatus of the present invention. The deformable mirror of this example is designed so that the piezoelectric element 409c is sandwiched between the thin film 409a and a plurality of electrodes 409d, and these are placed on the support 423. Voltages are applied to the piezoelectric element 409c between the thin film 409a and the electrodes 409d through a driving circuit 425a controlled by the arithmetical unit 414. Furthermore, apart from this, voltages are also applied to the plurality of electrodes 409b provided on a bottom surface inside the support 423, through driving circuits 425b controlled by the arithmetical unit 414. Therefore, the thin film 409a can be doubly deformed by electrostatic forces due to the voltages applied between the thin film 409a and the electrodes 409d and applied to the electrodes 409b. There are advantages that various deformation patterns can be provided and the response is quick, compared with any of the above examples. Other reference numerals of FIG. 25 are the same as in FIG. 21.

By changing the signs of the voltages applied between the thin film 409a and the electrodes 409d, the thin film 409a of the deformable mirror 409 can be deformed into either a convex or concave surface. In this case, a considerable deformation may be performed by a piezoelectric effect, while a slight shape change may be carried out by the electrostatic force. Alternatively, the piezoelectric effect may be chiefly used for the deformation of the convex surface, while the electrostatic force may be used for the deformation of the concave surface. Also, the electrodes 409d may be constructed as a single electrode or a plurality of electrodes like the electrodes 409b. The condition of electrodes 409d constructed as the plurality of electrodes is shown in FIG. 25. In the description, all of the piezoelectric effect, the electrostrictive effect, and electrostriction are generally called the piezoelectric effect. Thus, it is assumed that the electrostrictive substance is included in the piezoelectric substance.

Figure 26:
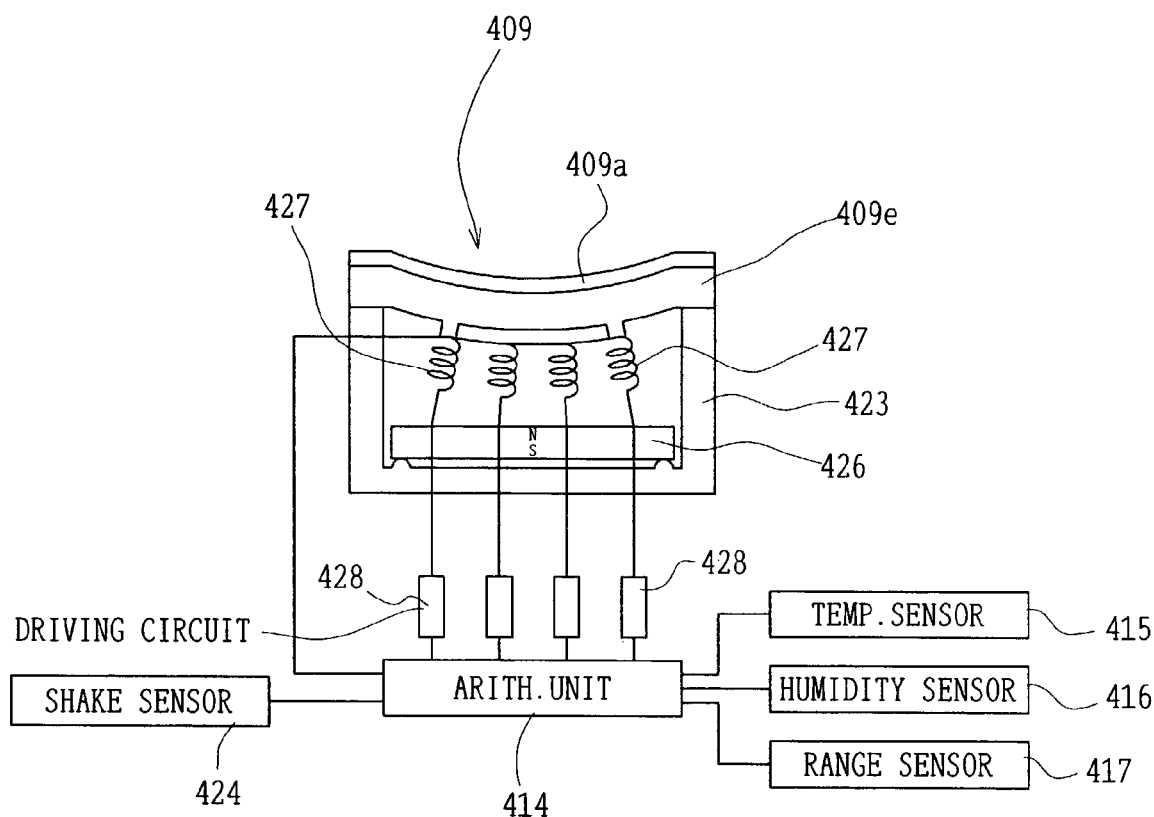
FIG. 26 is a view schematically showing another example of the deformable mirror.

FIG. 26 shows another example of the deformable mirror 409 applicable as the variable mirror used in the optical apparatus of the present invention. The deformable mirror 409 of this example is designed so that the shape of the reflecting surface can be changed by utilizing an electromagnetic force. A permanent magnet 426 is fixed on the bottom surface inside the support 423, and the periphery of a substrate 409e made with silicon nitride or polyimide is mounted and fixed on the top surface thereof. The thin film 409a with the coating of metal, such as aluminum, is deposited on the surface of the substrate 409e, thereby constituting the deformable mirror 409.

Below the substrate 409e, a plurality of coils 427 are fixedly mounted and connected to the arithmetical unit 414 through driving circuits 428. Other reference numerals of FIG. 26 are the same as in FIG. 21. In accordance with output signals from the arithmetical unit 414 corresponding to changes of the optical system obtained at the arithmetical unit 414 by signals from the sensor 415, 416, 417, and 424, proper electric currents are supplied from the driving circuits 428 to the coils 427. At this time, the coils 427 are repelled or attracted by the electromagnetic force with the permanent magnet 426 to deform the substrate 409e and the thin film 409a.

In this case, a different amount of current can also be caused to flow through each of the coils 427. A single coil 427 may be used. The permanent magnet 426 may be mounted on the lower surface of the substrate 409e so that the coils 427 are arranged on the bottom side in the support 423. It is desirable that the coils 427 are constructed as thin film coils by a lithography process. A ferromagnetic iron core may be encased in each of the coils 427.

Figure 27:
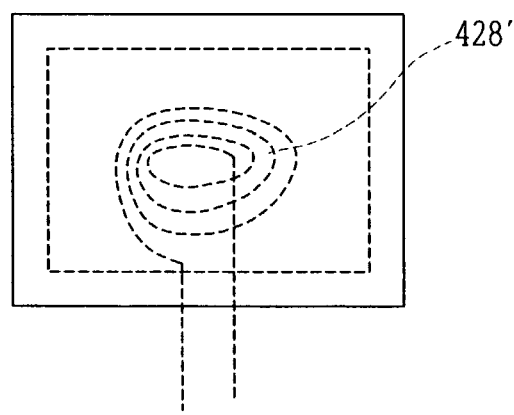
FIG. 27 is an explanatory view showing the winding density of a thin-film coil in the example of FIG. 26.

In the thin film coils, each of the coils 427, as illustrated in FIG. 27, can be designed so that a coil density varies with the place of the lower surface of the substrate 409e, like a coil 428', and thereby a desired deformation is brought to the substrate 409e and the thin film 409a. A single coil 427 may be used, or a ferromagnetic iron core may be encased in each of the coils 427.

Figure 28:
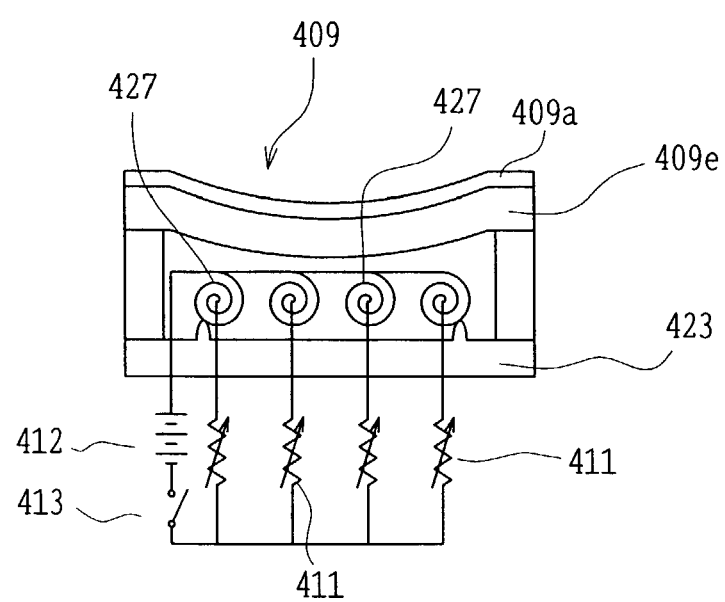
FIG. 28 is a view schematically showing another example of the deformable mirror.

FIG. 28 shows another example of the deformable mirror 409 applicable as the variable mirror used in the optical apparatus of the present invention. In the deformable mirror 409 of this example, the substrate 409e is made with a ferromagnetic such as iron, and the thin film 409a as a reflecting film is made with aluminum. The periphery of the substrate 409e is mounted and fixed on the top surface of the support 423. The coils 427 are fixed on the bottom side in the support 423. In this case, since the thin film coils need not be provided beneath the substrate 409e, the structure is simple and the manufacturing cost can be reduced. If the power switch 413 is replaced with a changeover and power on-off switch, the directions of currents flowing through the coils 427 can be changed, and the configurations of the substrate 409e and the thin film 409a can be changed at will.

Figure 29:
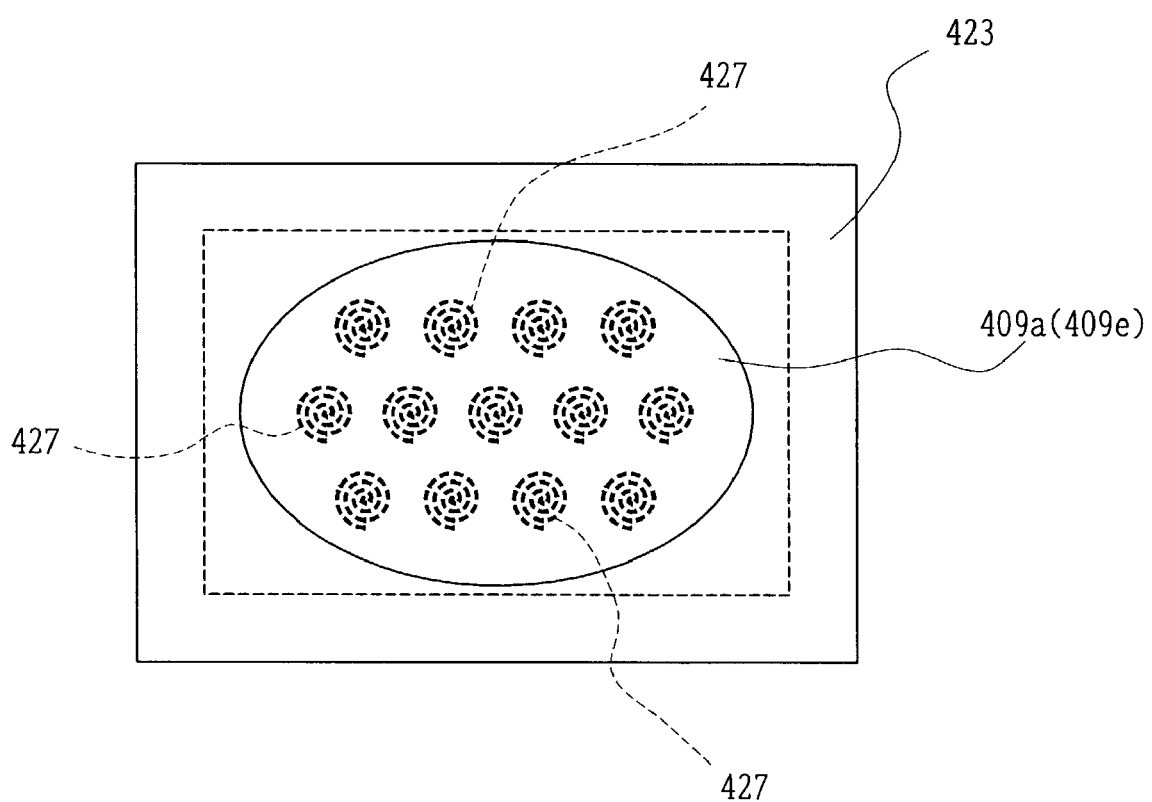
FIG. 29 is an explanatory view showing one example of an array of coils in the example of FIG. 28.
Figure 30:
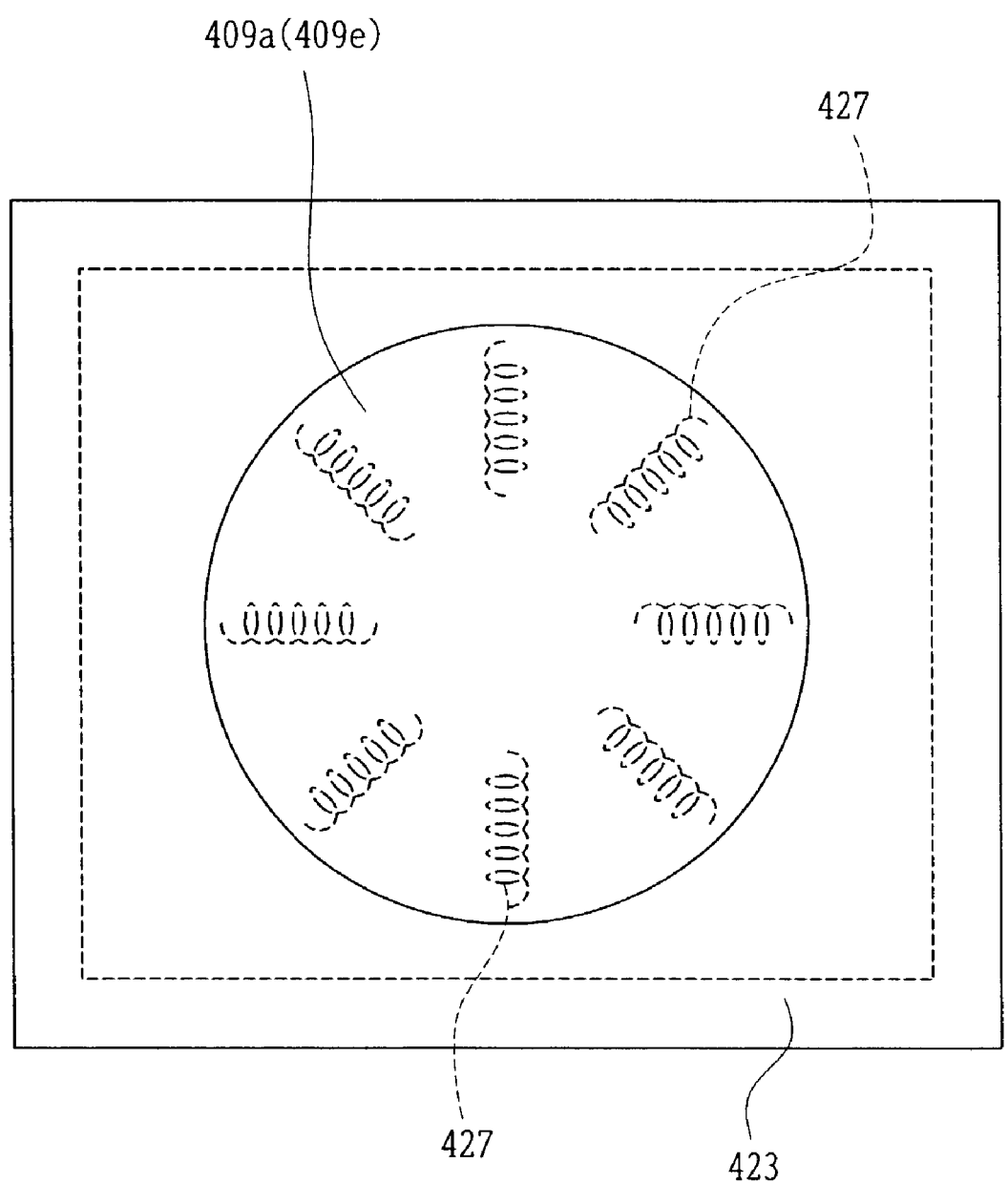
FIG. 30 is an explanatory view showing another example of the array of coils in the example of FIG. 28.
Figure 31:
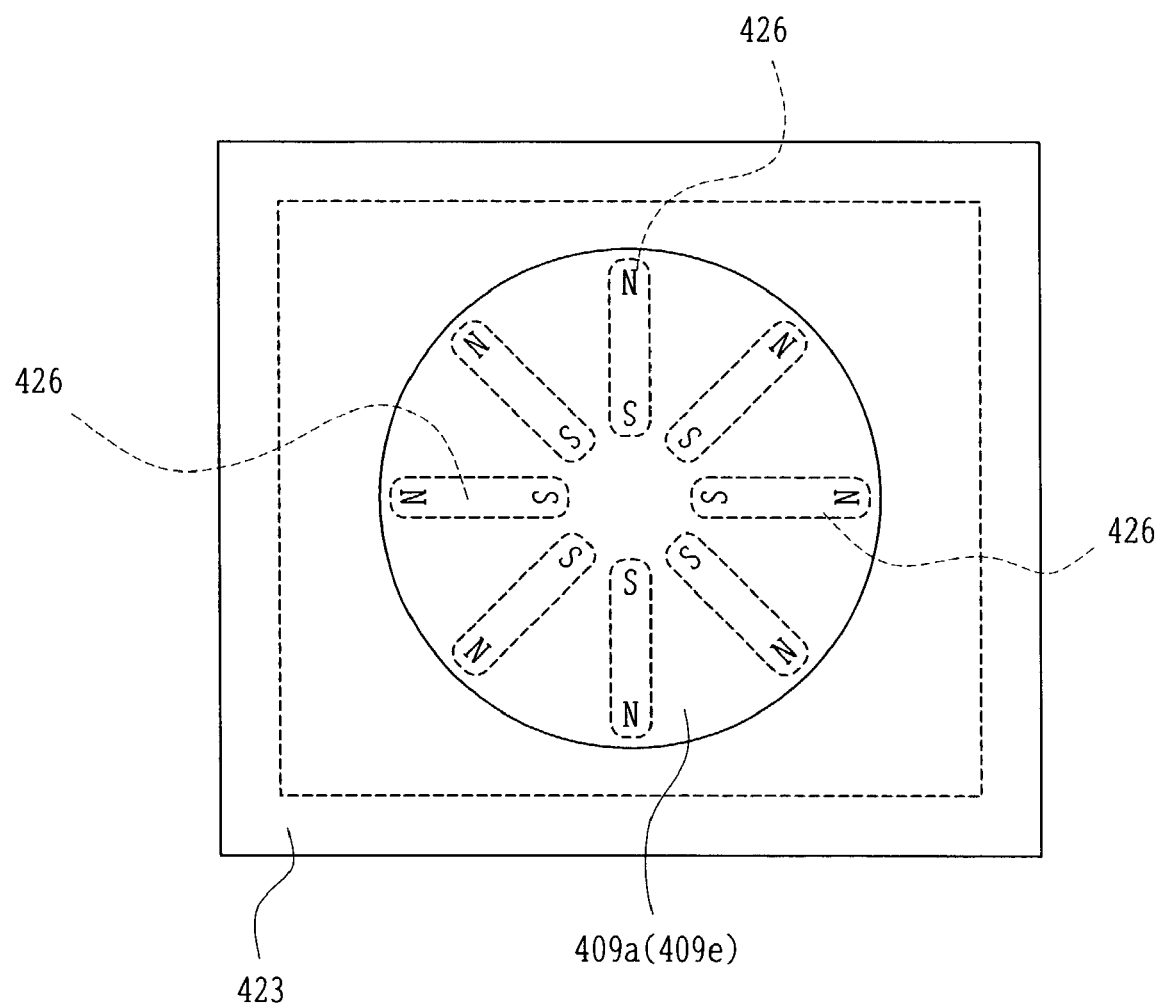
FIG. 31 is an explanatory view showing an array of permanent magnets suitable for the array of coils of FIG. 30 in the example of FIG. 26.

FIG. 29 shows an example of an array of the coils 427 arranged with respect to the thin film 409a and the substrate 409e. FIG. 30 shows another example of the array of the coils 427. These arrays are also applicable to the example of FIG. 30. FIG. 31 shows an array of the permanent magnets 426 suitable for the case where the coils 427, as shown in FIG. 30, are radially arrayed. Specifically, when the bar-shaped permanent magnets 426, as shown in FIG. 31, are radially arrayed, a delicate deformation can be provided to the substrate 409e and the thin film 409a in contrast with the example of FIG. 26. As mentioned above, when the electromagnetic force is used to deform the substrate 409e and the thin film 409a (in the examples of FIGS. 26 and 28), there is the advantage that they can be driven at a lower voltage than in the case where the electrostatic force is used.

Some examples of the deformable mirrors have been described, but as shown in the example of FIG. 25, at least two kinds of forces may be used in order to change the shape of the mirror constructed with a thin film. Specifically, at least two of the electrostatic force, electromagnetic force, piezoelectric effect, magnetrostriction, pressure of a fluid, electric field, magnetic field, temperature change, and electromagnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained.

Figure 32:
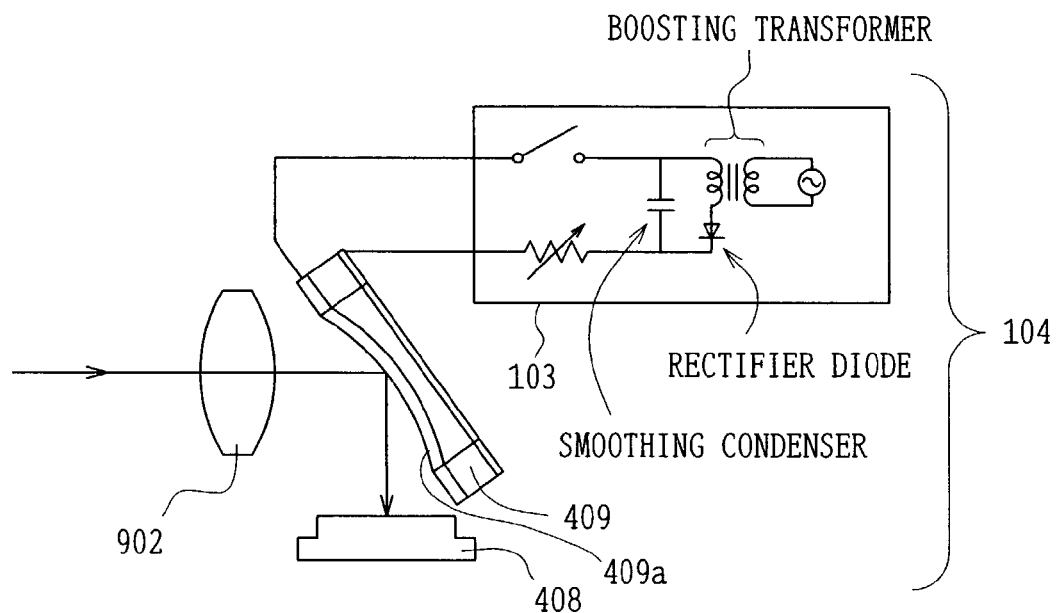
FIG. 32 is a view schematically showing an imaging system which uses the deformable mirror applicable to the optical apparatus of the present invention, for example, an imaging system used in a digital camera of a cellular phone, a capsule endoscope, an electronic endoscope, a digital camera for personal computers, or a digital camera for PDAs.

FIG. 32 shows an imaging system which uses the deformable mirror 409 applicable to the optical apparatus of the present invention and is used, for example, in a digital camera of a cellular phone, a capsule endoscope, an electronic endoscope, a digital camera for personal computers, or a digital camera for PDAs. In the imaging optical system of this example, one imaging unit 104, namely one optical apparatus, is constructed with the deformable mirror 409, the lens 902, the solid-state image sensor 408, and a control system 103. The imaging unit 104 of this example is designed so that light from an object passing through the lens 902 is condensed when reflected by the thin film (reflecting surface) of the deformable mirror 409, and is imaged on the solid-state image sensor 408. The deformable mirror 409 is a kind of variable optical-property element and is also referred to as a variable focal-length mirror.

According to this example, even when the object distance is changed, the reflecting surface 409a of the deformable mirror 409 is deformed and thereby the object can be brought into a focus. The example need not move the lens 902 by using a motor and excels in compact and lightweight design and low power consumption. The imaging unit 104 can be used in any of the examples as the imaging optical system of the present invention. When a plurality of deformable mirrors 409 are used, an optical system, such as a zoom imaging optical system or a variable magnification imaging optical system, can be constructed.

In FIG. 32, an example of a control system is cited which includes the boosting circuit of a transformer using coils in the control system 103. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect. In order to use the deformable mirror 409 for focusing, it is only necessary, for example, to form an object image on the solid-state image sensor 408 and to find a state where the high-frequency component of the object image is maximized while changing the focal length of the deformable mirror 409. In order to detect the high-frequency component, it is only necessary, for example, to connect a processor including a microcomputer to the solid-state image sensor 408 and to detect the high-frequency component therein.

Figure 33:
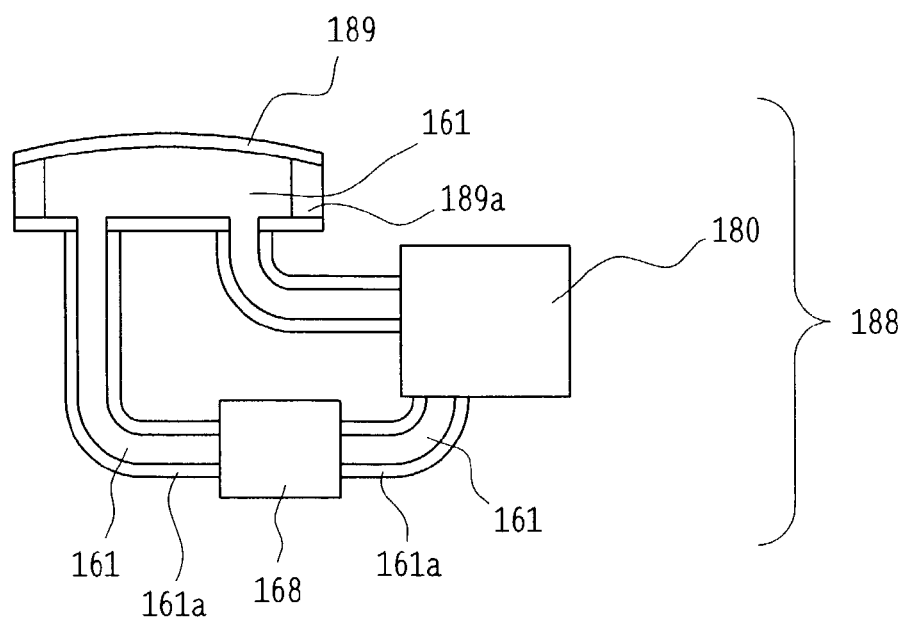
FIG. 33 is a view schematically showing the deformable mirror in which a fluid is taken in and out by a micropump to deform a lens surface.

FIG. 33 shows another example of the deformable mirror. In this figure, a deformable mirror 188 is constructed so that a fluid 161 in a pipe 161a is taken in and out by a micropump 180 to deform a mirror surface which is the upper surface of a reflecting film 189 extended and provided on the upper surface of a support 189a. According to this example, there is the merit that the mirror surface can be considerably deformed. Also, a liquid tank 168 is provided between the support 189a and the micropump 180, which are connected by the pipe, so that the fluid 161 can be supplied by a preset amount inside the support 189a.

The micropump 180 is a small-sized pump, for example, made by a micromachining technique and is constructed so that it is operated with an electric power. As examples of pumps made by the micromachining technique, there are those which use thermal deformations, piezoelectric substances, and electrostatic forces.

Figure 34:
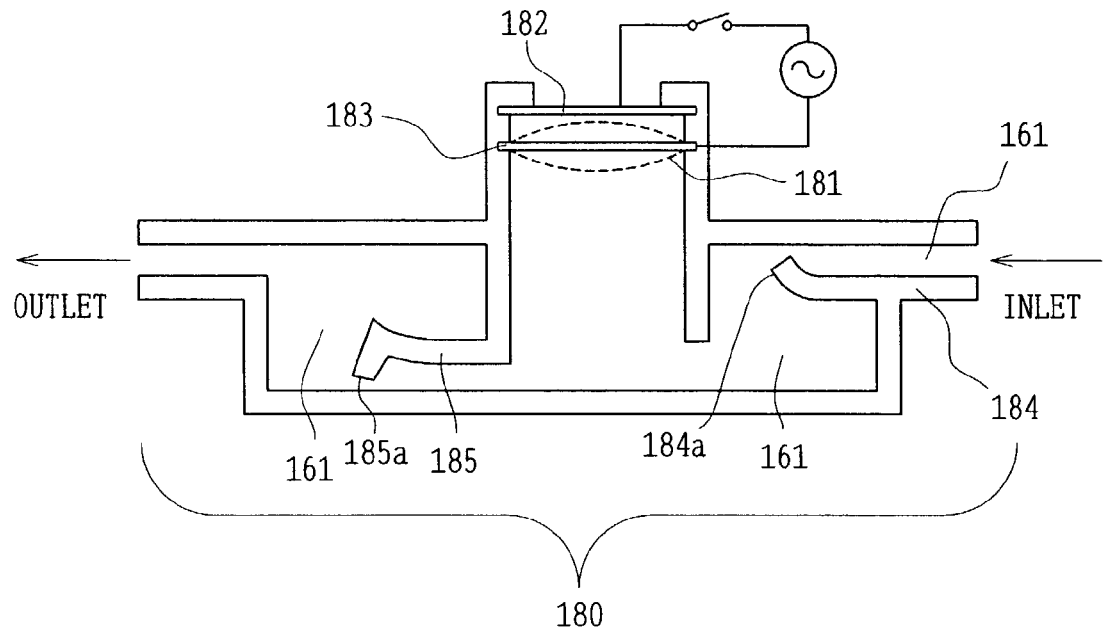
FIG. 34 is a view schematically showing one example of the micropump applicable to the deformable mirror.

FIG. 34 shows the micropump 180. In the micropump 180, a vibrating plate 181 taking the fluid 161 in and out is vibrated by the electrostatic force or the electric force of the piezoelectric effect. In this figure, a case where the vibrating plate is vibrated by the electrostatic force is shown and reference numerals 182 and 183 represent electrodes. Dotted lines indicate the vibrating plate 181 where it is deformed. When the vibrating plate 181 is vibrated, tops 184a and 185a of two valves 184 and 185 are opened and closed to feed the fluid 161 from the right to the left.

In the deformable mirror 188 shown in FIG. 33, the reflecting film 189 is deformed into a concave or convex surface in accordance with the amount of the fluid 161, and thereby the surface of the reflecting film 189 functions as the deformable mirror. The deformable mirror 188 is driven by the fluid 161. An organic or inorganic substance, such as silicon oil, air, water, or jelly, can be used as the fluid.

In the deformable mirror or the variable focal-length lens which uses the electrostatic force or the piezoelectric effect, a high voltage is sometimes required for drive. In this case, for example, as shown in FIG. 32, it is desirable that the boosting transformer or the piezoelectric transformer is used to constitute the control system.

If each of the thin film 409a for reflection and the reflecting film 189 is provided with a portion which is fixed to the support 423 or 189a as a portion which is not deformed, it can be used as a reference surface when the profile of the deformable mirror is measured by an interferometer, which is convenient.

Figure 35:
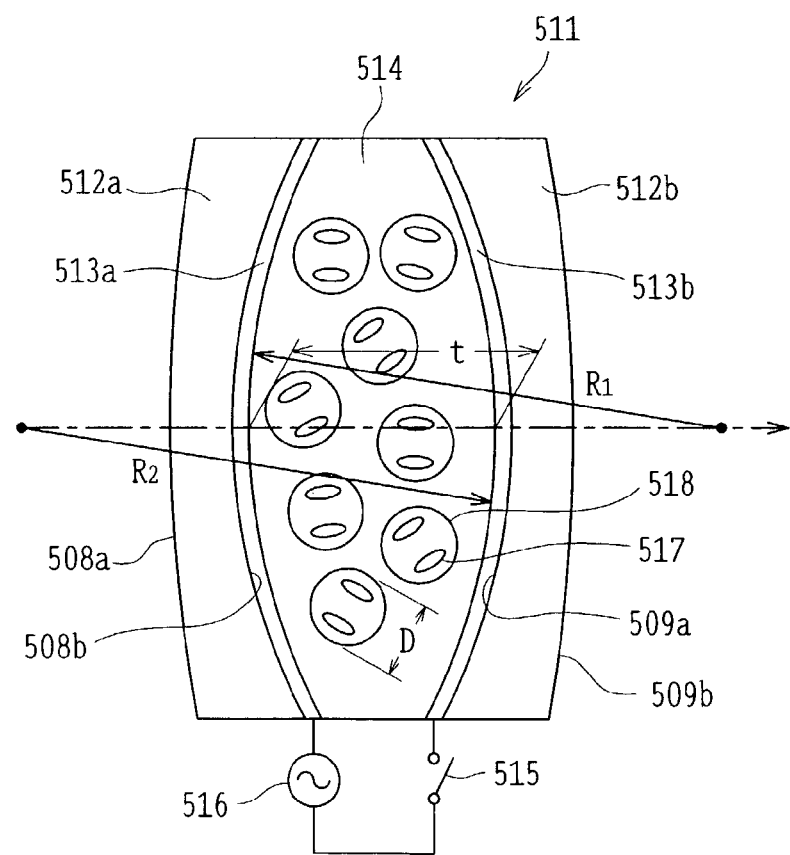
FIG. 35 is a view showing the principle structure of a variable focal-length lens.

FIG. 35 shows the principle structure of the variable focal-length lens applicable to the optical system and the optical apparatus of the present invention. A variable focal-length lens 511 includes a first lens 512a having lens surfaces 508a and 508b as a first surface and a second surface, respectively, a second lens 512b having lens surfaces 509a and 509b as a third surface and a fourth surface, respectively, and a macromolecular dispersed liquid crystal layer 514 sandwiched between these lenses through transparent electrodes 513a and 513b. Incident light is converged through the first and second lenses 512a and 512b. The transparent electrodes 513a and 513b are connected to an alternating-current power supply 516 through a switch 515 so that an alternating-current electric field is selectively applied to the macromolecular dispersed liquid crystal layer 514. The macromolecular dispersed liquid crystal layer 514 is composed of a great number of minute macromolecular cells 518, each having any shape, such as a sphere or polyhedron, and including liquid crystal molecules 517, and the volume of each cell is equal to the sum of volumes occupied by macromolecules and the liquid crystal molecules 517 which constitute the macromolecular cells 518.

Here, for the size of each of the macromolecular cells 518, for example, in the case of a sphere, when an average diameter is denoted by D and the wavelength of light used is denoted by λ, the average diameter D is chosen to satisfy the following condition:

$$2\ nm \leq D \leq \lambda/5 \qquad (1)$$

That is, the size of each of the liquid crystal molecules 517 is at least about 2 nm and thus the lower limit of the average diameter D is set to 2 nm or larger. The upper limit of the diameter D depends on a thickness t of the macromolecular dispersed liquid crystal layer 514 in the direction of the optical axis of the variable focal-length lens 511. However, if the diameter is larger than the wavelength λ, a difference between the refractive indices of the macromolecules constituting the macromolecular cell 518 and the liquid crystal molecules 517 will cause light to be scattered at the interfaces of the macromolecular cells 518 and will render the liquid crystal layer 514 opaque. Hence, the upper limit of the diameter D should preferably be λ/5 or less. A high degree of accuracy is not necessarily required, depending on an optical product using the variable focal-length lens. In this case, the diameter D below the value of the wavelength λ is satisfactory. Also, the transparency of the macromolecular dispersed liquid crystal layer 514 deteriorates with increasing thickness t.

Figure 36:
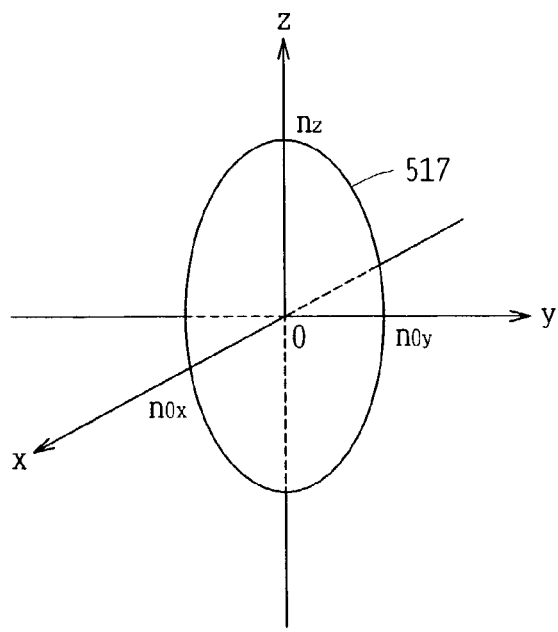
FIG. 36 is a view showing the index ellipsoid of a nematic liquid crystal of uniaxial anisotropy.

In the liquid crystal molecules 517, for example, uniaxial nematic liquid crystal molecules are used. The index ellipsoid of each of the liquid crystal molecules 517 is as shown in FIG. 36. That is, $$n_{ox} = n_{oy} = n_o \qquad (2)$$

where $n_o$ is the refractive index of an ordinary ray, and $n_{ox}$ and $n_{oy}$ are refractive indices in directions perpendicular to each other in a plane including ordinary rays.

Figure 37:
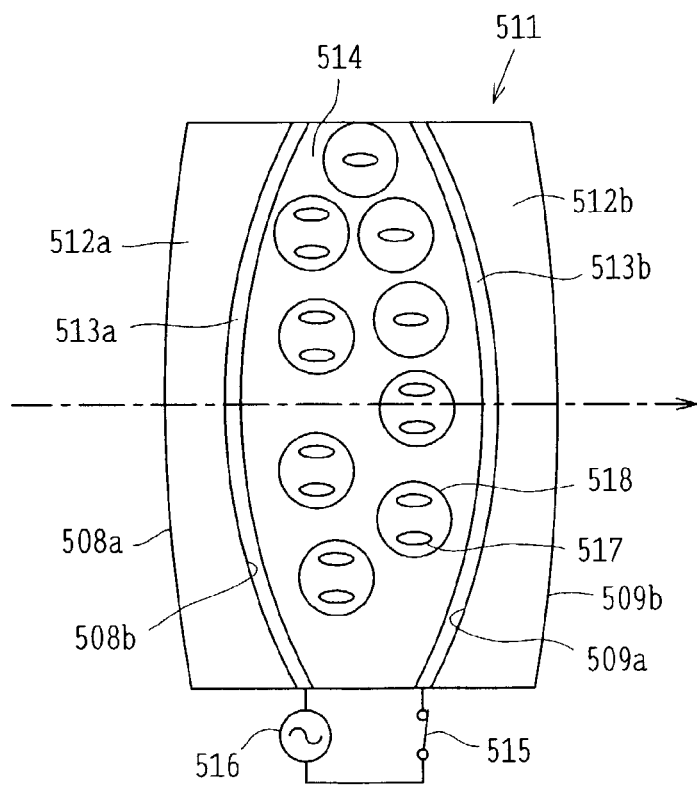
FIG. 37 is a view showing a state where an electric field is applied to a macromolecular dispersed liquid crystal layer in FIG. 35.

Here, in the case where the switch 515, as shown in FIG. 35 is turned off, that is, the electric field is not applied to the liquid crystal layer 514, the liquid crystal molecules 517 are oriented in various directions, and thus the refractive index of the liquid crystal layer 514 relative to incident light becomes high to provide a lens with strong refracting power. In contrast to this, when the switch 515, as shown in FIG. 37, is turned on and the alternating-current electric field is applied to the liquid crystal layer 514, the liquid crystal molecules 517 are oriented so that the major axis of the index ellipsoid of each liquid crystal molecule 517 is parallel with the optical axis of the variable focal-length lens 511, and hence the refractive index becomes lower to provide a lens with weaker refracting power.

Figure 38:
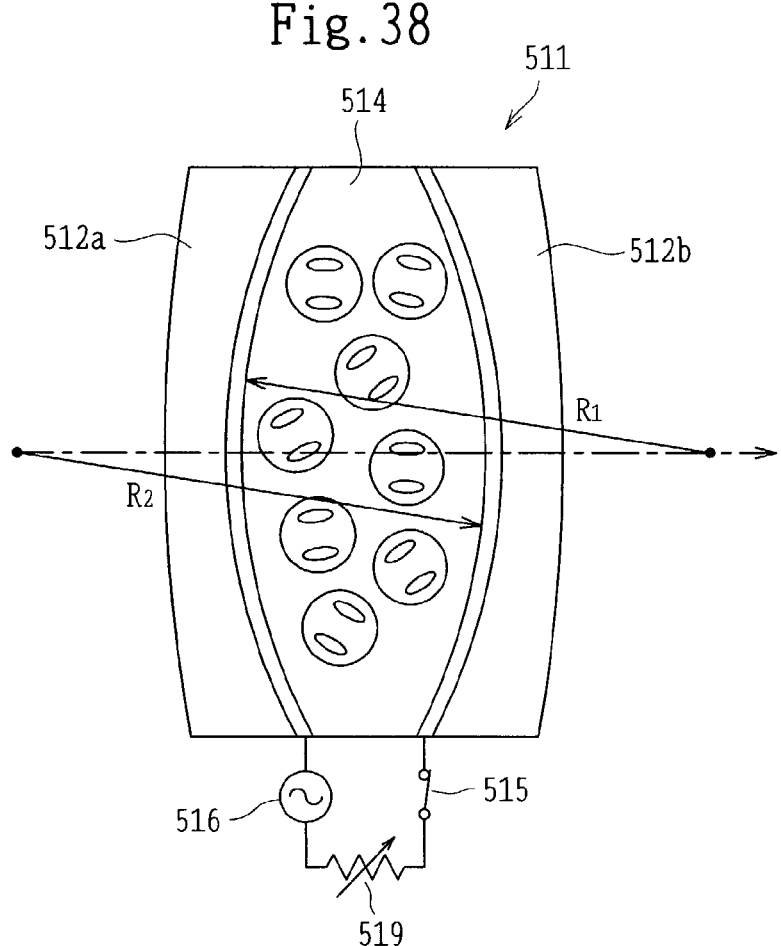
FIG. 38 is a view showing an example where a voltage applied to the macromolecular dispersed liquid crystal layer in FIG. 35 can be changed.

The voltage applied to the macromolecular dispersed liquid crystal layer 514, for example, as shown in FIG. 38, can be changed stepwise or continuously by a variable resistor 519. By doing so, as the applied voltage becomes high, the liquid crystal molecules 517 are oriented so that the major axis of the index ellipsoid of each liquid crystal molecule 517 becomes progressively parallel with the optical axis of the variable focal-length lens 511, and thus the refractive index can be changed stepwise or continuously.

Here, in the case of FIG. 35, that is, in the case where the electric field is not applied to the macromolecular dispersed liquid crystal layer 514, when the refractive index in the direction of the major axis of the index ellipsoid, as shown in FIG. 36, is denoted by $n_z$, an average refractive index $n_{LC}'$ of the liquid crystal molecules 517 is roughly given by $$(n_{ox} + n_{oy} + n_z)/3 \equiv n_{LC}' \qquad (3)$$

Also, when the refractive index $n_z$ is expressed as a refractive index $n_e$ of an extraordinary ray, an average refractive index $n_{LC}$ of the liquid crystal molecules 517 where Equation (2) is established is given by $$(2n_o + n_e)/3 \equiv n_{LC} \qquad (4)$$

In this case, when the refractive index of each of the macromolecules constituting the macromolecular cells 518 is represented by $n_p$ and the ratio of volume between the liquid crystal layer 514 and the liquid crystal molecules 517 is represented by ff, a refractive index $n_A$ of the liquid crystal layer 514 is given from the Maxwell-Garnet's law as $$n_A = ff \cdot n_{LC}' + (1 - ff) n_p \qquad (5)$$

Thus, as shown in FIG. 35 or 38, when the radii of curvature of the inner surfaces of the lenses 512a and 512b, that is, the surfaces on the side of the liquid crystal layer 514, are represented by $R_1$ and $R_2$, a focal length $f_1$ of the lens constructed with the liquid crystal layer 514 is given by $$1/f_1 = (n_A - 1)(1/R_1 - 1/R_2) \qquad (6)$$

Also, when the center of curvature is located on the image side, it is assumed that each of the radii of curvature $R_1$ and $R_2$ is positive. Refraction caused by the outer surface of each of the lenses 512a and 512b is omitted. That is, the focal length of the lens constructed with only the liquid crystal layer 514 is given by Equation (6).

When the average refractive index of ordinary rays is expressed as $$(n_{ox} + n_{oy})/2 = n_o' \qquad (7)$$

a refractive index $n_B$ of the liquid crystal layer 514 in the case of FIG. 37, namely, in the case where the electric field is applied to the liquid crystal layer 514, is given by $$n_B = ff \cdot n_o' + (1 - ff) n_p \qquad (8)$$

and thus a focal length $f_2$ of the lens constructed with only the liquid crystal layer 514 in this case is given by $$1/f_2 = (n_B - 1)(1/R_1 - 1/R_2) \qquad (9)$$

Also, the focal length where a lower voltage than in FIG. 37 is applied to the liquid crystal layer 514 takes a value between the focal length $f_1$ given by Equation (6) and the focal length $f_2$ by Equation (9).

From Equations (6) and (9), a change rate of the focal length of the lens constructed with the liquid crystal layer 514 is given by $$|(f_2 - f_1)/f_2| = |(n_B - n_A)/(n_A - 1)| \qquad (10)$$

Thus, in order to increase the change rate, it is only necessary to increase the value of $|n_B - n_A|$. Here, $$n_B - n_A = ff(n_o' - n_{LC}') \qquad (11)$$

and hence if the value of $|n_o' - n_{LC}'|$ is increased, the change rate can be raised. Practically, since the refractive index $n_B$ of the liquid crystal layer 514 is about 1.3-2, the value of $|n_o' - n_{LC}'|$ is chosen so as to satisfy the following condition:

$$0.01 \leq |n_o' - n_{LC}'| \leq 10 \qquad (12)$$

In this way, when ff=0.5, the focal length of the lens constructed with the liquid crystal layer 514 can be changed by at least 0.5%, and thus an effective variable focal-length lens can be obtained. Also, the value of $|n_o'-n_{LC}'|$ cannot exceed 10 because of restrictions on liquid crystal substances.

Subsequently, a description will be given of grounds for the upper limit of Condition (1). The variation of a transmittance τ where the size of each cell of a macromolecular dispersed liquid crystal is changed is described in "Transmission variation using scattering/transparent switching films" on pages 197-214 of "Solar Energy Materials and Solar Cells", Wilson and Eck, Vol. 31, Eleesvier Science Publishers B. v., 1993. In FIG. 7 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance τ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance τ becomes at least 70-80% and the liquid crystal can be actually used as a lens, if the liquid crystal satisfies the following condition:

$$D \cdot t \leq \lambda \cdot 15 \, \mu m \tag{13}$$

Hence, for example, in the case of t=75 μm, if D≤λ/5, a satisfactory transmittance can be obtained.

The transmittance of the macromolecular dispersed liquid crystal layer 514 is raised as the value of the refractive index $n_p$ approaches the value of the refractive index $n_{LC}'$. On the other hand, if the values of the refractive indices $n_o'$ and $n_p$ are different from each other, the transmittance of the liquid crystal layer 514 will be degraded. In FIGS. 35 and 37, the transmittance of the liquid crystal layer 514 is improved on an average when the liquid crystal layer 514 satisfies the following equation:

$$n_p = (n_o' + n_{LC}')/2 \tag{14}$$

The variable focal-length lens 511 having the lens constructed with the macromolecular dispersed liquid crystal layer 514 between the first lens 512a and the second lens 412b is used as a lens, and thus in both FIGS. 35 and 37, it is desirable that the transmittances are almost the same and high. For this, although there are limits to the substances of the macromolecules and the liquid crystal molecules 517 constituting the macromolecular cells 518, it is only necessary, in practical use, to satisfy the following condition:

$$n_o' \leq n_p \leq n_{LC}' \tag{15}$$

When Equation (14) is satisfied, Condition (13) is moderated and it is only necessary to satisfy the following condition:

$$D \cdot t \leq \lambda \cdot 60 \, \mu m \tag{16}$$

It is for this reason that, according to the Fresnel's law of reflection, the reflectance is proportional to the square of the difference of the refractive index, and thus the reflection of light at the interfaces between the macromolecules and the liquid crystal molecules 517 constituting the macromolecular cells 518, that is, a reduction in the transmittance of the liquid crystal layer 514, is roughly proportional to the square of the difference in refractive index between the macromolecules and the liquid crystal molecules 517.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \, \mu m \cdot (1.585 - 1.45)^2 / (n_u - n_p)^2 \tag{17}$$

where $(n_u - n_p)^2$ is a value when one of $(n_{LC}' - n_p)^2$ and $(n_o' - n_p)^2$ is larger than the other.

In order to largely change the focal length of the lens constructed with the macromolecular dispersed liquid crystal layer 514, it is favorable that the ratio ff is as high as possible, but in the case of ff=1, the volume of the macromolecule becomes zero and the macromolecular cells 518 cease to be formable. Thus, it is necessary to satisfy the following condition:

$$0.1 = \text{ff} \leq 0.999 \tag{18}$$

On the other hand, the transmittance τ improves as the ratio ff becomes low, and hence Condition (17) may be moderated, preferably, as follows:

$$4 \times 10^{-6} \, [\mu m]^2 \leq D \cdot t \leq \lambda \cdot 45 \, \mu m \cdot (1.585 - 1.45)^2 / (n_u - n_p)^2 \tag{19}$$

Also, the lower limit of the thickness t, as is obvious from FIG. 35, corresponds to the diameter D, which is at least 2 nm as described above, and therefore the lower limit of D·t becomes $(2 \times 10^{-3} \, \mu m)^2$, namely $4 \times 10^{-6} \, [\mu m]^2$.

An approximation where the optical property of substance is represented by the refractive index is established when the diameter D is 5-10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 517 constituting the macromolecular cells 518 is increased in accordance with the Fresnel's equation of reflection. As such, in practical use, the diameter D must be chosen so as to satisfy the following condition:

$$7 \, \text{nm} \leq D \leq 500 \, \lambda \tag{20}$$

Figure 39:
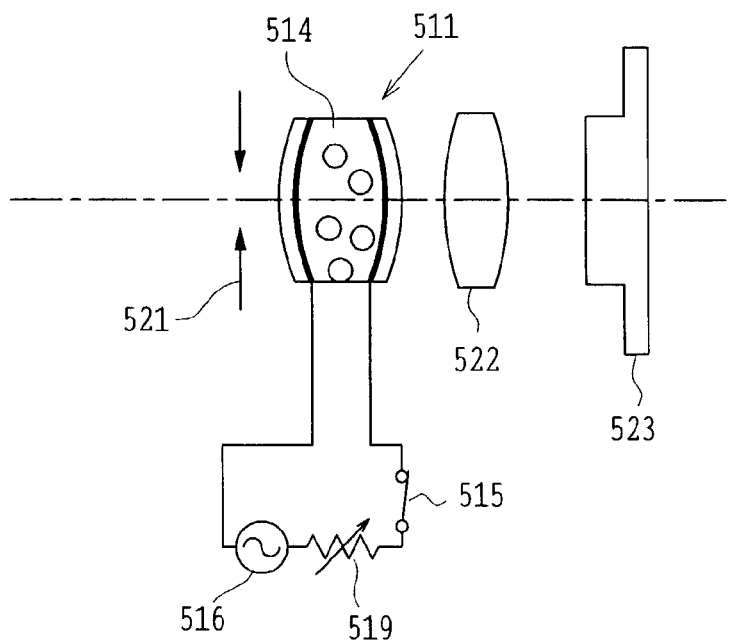
FIG. 39 is a view showing an example of an imaging optical system for digital cameras which uses the variable focal-length lens.

FIG. 39 shows an imaging optical system for digital cameras using the variable focal-length lens 511 of FIG. 38. In this imaging optical system, an image of an object (not shown) is formed on a solid-state image sensor 523, such as a CCD, through a stop 521, the variable focal-length lens 511, and a lens 522. Also, in FIG. 39, the liquid crystal molecules are not shown.

According to such an imaging optical system, the alternating voltage applied to the macromolecular dispersed liquid crystal layer 514 of the variable focal-length lens 511 is controlled by the variable resistor 519 to change the focal length of the variable focal-length lens 511. Whereby, without moving the variable focal-length lens 511 and the lens 522 along the optical axis, it becomes possible to perform continuous focusing with respect to the object distance, for example, from the infinity to 600 mm.

Figure 40:
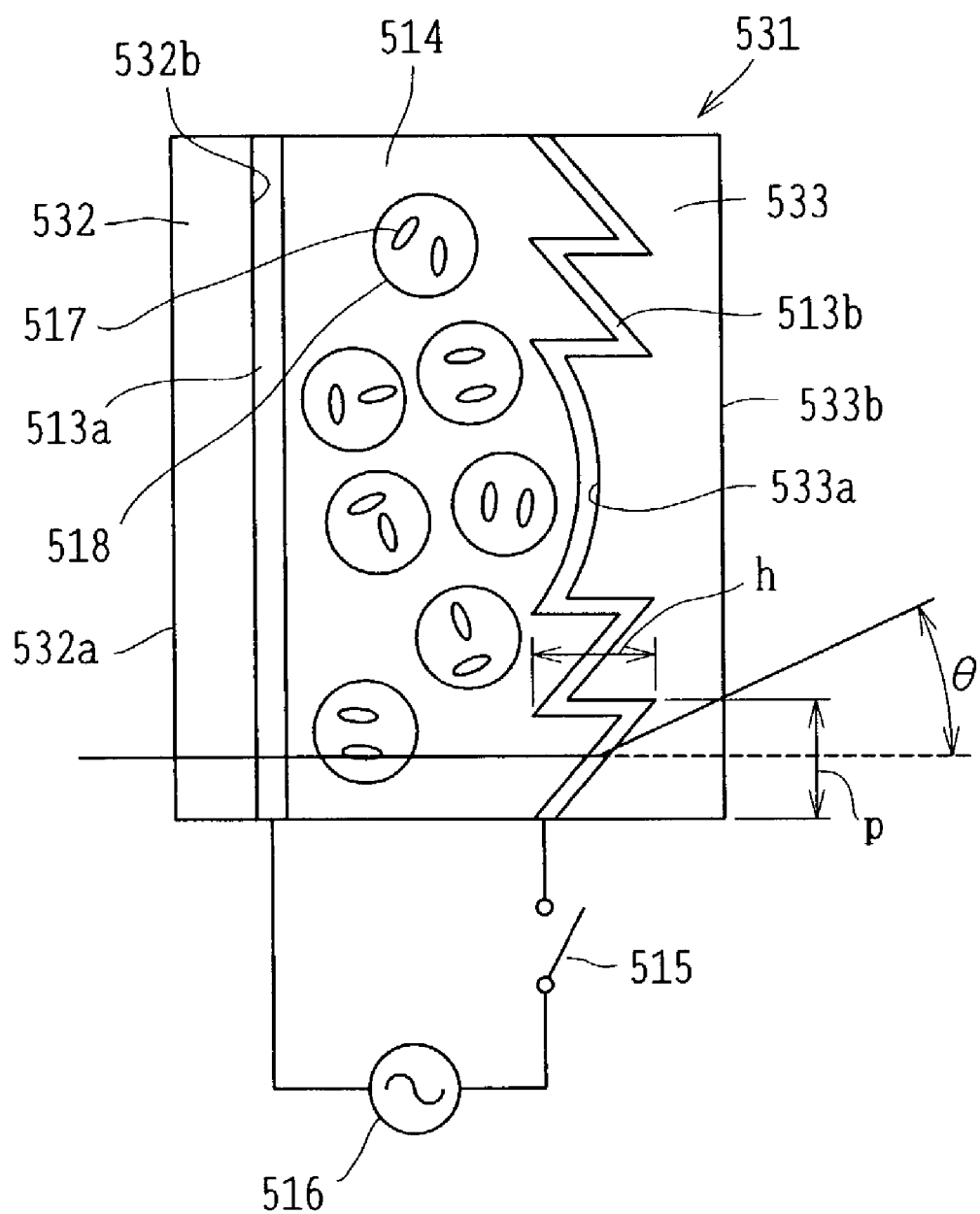
FIG. 40 is a view showing an example of a variable focal-length diffraction optical element.

FIG. 40 shows one example of a variable focal-length diffraction optical element as the variable optical-property element. This variable focal-length diffraction optical element 531 includes a first transparent substrate 532 having a first surface 532a and a second surface 532b which are parallel with each other and a second transparent substrate 533 having a third surface 533a which is constructed with an annular diffraction grating of saw-like cross section having the depth of a groove corresponding to the wavelength of light and a fourth surface 533b which is flat. Incident light emerges through the first and second transparent substrates 532 and 533. Between the first and second transparent substrates 532 and 533, as in FIG. 35, the macromolecular dispersed liquid crystal layer 514 is sandwiched through the transparent electrodes 513a and 513b so that the transparent electrodes 513a and 513b are connected to the alternating-current power supply 516 through the switch 515 and the alternating-current voltage is applied to the macromolecular dispersed liquid crystal layer 514.

In such a structure, when the grating pitch of the third surface 533a is represented by p and an integer is represented by m, a ray of light incident on the variable focal-length diffraction optical element 531 is deflected by an angle θ satisfying the following equation:

$$p \sin\theta = m\lambda \quad (21)$$

and emerges therefrom. When the depth of the groove is denoted by h, the refractive index of the transparent substrate 533 is denoted by $n_{33}$, and an integer is denoted by k, a diffraction efficiency becomes 100% at the wavelength λ and the production of flare can be prevented by satisfying the following equations:

$$h(n_A - n_{33}) = m\lambda \quad (22)$$

$$h(n_B - n_{33}) = k\lambda \quad (23)$$

where $n_A$ is a refractive index in a state where the alternating-current voltage is not applied to the liquid crystal layer 514 and $n_B$ is a refractive index in a state where the alternating-current voltage is applied to the liquid crystal layer 514.

Here, the difference in both sides between Equations (22) and (23) is given by $$h(n_A - n_B) = (m-k)\lambda \quad (24)$$

Therefore, when it is assumed that λ=500 nm, $n_A$=1.55, and $n_B$=1.5, $$0.05 h = (m-k) \cdot 500 \, nm$$

and when m=1 and k=0, $$h = 10000 \, nm = 10 \, \mu m$$

In this case, the refractive index $n_{33}$ of the transparent substrate 533 is obtained as 1.5 from Equation (22). When the grating pitch p on the periphery of the variable focal-length diffraction optical element 531 is assumed to be 10 μm, θ≈2.87° and a lens with an F-number of 10 can be obtained.

The variable focal-length diffraction optical element 531, whose optical path length is changed by the on-off operation of the voltage applied to the liquid crystal layer 514, for example, can be used for focus adjustment in such a way that it is placed at a portion where the light beam of a lens system is not parallel, or can be used to change the focal length of the entire lens system.

In this example, it is only necessary that Equations (22)-(24) are set in practical use to satisfy the following conditions:

$$0.7 \, m\lambda \leq h(n_A - n_{33}) \leq 1.4 \, m\lambda \quad (25)$$

$$0.7 \, k\lambda \leq h(n_A - n_{33}) \leq 1.4 \, k\lambda \quad (26)$$

$$0.7(m-k)\lambda \leq h(n_A - n_B) \leq 1.4(m-k)\lambda \quad (27)$$

Figure 41:
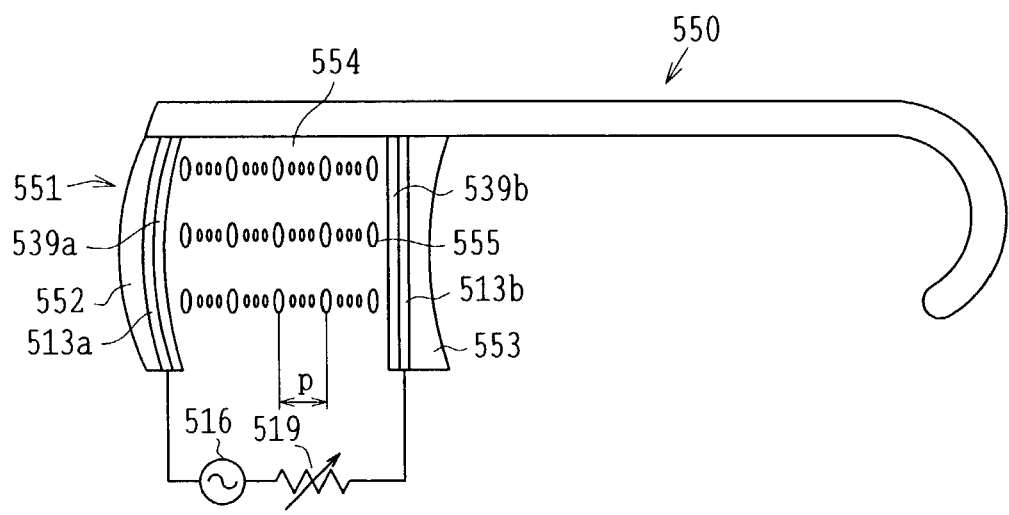
FIG. 41 is a view showing variable focal-length spectacles, each having a variable focal-length lens which uses a twisted nematic liquid crystal.
Figure 42:
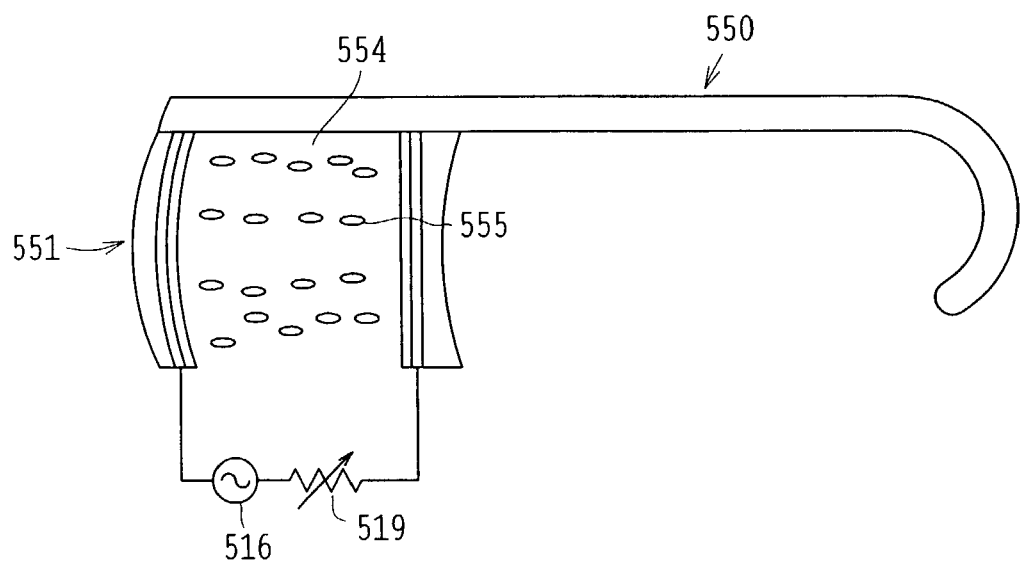
FIG. 42 is a view showing the orientation of liquid crystal molecules where a voltage applied to a twisted nematic liquid crystal layer of FIG. 41 is increased.

A variable focal-length lens using a twisted nematic liquid crystal also falls into the category of the present invention. FIGS. 41 and 42 show variable focal-length spectacles 550 in this case and cross sections thereof. A variable focal-length lens 551 has lenses 552 and 553, orientation films 539a and 539b provided through the transparent electrodes 513a and 513b, respectively, inside these lenses, and a twisted nematic liquid crystal layer 554 sandwiched between the orientation films. The transparent electrodes 513a and 513b are connected to the alternating-current power supply 516 through the variable resistor 519 so that the alternating-current voltage is applied to the twisted nematic liquid crystal layer 554.

In this structure, when the voltage applied to the twisted nematic liquid crystal layer 554 is increased, liquid crystal molecules 555, as illustrated in FIG. 42, exhibit a homeotropic orientation, in which the refractive index of the liquid crystal layer 554 is lower and the focal length is longer than in a twisted nematic state of FIG. 41 in which the applied voltage is low.

A spiral pitch P of the liquid crystal molecules 555 in the twisted nematic state of FIG. 41 must be made nearly equal to, or much smaller than, the wavelength λ of light, and thus is set to satisfy the following condition:

$$2 \, nm \leq P \leq 2\lambda/3 \quad (28)$$

Also, the lower limit of this condition depends on the sizes of the liquid crystal molecules 555, while the upper limit is a value necessary for the behavior of the liquid crystal layer 554 as an isotropic medium in a state of FIG. 41 when incident light is natural light. If the upper limit of the condition is overstepped, the variable focal-length lens 551 is changed to a lens in which the focal length varies with the direction of deflection. Hence, a double image is formed and only a blurred image is obtained.

Figure 43A:
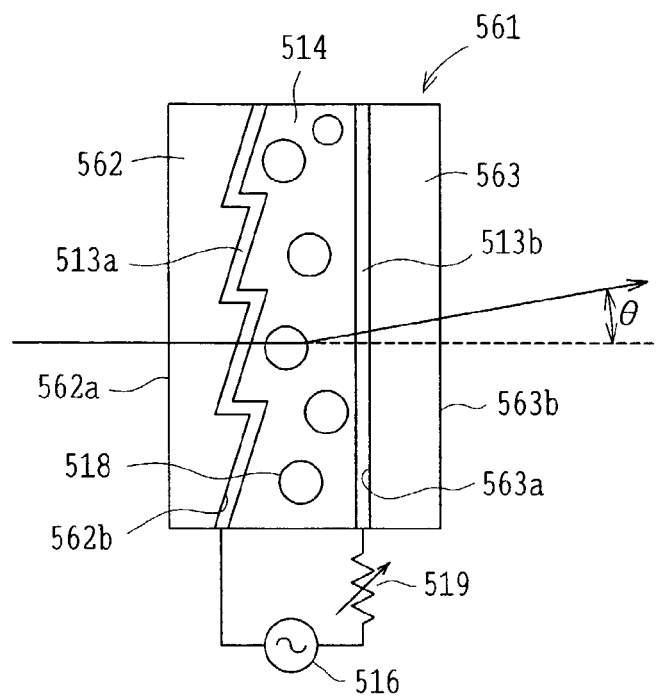
FIGS. 43A and 43B are views showing two examples of variable deflection-angle prisms.
Figure 43B:
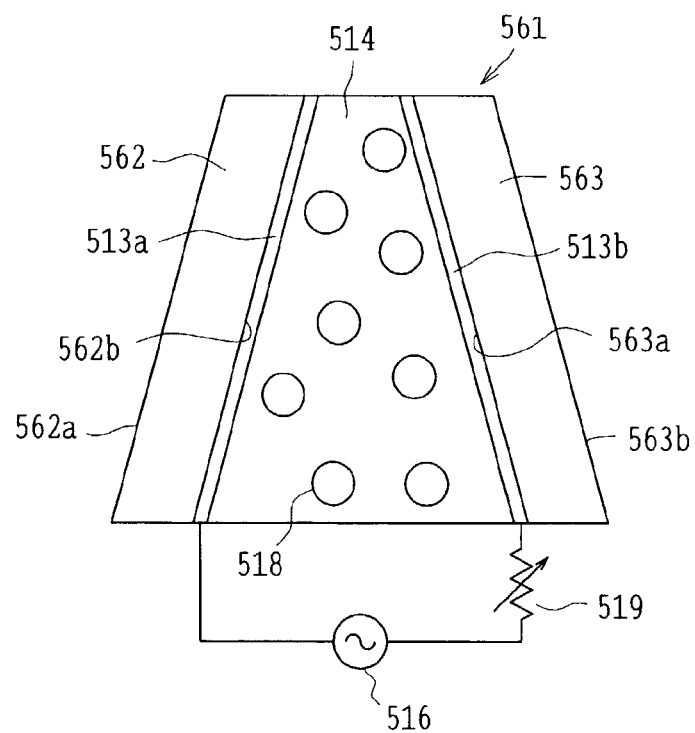

FIG. 43A shows a variable deflection-angle prism as the variable optical-property element. A variable deflection-angle prism 561 includes a first transparent substrate 562 on the entrance side, having a first surface 562a and a second surface 562b; and a second transparent substrate 563 of a plane-parallel plate on the exit side, having a third surface 563a and a fourth surface 563b. The inner surface (the second surface) 562b of the transparent substrate 562 on the entrance side is configured into a Fresnel form, and the macromolecular dispersed liquid crystal layer 514, as in FIG. 35, is sandwiched between the transparent substrate 562 and the transparent substrate 563 on the exit side through the transparent electrodes 513a and 513b. The transparent electrodes 513a and 513b are connected to the alternating-current power supply 516 through the variable resistor 519. Whereby, the alternating-current voltage is applied to the liquid crystal layer 514 so that a deflection angle θ of light transmitted through the variable deflection-angle prism 561 is controlled. In this way, transmission light is controlled with respect to the direction of deflection. Also, in FIG. 43A, the inner surface 562b of the transparent substrate 562 is configured into the Fresnel form, but as shown in FIG. 43B, the inner surfaces of the transparent substrates 562 and 563 may be configured like an ordinary prism whose surfaces are relatively inclined, or may be configured like the diffraction grating shown in FIG. 40. In the case of the latter, Equations (21)-(24) and Conditions (25)-(27) apply equally.

Figure 44:
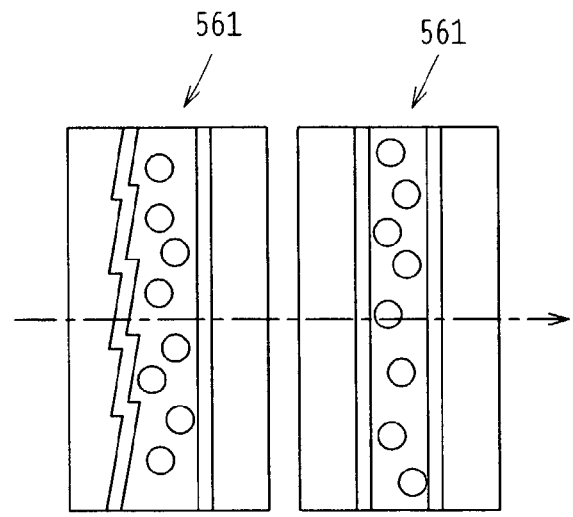
FIG. 44 is a view for explaining the applications of the variable deflection-angle prisms shown in FIGS. 43A and 43B.

The variable deflection-angle prism 561 constructed mentioned above can be effectively used for shake prevention for TV cameras, digital cameras, film cameras, binoculars, etc. In this case, it is desirable that the direction of refraction (deflection) of the variable deflection-angle prism 561 is vertical. In order to further improve its performance, it is desirable that two variable deflection-angle prisms 561, one of which is shown in FIG. 43A, are used and arranged so that the direction of deflection of each of the prisms 561 is varied and as shown in FIG. 44, the refraction angles are changed in vertical and lateral directions. Also, in FIGS. 43A, 43B, and 44, the liquid crystal molecules are omitted.

Figure 45:
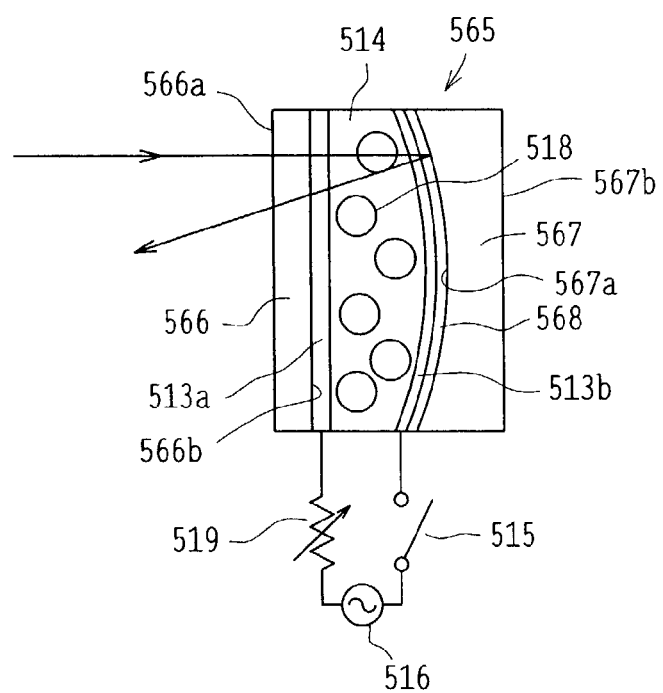
FIG. 45 is a view schematically showing an example of a variable focal-length mirror as the variable focal-length lens.

FIG. 45 shows an example where a variable focal-length lens is used as the variable focal-length mirror in the optical system. A variable focal-length mirror 565 includes a first transparent substrate 566 having a first surface 566a and a second surface 566b, and a second transparent substrate 567 having a third surface 567a and a fourth surface 567b. The first transparent substrate 566 is configured into a flat plate or lens shape to provide the transparent electrode 513a on the inner surface (the second surface) 566b. The second transparent substrate 567 is such that the inner surface (the third surface) 567a is configured as a concave surface, on which a reflecting film 568 is deposited, and the transparent electrode 513b is provided on the reflecting film 568. Between the transparent electrodes 513a and 513b, as in FIG. 35, the macromolecular dispersed liquid crystal layer 514 is sandwiched so that the transparent electrodes 513a and 513b are connected to the alternating-current power supply 516 through the switch 515 and the variable resistor 519, and the alternating-current voltage is applied to the macromolecular dispersed liquid crystal layer 514. Also, in FIG. 45, the liquid crystal molecules are omitted.

According to the above structure, since a ray of light incident from the side of the transparent substrate 566 is passed again through the liquid crystal layer 514 by the reflecting film (reflecting surface) 568, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, the conditions mentioned above can be used. Moreover, the inner surface of the transparent substrate 566 or 567, as shown in FIG. 40, can also be configured into a diffraction grating shape to reduce the thickness of the liquid crystal layer 514. By doing so, the amount of scattered light can be decreased.

In the above description, in order to prevent the deterioration of the liquid crystal, the alternating-current power supply 516 is used as a voltage source to apply the alternating-current voltage to the liquid crystal layer. However, a direct-current power supply is used and thereby a direct-current voltage can also be applied to the liquid crystal layer. Techniques of shifting the orientation of the liquid crystal molecules, in addition to changing the voltage, can be achieved by changing the frequency of the electric field applied to the liquid crystal layer, the strength and frequency of the magnetic field applied to the liquid crystal layer, or the temperature of the liquid crystal layer. In the above description, some of macromolecular dispersed liquid crystal layers are close to solids, rather than liquids. In this case, therefore, one of the lenses 512a and 512b shown in FIG. 35, the transparent substrates 532 and 533 in FIG. 40, one of the lenses 552 and 553 in FIG. 41, the transparent substrate 563 in FIG. 43A, one of the transparent substrates 562 and 563 in FIG. 43B, or one of the transparent substrates 566 and 567, may be eliminated.

The merits of the optical element of the type that the focal length of the optical element is changed by altering the refracting index of a medium constructed with the macromolecular dispersed liquid crystal layer, such as that described in FIGS. 35-45, are that a mechanical design is easy because the shape is not changed, a mechanical structure becomes simple, and so on.

Figure 46:
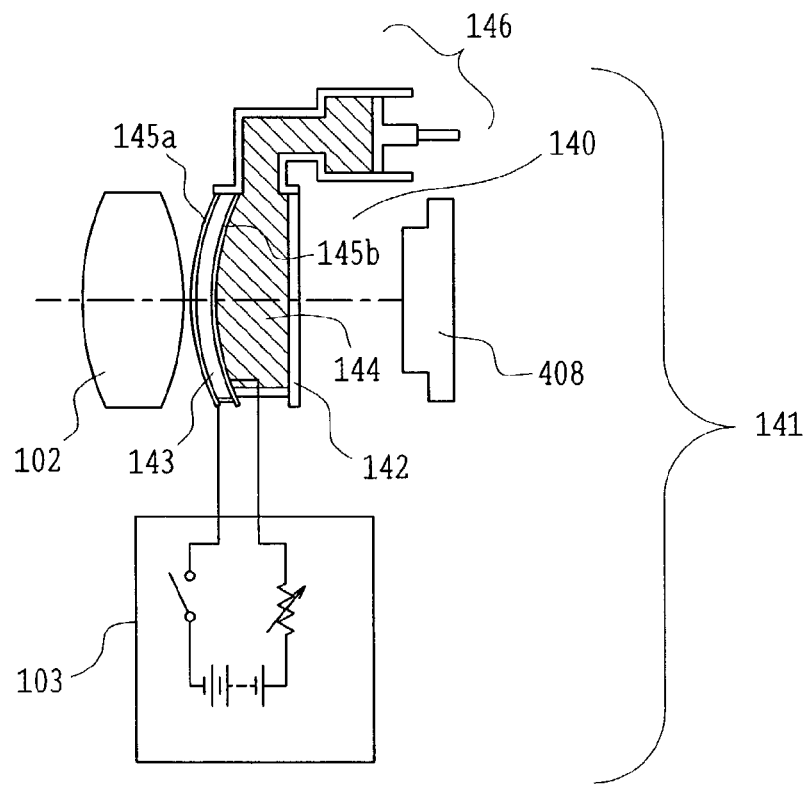
FIG. 46 is a view schematically showing the variable focal-length lens used in an imaging unit used as the optical apparatus of the present invention or the optical system of the imaging unit.

FIG. 46 shows an imaging unit 141 using a variable focal-length lens 140 in the imaging optical system of the optical apparatus of the present invention. The imaging unit 141 can be used as the imaging optical system of the present invention.

In this example, a lens 102 and the variable focal-length lens 140 constitute an imaging lens system. This imaging lens system and the solid-state image sensor 408 constitute the imaging unit 141. The variable focal-length lens 140 is constructed with a planar transparent member 142; a soft transparent substance 143, such as piezoelectric synthetic resin, sandwiched between a pair of transparent electrodes 145a and 145b; and a light-transmitting fluid or jelly-like substance 144 sandwiched between a transparent member 142 and the transparent electrode 145b.

As the fluid or jelly-like substance 144, silicon oil, elastic rubber, jelly, or water can be used. When voltages are applied through a circuit 103 to the transparent electrodes 145a and 145b between which the transparent substance 143 is sandwiched, the transparent substance 143 is deformed by the piezoelectric effect of the transparent substance 143 so that the focal length of the variable focal-length lens 140 is changed. Also, the circuit 103 includes a power supply, a variable resistor, and switch. When the transparent substance 143 is deformed, pressure is applied to the fluid or jelly-like substance 144 through a cylinder 146 so that the fluid or jelly-like substance 144 is also deformed, following the deformation of the transparent substance 143.

Thus, according to the example, even when the object distance is changed, focusing can be performed without moving the imaging optical system with a motor, and as such the example excels in compact and lightweight design and low power consumption.

Again, in FIG. 46, reference numerals 145a and 145b denote transparent electrodes and numeral 146 denotes a cylinder for storing a fluid or jelly-like substance 144. For the transparent substance 143, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, brings about a considerable deformation of the surface of the variable focal-length lens 140, which is favorable. It is good practice to use a transparent piezoelectric substance for the transparent substance 143 of the variable focal-length lens 140.

Figure 47:
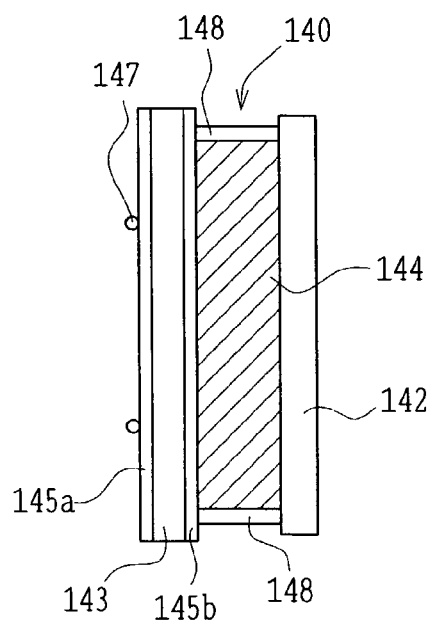
FIG. 47 is an explanatory view showing a modified example of the variable focal-length lens of FIG. 46.

In FIG. 46, instead of using the cylinder 146, the variable focal-length lens 140, as shown in FIG. 47, may be designed to use supporting members 147 and a deformable member 148 for enclosing the fluid or jelly-like substance 144 on the peripheral side.

Figure 48:
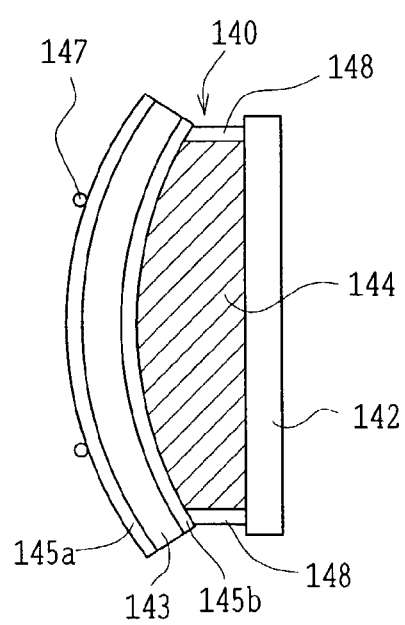
FIG. 48 is an explanatory view showing a state where the variable focal-length lens of FIG. 47 is deformed.

The supporting members 147 are composed of annular members fixed at a constant distance with respect to the transparent member 142. The substance 144 hermetically sealed with the transparent member 142, the electrode 142b, and the member 148 is situated between the supporting members 147 and the transparent member 142 and is deformed, following the deformation of the transparent substance 143 sandwiched between the pair of transparent electrodes 145a and 145b. The periphery of the transparent substance 143 is sealed. According to the example, even when the voltage is applied to the transparent substance 143 through the transparent electrodes 145a and 145b and thereby the transparent substance 143 is deformed, as shown in FIG. 48, the deformable member 148 is deformed so that the entire volume of the fluid or jelly-like substance 144 remains unchanged. As such, the cylinder 146 becomes unnecessary. Also, in FIGS. 47 and 48, the deformable member 148 is made with an elastic body, accordion-shaped synthetic resin, or metal.

In each of the examples shown in FIGS. 46 and 48, when a reverse voltage is applied, the transparent substance 143 is deformed in a reverse direction, and thus it is also possible to construct a concave lens.

Where an electrostrictive substance, for example, acrylic elastomer or silicon rubber, is used for the transparent substance 143, it is desirable that the transparent substance 143 is constructed so that the transparent substrate and the electrostrictive substance are cemented to each other.

Figure 49:
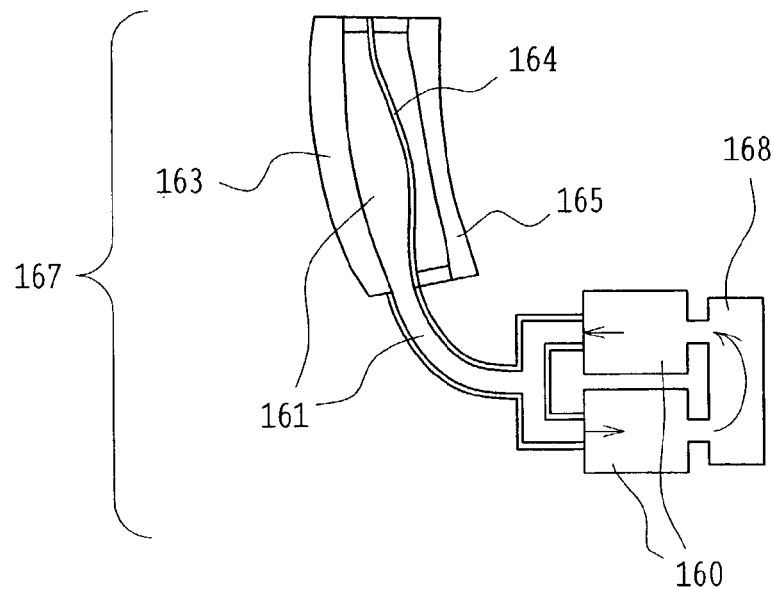
FIG. 49 is a view schematically showing another example of the variable focal-length lens in which a fluid is taken in and out by the micropump to deform a lens surface.

FIG. 49 shows a variable focal-length lens 167 in which the fluid 161 is taken in and out by micropumps 160 to deform the lens surface, in another example of the variable focal-length lens.

Each of the micropumps 160 is a small-sized pump, for example, made by a micromachining technique and is constructed so that it is operated with an electric power. The fluid 161 is sandwiched between a transparent substrate 163 and a transparent elastic body 164. The elastic body 164 constitutes a lens surface deformed by the fluid 161. In FIG. 49, reference numeral 165 represents a transparent substrate for protecting the elastic body 164, but this substrate is not necessarily required.

As examples of pumps made by the micromachining technique, there are those which use thermal deformations, piezoelectric substances, and electrostatic forces.

It is also possible to use two micropumps, each of which is the micropump 180 shown in FIG. 34, for example, as in the micropumps 160 used in the variable focal-length lens 167 of FIG. 49. In this construction, when the fluid 161 is run by the drive of the micropumps 160 to deform the elastic body 164, the shape of the lens surface is changed and the focus position can be varied with respect to light passing through the transparent substrate 163, the fluid 161, and the elastic body 164.

In the variable focal-length lens which uses the electrostatic force or the piezoelectric effect, a high voltage is sometimes required for drive. In this case, it is desirable that the boosting transformer or the piezoelectric transformer is used to constitute the control system. When a laminated piezoelectric transformer is particularly used, a compact design is achieved.

Figure 50:
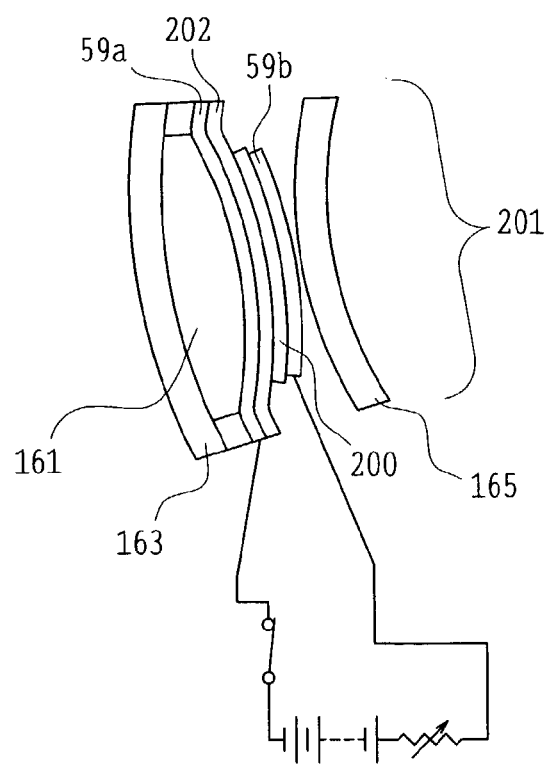
FIG. 50 is a view schematically showing another example of the variable optical-property element which is the variable focal-length lens using a piezoelectric substance.

FIG. 50 shows a variable focal-length lens 201 using a piezoelectric substance 200, instead of using the elastic body 164 of FIG. 49, in another example of a variable optical-property element. In this example, the fluid 161 is enclosed between the transparent substrate 161 and a transparent 59a.

The same substance as the transparent substance 143 is used for the piezoelectric substance 200, which is provided on a soft transparent substrate 202. It is desirable that synthetic resin or an organic substance is used for the substrate 202.

In the example, the voltage is applied to the piezoelectric substance 200 through the two transparent electrodes 59a and 59b, and thereby the piezoelectric substance 200 is deformed so that the function of a convex lens is exercised in FIG. 50.

Figure 51:
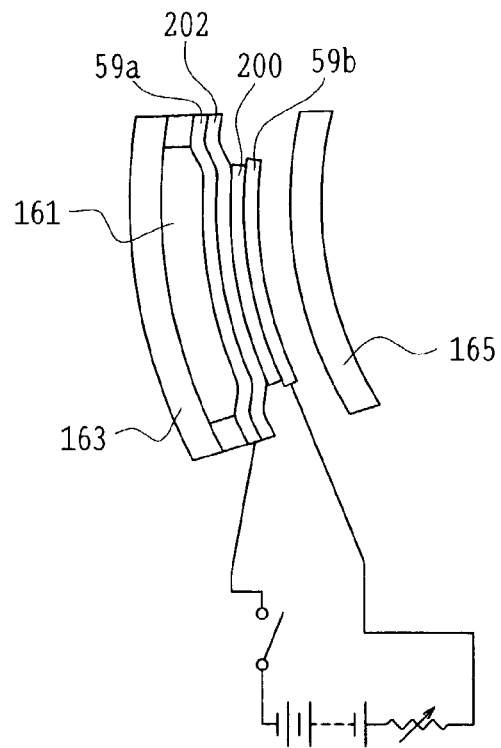
FIG. 51 is an explanatory view showing a state where the variable focal-length lens of FIG. 50 is deformed.

The substrate 202 is previously configured into a convex form, and at least one of the two transparent electrodes 59a and 59b is caused to differ in size from the substrate 202, for example, the electrode 59b is made smaller than the substrate 202. In doing so, when the applied voltage is removed, the opposite preset portions of the two transparent electrodes 59a and 59b, as shown in FIG. 51, are deformed into concave shapes so as to have the function of a concave lens, acting as the variable focal-length lens.

In this case, since the substrate 202 is deformed so that the volume of the fluid 161 is not changed, there is the merit that the liquid tank 168 becomes unnecessary.

This example has a great merit that a part of the substrate 202 holding the fluid 161 is deformed by the piezoelectric substance and the liquid tank 168 is dispensed with.

The transparent substrates 163 and 165 may be constructed as lenses or plane surfaces, although the same may be said of the example of FIG. 49.

Figure 52:
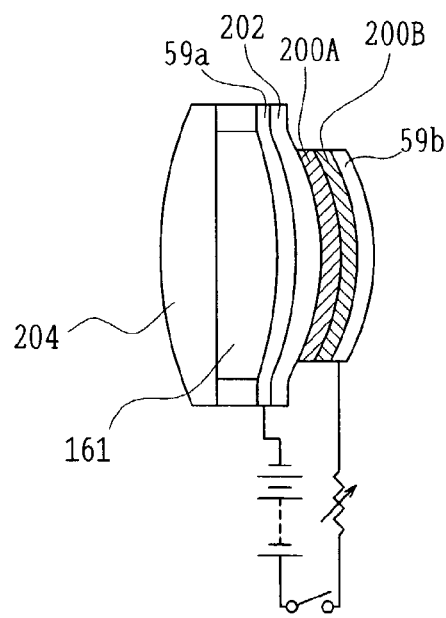
FIG. 52 is a view schematically showing still another example of the variable optical-property element which is the variable focal-length lens using two thin plates constructed of piezoelectric substances.

FIG. 52 shows a variable focal-length lens using two thin plates 200A and 200B constructed of piezoelectric substances, in replacement of the piezoelectric substance 200 of FIG. 51, in still another example of the variable optical-property element.

The variable focal-length lens of this example has the merit that the thin plate 200A and the thin plate 200B, reversed in direction of the piezoelectric substance, are used and thereby the amount of deformation is increased so that a wide variable focal-length range can be obtained. Also, in FIG. 52, reference numeral 204 denotes a lens-shaped transparent substrate and 161 denotes a fluid. Even in the example, the transparent electrode 59b on the right side of the figure is configured to be smaller than the substrate 202.

In the examples of FIGS. 50-52, the thicknesses of the substrate 202, the piezoelectric substance 200, and the thin plates 200A and 200B may be rendered uneven so that a state of deformation caused by the application of the voltage is controlled. By doing so, lens aberration can be corrected, which is convenient.

Figure 53:
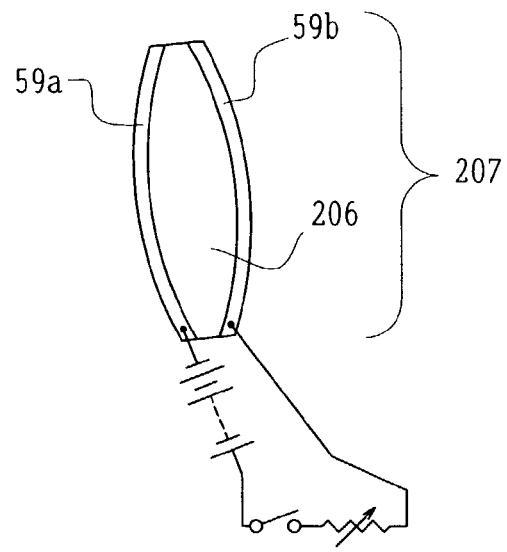
FIG. 53 is a view schematically showing still another example of the variable focal-length lens.

FIG. 53 shows another example of the variable focal-length lens. A variable focal-length lens 207 of this example has an electrostrictive substance 206 such as silicon rubber or acrylic elastomer between the pair of the transparent electrodes 59a and 59b.

Figure 54:
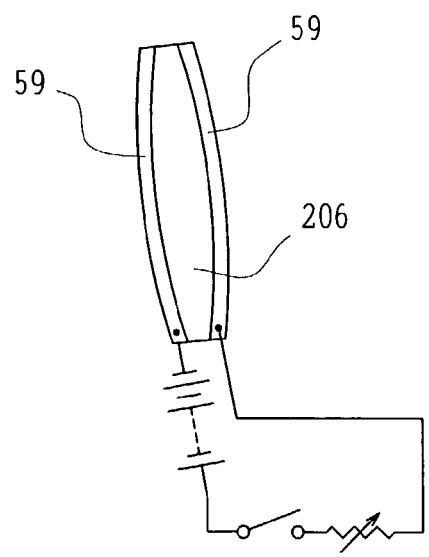
FIG. 54 is an explanatory view showing the deformation of the variable focal-length lens of FIG. 53.

According to the example, when the voltage is low, the electrostrictive substance 206, as depicted in FIG. 53, expands at the middle portion and acts as a convex lens, while when the voltage is increased, the electrostrictive substance 206, as depicted in FIG. 54, expands in a vertical direction and contracts in a lateral direction, and thus the focal length is increased. In this way, the electrostrictive substance 206 operates as the variable focal-length lens.

According to the variable focal-length lens of the example, there is the merit that since a large power supply is not required, power consumption is minimized.

The feature common to the variable focal-length lenses of FIGS. 46-54 mentioned above is that the shape of the medium acting as a lens is changed and thereby a variable focal length can be obtained. Such variable focal-length lenses, in contrast with those in which the refractive index is changed, have the merit that a variable focal-length range or a lens size can be arbitrarily chosen.

Figure 55:
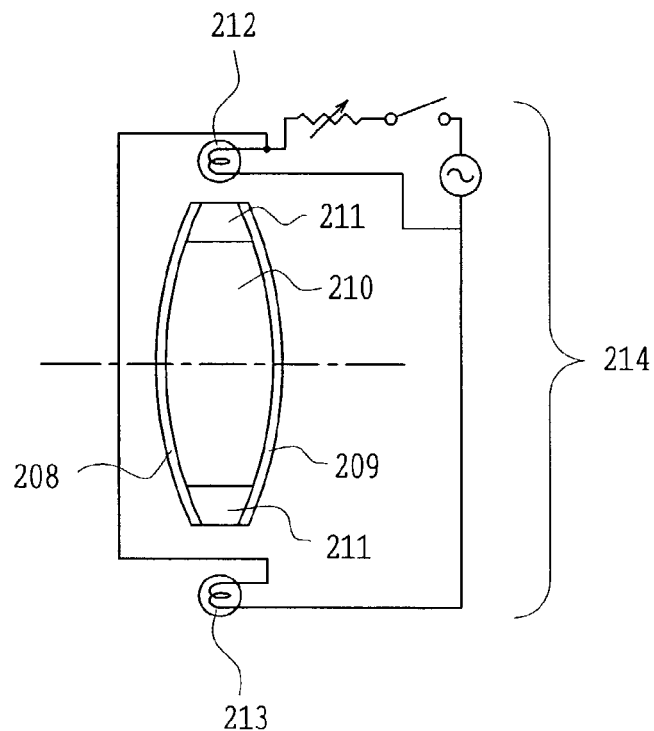
FIG. 55 is a view schematically showing a further example of the variable optical-property element which is the variable focal-length lens using a photonical effect.

FIG. 55 shows a variable focal-length lens using a photomechanical effect in a further example of the variable optical-property element. A variable focal-length lens 214 of this example is designed so that azobenzene 210 is sandwiched between transparent elastic bodies 208 and 209 and is irradiated with light through a transparent spacer 211.

In FIG. 55, reference numerals 212 and 213 represent light sources, such as LEDs or semiconductor lasers, of central wavelengths $\lambda_1$ and $\lambda_2$, respectively.

Figures 56A, 56B:
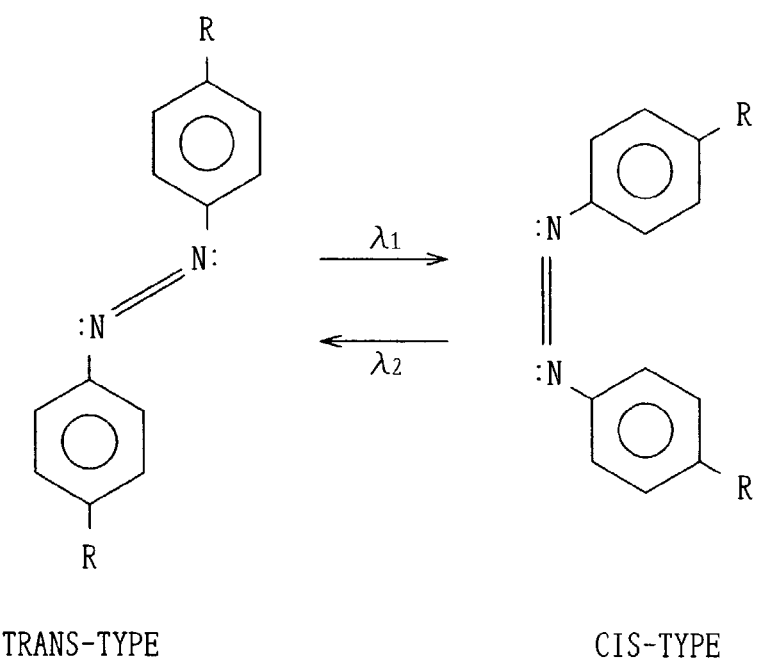
FIGS. 56A and 56B are explanatory views showing the structures of trans-type and cis-type azobenzene, respectively, used in the variable focal-length lens in FIG. 55.

In the example, when trans-type azobenzene shown in FIG. 56A is irradiated with light of the central wavelength $\lambda_1$, the azobenzene 210 changes to cis-type azobenzene shown in FIG. 56B to reduce its volume. Consequently, the thickness of the variable focal-length lens 214 is decreased, and the function of the convex lens is impaired.

On the other hand, when the cis-type azobenzene is irradiated with light of the central wavelength $\lambda_2$, the azobenzene 210 changes from the cis-type to the trans-type azobenzene to increase the volume. Consequently, the thickness of the variable focal-length lens 214 is increased, and the function of the convex lens is improved.

In this way, the optical element 214 of the example acts as the variable focal-length lens. In the variable focal-length lens 214, since the light is totally reflected at the interface between each of the transparent elastic bodies 208 and 209 and air, the light does not leak through the exterior and high efficiency is obtained.

Figure 57:
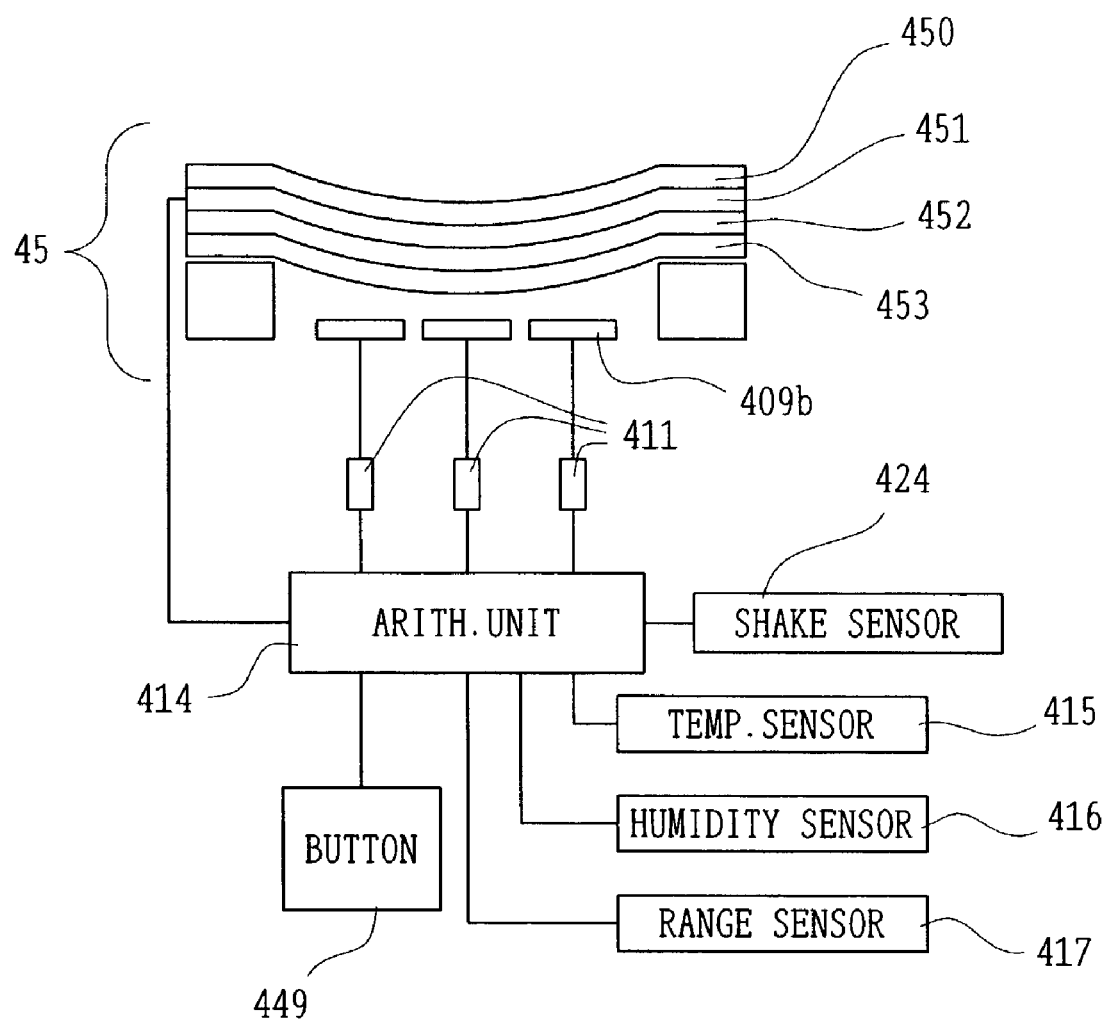
FIG. 57 is a view schematically showing another example of the deformable mirror.

FIG. 57 shows another embodiment of the deformable mirror. This example is described on the assumption that the deformable mirror is used in the digital camera. Again, in FIG. 57, reference numeral 411 designates the variable resistors; 414, the arithmetical unit; 415, the temperature sensor; 416, the humidity sensor; 417, the range sensor; and 424, the shake sensor. A deformable mirror 45 of the example is such that a plurality of divided electrodes 409b are spaced away from an electrostrictive substance 15 453 including an organic substance such as acrylic elastomer, on which an electrode 452 and a deformable substrate 451 are placed in turn, and a reflecting film 450 including metal, such as aluminum, for reflecting incident light is provided on the substrate 451. Thus, the deformation layer of the deformable mirror 45 has a four-layer structure.

The deformable mirror, when constructed as mentioned above, has the merit that the surface profile of the reflecting film (reflecting surface) 450 becomes smooth and it is hard to produce aberration, in contrast to the case where the divided electrodes 409b and the electrostrictive substance 453 are integrally constructed. Also, the deformable substrate 451 and the electrode 452 may be arranged in reverse order.

In FIG. 57, reference numeral 449 stands for a button for changing the magnification of the optical system or zooming. The deformable mirror 45 is controlled through the arithmetical unit 414 so that a user pushes the button 449 and thereby the reflecting film 450 can be deformed to change the magnification or zoom. Also, instead of the electrostrictive substance including an organic substance such as acrylic elastomer, the piezoelectric substance such as barium titanate, already mentioned, may be used.

Also, although said in common with the deformable mirrors described above, it is desirable that the shape where the portion of deformation of the reflecting surface is viewed from a direction perpendicular to the reflecting surface is long along the direction of the incident plane of an axial ray, for example, elliptical, oval, or polygonal. This is because the deformable mirror, as in FIG. 41, is often used in a state where a ray of light is incident at a grazing angle. In order to suppress aberration produced in this case, it is desirable that the reflecting surface has a shape similar to ellipsoid of revolution, paraboloid of revolution, or hyperboloid of revolution. This s because it is desirable that in order to deform the reflecting surface of the deformable mirror into such a shape, the shape where the portion of deformation of the reflecting surface is viewed from a direction perpendicular to the reflecting surface is long along the direction of the incident plane of an axial ray.

Finally, the definitions of terms used in the present invention will be described.

The optical apparatus refers to an apparatus including an optical system or optical elements. The optical apparatus need not necessarily function by itself. That is, it may be thought of as a part of an apparatus. The optical apparatus includes an imaging device, an observation device, a display device, an illumination device, and a signal processing device.

The imaging device refers to, for example, a film camera, a digital camera, a digital camera for cellular phones, a robot's eye, a lens-exchangeable digital single-lens reflex camera, a TV camera, a moving-picture recorder, an electronic moving-picture recorder, a camcorder, a VTR camera, or an electronic endoscope. Any of the digital camera, a card digital camera, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a cellular phone.

The illumination device includes, for example, a stroboscopic lamp for cameras, a headlight for cars, a light source for endoscopes, or a light source for microscopes.

The signal processing device refers to, for example, a cellular phone, a personal computer, a game machine, a read/write device for optical disks, or an arithmetic unit for optical computers.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

An extended surface is defined as follows:

Any shape such as a spherical, planar, or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. is satisfactory. Moreover, any surface which has some effect on light, such as a reflecting or refracting surface, is satisfactory. In the present invention, it is assumed that such a surface is generally referred as to the extended surface.

The variable optical-property element includes a variable focal-length lens, a deformable mirror, a deflection prism whose surface profile is changed, a variable angle prism, a variable diffraction optical element in which the function of light deflection is changed, namely a variable HOE, or a variable DOE.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element.

An information transmitter refers to a device which is capable of inputting and transmitting any information from a cellular phone; a stationary phone; a remote control for game machines, TVs, radio-cassette tape recorders, or stereo sound systems; a personal computer; or a keyboard, mouse, or touch panel for personal computers. It also includes a TV monitor with the imaging device, or a monitor or display for personal computers. The information transmitter is included in the signal processing device.

What is claimed is:

1. A control method of a variable optical-property element comprising the steps of:

(1) acquiring an imaging state of an optical apparatus;

(2) changing a function of light deflection of the variable optical-property element to acquire an imaging state of the optical apparatus involved in a change of the function of light deflection;

(3) comparing the imaging state after the change of the function of light deflection of the variable optical-property element with the imaging state before a change in optical property to evaluate a degree of improvement of the imaging state; and (4) repeating a sequence of the previous steps (2) and (3) until the imaging state ceases to be improved, in order to compensate a change of the imaging state caused by at least one factor of an ambient change, an individual difference, an object distance, a zoom state, and a change with age, wherein a control signal $X(i)$ (where i is 1 to N and N is a full number of control mechanisms) of an initial value is set to each of control mechanisms $Z(i)$ (where i is 1 to N); the control signal $X(i)$ set to the control mechanism $Z(i)$ is stored in a preset storage area $W_{x(i)}$ provided in the optical apparatus; an imaging state A1 of the optical apparatus is acquired in a state where the control signal $X(i)$ is provided; the imaging state A1 is applied to an evaluation function, which is designed for quantitatively expressing an imaging state of an optical system, to calculate a function value Y1; a value $X(i)+\delta X$ where the control signal $X(i)$ is changed by a predetermined amount is set to the control mechanism $Z(i)$ which is i-th; an imaging state A2 of the optical apparatus in accordance with the value $X(i)+\delta X$ of the control signal is acquired;

the imaging state A2 is applied to the evaluation function to calculate a function value Y2; a change rate $C(i)$ $(=|Y2-Y1|\delta X)$ of the evaluation function for the predetermined amount of change $\delta X$ of the control signal $X(i)$ in the proximity of the imaging state A1 is calculated; the change rate $C(i)$ is stored in a preset storage area $W_{C(i)}$ provided in the optical apparatus; the control signal $X(i)$ stored in the preset storage area $W_{x(i)}$ is set to the control mechanism $Z(i)$ to repeat processing from acquirement of the imaging state A2 to acquirement of the change rate $C(i)$ with respect to all the control mechanisms $Z(i)$ (where i is 1 to N); the change rate of the evaluation function stored in the preset storage area $W_{C(i)}$ is used to find a parameter $m(i)$ of a control signal $X'(i)=X(i)+m(i)\delta X$, bringing about a better imaging state than the imaging state A1; the parameter $m(i)$ bringing about the better imaging state is stored in a preset storage area $W_{m(i)}$ provided in the optical apparatus; a value of $\Sigma C(i)m(i)\delta X$ is calculated; whether the imaging state A1 is in a best imaging state is determined in accordance with the value of $\Sigma C(i)m(i)\delta X$; until an amount of change of the evaluation function is converged within a predetermined limit, a parameter of the imaging state stored in the storage area $W_{m(i)}$ is used to make the new control signal $X'(i)$, which is set to the control mechanism $Z(i)$; and a sequence of the previous processing from storage of the control signal $X(i)$ set to the control mechanism $Z(i)$ in the preset storage area $W_{x(i)}$ provided in the optical apparatus, acquirement of the imaging state A1 and thereafter is repeated again.

* * * * *